United States Patent
Wray et al.

(10) Patent No.: US 11,577,746 B2
(45) Date of Patent: Feb. 14, 2023

(54) EXPLAINABILITY OF AUTONOMOUS VEHICLE DECISION MAKING

(71) Applicants: Nissan North America, Inc., Franklin, TN (US); The University of Massachusetts, Boston, MA (US); United States of America as Represented by the Administrator of NASA, Washington, DC (US)

(72) Inventors: Kyle Hollins Wray, Fremont, CA (US); Omar Bentahar, Sunnyvale, CA (US); Astha Vagadia, San Jose, CA (US); Laura Cesafsky, San Francisco, CA (US); Arec Jamgochian, Stanford, CA (US); Stefan Witwicki, San Carlos, CA (US); Najamuddin Mirza Baig, San Jose, CA (US); Julius S. Gyorfi, Vernon Hills, IL (US); Shlomo Zilberstein, Amherst, MA (US); Sparsh Sharma, Santa Clara, CA (US)

(73) Assignees: Nissan North America, Inc., Franklin, TN (US); The University of Massachusetts, Boston, MA (US); United States of America as Represented by the Administrator of NASA, Washington, DC (US); Renault S.A.S., Boulogne-Billancourt (FR)

(*) Notice: Subject to any disclaimer, the term of this patent is extended or adjusted under 35 U.S.C. 154(b) by 223 days.

(21) Appl. No.: 16/821,115

(22) Filed: Mar. 17, 2020

(65) Prior Publication Data
US 2021/0237759 A1    Aug. 5, 2021

Related U.S. Application Data

(63) Continuation-in-part of application No. 16/778,890, filed on Jan. 31, 2020.

(51) Int. Cl.
| | | |
|---|---|---|
| *B60W 50/16* | (2020.01) | |
| *B60W 60/00* | (2020.01) | |
| *B60W 50/14* | (2020.01) | |

(52) U.S. Cl.
CPC ........ *B60W 50/16* (2013.01); *B60W 60/0011* (2020.02); *B60W 2050/146* (2013.01)

(58) Field of Classification Search
CPC .................................................. B60W 50/16
See application file for complete search history.

(56) References Cited

U.S. PATENT DOCUMENTS

| | | |
|---|---|---|
| 4,751,570 A | 6/1988 | Robinson |
| 5,615,116 A | 3/1997 | Gudat et al. |

(Continued)

FOREIGN PATENT DOCUMENTS

| | | |
|---|---|---|
| CN | 103945486 A | 7/2014 |
| CN | 105216795 A | 1/2016 |

(Continued)

OTHER PUBLICATIONS

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.

(Continued)

*Primary Examiner* — Michael A Berns
(74) *Attorney, Agent, or Firm* — Young Basile Hanlon & MacFarlane, P.C.

(57) ABSTRACT

A processor is configured to execute instructions stored in a memory to determine, in response to identifying vehicle operational scenarios of a scene, an action for controlling the AV, where the action is from a selected decision component that determined the action based on level of certainty associated with a state factor; generate an explanation as to (Continued)

why the action was selected, such that the explanation includes respective descriptors of the action, the selected decision component, and the state factor; and display the explanation in a graphical view that includes a first graphical indicator of a world object of the selected decision component, a second graphical indicator describing the state factor, and a third graphical indicator describing the action.

13 Claims, 18 Drawing Sheets

(56) References Cited

U.S. PATENT DOCUMENTS

| | | | |
|---|---|---|---|
| 8,762,006 | B2 | 6/2014 | Miller |
| 8,781,669 | B1 | 7/2014 | Teller et al. |
| 8,849,483 | B2 | 9/2014 | Kuwata et al. |
| 8,884,782 | B2 | 11/2014 | Rubin et al. |
| 9,081,651 | B2 | 7/2015 | Filev et al. |
| 9,103,671 | B1 | 8/2015 | Breed et al. |
| 9,494,439 | B1 | 11/2016 | Ross et al. |
| 9,568,915 | B1 | 2/2017 | Berntorp et al. |
| 9,646,428 | B1 | 5/2017 | Konrardy et al. |
| 9,972,054 | B1 | 5/2018 | Konrardy et al. |
| 10,029,701 | B2 | 7/2018 | Gordon et al. |
| 10,061,326 | B2 | 8/2018 | Gordon et al. |
| 10,093,322 | B2 * | 10/2018 | Gordon ................ B60W 50/14 |
| 10,126,135 | B2 | 11/2018 | Mortazavi et al. |
| 10,185,998 | B1 | 1/2019 | Konrardy et al. |
| 10,319,039 | B1 | 6/2019 | Konrardy et al. |
| 10,380,886 | B2 | 8/2019 | Ran et al. |
| 10,408,638 | B2 * | 9/2019 | Berntorp ............ B60W 40/109 |
| 10,514,705 | B2 | 12/2019 | Shalev-Shwartz et al. |
| 10,518,764 | B2 | 12/2019 | Cao et al. |
| 10,538,252 | B2 * | 1/2020 | Ebina .................. G08G 1/0962 |
| 10,599,155 | B1 | 3/2020 | Konrardy et al. |
| 10,990,096 | B2 | 4/2021 | Isele et al. |
| 2004/0068351 | A1 | 4/2004 | Solomon |
| 2005/0057370 | A1 | 3/2005 | Warrior et al. |
| 2007/0021915 | A1 | 1/2007 | Breed et al. |
| 2007/0168096 | A1 | 7/2007 | Boutin |
| 2008/0097699 | A1 | 4/2008 | Ono |
| 2009/0088916 | A1 | 4/2009 | Elgersma et al. |
| 2009/0140887 | A1 | 6/2009 | Breed et al. |
| 2009/0299496 | A1 | 12/2009 | Cade |
| 2009/0326819 | A1 | 12/2009 | Taguchi |
| 2010/0223216 | A1 | 9/2010 | Eggert et al. |
| 2011/0016067 | A1 | 1/2011 | Levchuk et al. |
| 2011/0102195 | A1 | 5/2011 | Kushi et al. |
| 2012/0150437 | A1 | 6/2012 | Zeng et al. |
| 2012/0233102 | A1 | 9/2012 | James |
| 2012/0290152 | A1 | 11/2012 | Cheung et al. |
| 2013/0318023 | A1 | 11/2013 | Morimura et al. |
| 2014/0067483 | A1 | 3/2014 | Jeong et al. |
| 2014/0136414 | A1 | 5/2014 | Abhyanker |
| 2014/0222277 | A1 | 8/2014 | Tsimhoni et al. |
| 2014/0244114 | A1 | 8/2014 | Matsubara |
| 2014/0309838 | A1 | 10/2014 | Ricci |
| 2015/0039157 | A1 | 2/2015 | Wolfe et al. |
| 2015/0070156 | A1 | 3/2015 | Milburn, Jr. |
| 2015/0081156 | A1 | 3/2015 | Trepagnier et al. |
| 2015/0105961 | A1 | 4/2015 | Callow |
| 2015/0106010 | A1 | 4/2015 | Martin et al. |
| 2015/0153735 | A1 | 6/2015 | Clarke et al. |
| 2015/0183431 | A1 | 7/2015 | Nanami |
| 2015/0210274 | A1 | 7/2015 | Clarke et al. |
| 2015/0253772 | A1 | 9/2015 | Solyom et al. |
| 2015/0329130 | A1 | 11/2015 | Carlson et al. |
| 2015/0345966 | A1 | 12/2015 | Meuleau |
| 2015/0345967 | A1 | 12/2015 | Meuleau |
| 2015/0375748 | A1 | 12/2015 | Nagase et al. |
| 2016/0068158 | A1 | 3/2016 | Elwart et al. |
| 2016/0129907 | A1 | 5/2016 | Kim et al. |
| 2016/0161270 | A1 | 6/2016 | Okumura |
| 2016/0209842 | A1 | 7/2016 | Thakur et al. |
| 2016/0209843 | A1 | 7/2016 | Meuleau et al. |
| 2016/0209848 | A1 | 7/2016 | Kojo et al. |
| 2016/0260328 | A1 | 9/2016 | Mishra et al. |
| 2016/0318511 | A1 | 11/2016 | Rangwala |
| 2016/0318515 | A1 | 11/2016 | Laur et al. |
| 2016/0334230 | A1 | 11/2016 | Ross et al. |
| 2016/0334797 | A1 | 11/2016 | Ross et al. |
| 2016/0335892 | A1 | 11/2016 | Okada et al. |
| 2016/0375766 | A1 | 12/2016 | Konet et al. |
| 2016/0375768 | A1 | 12/2016 | Konet et al. |
| 2017/0008168 | A1 | 1/2017 | Weng et al. |
| 2017/0010108 | A1 | 1/2017 | Shashua |
| 2017/0010617 | A1 | 1/2017 | Shashua et al. |
| 2017/0031361 | A1 | 2/2017 | Olson et al. |
| 2017/0032590 | A1 | 2/2017 | Stefan et al. |
| 2017/0038777 | A1 | 2/2017 | Harvey |
| 2017/0090478 | A1 | 3/2017 | Blayvas et al. |
| 2017/0090480 | A1 | 3/2017 | Ho et al. |
| 2017/0102700 | A1 | 4/2017 | Kozak |
| 2017/0124476 | A1 | 5/2017 | Levinson et al. |
| 2017/0158193 | A1 | 6/2017 | Lopez et al. |
| 2017/0215045 | A1 | 7/2017 | Rasal et al. |
| 2017/0225760 | A1 | 8/2017 | Sidki et al. |
| 2017/0236422 | A1 | 8/2017 | Naka et al. |
| 2017/0261325 | A1 | 9/2017 | Schroeder et al. |
| 2017/0262790 | A1 | 9/2017 | Khasis |
| 2017/0276780 | A1 | 9/2017 | Takehara et al. |
| 2017/0277193 | A1 | 9/2017 | Frazzoli et al. |
| 2017/0297576 | A1 | 10/2017 | Halder et al. |
| 2017/0329338 | A1 | 11/2017 | Wei et al. |
| 2017/0334451 | A1 | 11/2017 | Asakura et al. |
| 2017/0356746 | A1 | 12/2017 | Iagnemma |
| 2017/0357263 | A1 | 12/2017 | Glatfelter et al. |
| 2017/0369051 | A1 | 12/2017 | Sakai et al. |
| 2017/0369062 | A1 | 12/2017 | Saigusa et al. |
| 2017/0369067 | A1 | 12/2017 | Saigusa et al. |
| 2017/0371338 | A1 | 12/2017 | Kamata et al. |
| 2018/0004214 | A1 | 1/2018 | Wisniowski et al. |
| 2018/0011494 | A1 | 1/2018 | Zhu et al. |
| 2018/0029500 | A1 | 2/2018 | Katanoda |
| 2018/0032079 | A1 | 2/2018 | Nishi |
| 2018/0046191 | A1 | 2/2018 | Keller et al. |
| 2018/0129206 | A1 | 5/2018 | Harada et al. |
| 2018/0173230 | A1 | 6/2018 | Goldman-Shenhar et al. |
| 2018/0232585 | A1 | 8/2018 | Kim |
| 2018/0290657 | A1 | 10/2018 | Ryne et al. |
| 2018/0341880 | A1 | 11/2018 | Kislovskiy et al. |
| 2018/0342033 | A1 | 11/2018 | Kislovskiy et al. |
| 2018/0348786 | A1 | 12/2018 | Yasui et al. |
| 2018/0349785 | A1 | 12/2018 | Zheng et al. |
| 2018/0373245 | A1 | 12/2018 | Nishi |
| 2019/0047584 | A1 | 2/2019 | Donnelly |
| 2019/0096244 | A1 | 3/2019 | Guruva Reddiar et al. |
| 2019/0113918 | A1 | 4/2019 | England et al. |
| 2019/0129436 | A1 | 5/2019 | Sun et al. |
| 2019/0135281 | A1 | 5/2019 | Miura et al. |
| 2019/0193722 | A1 | 6/2019 | Yamamuro et al. |
| 2019/0196471 | A1 | 6/2019 | Vaughn et al. |
| 2019/0258268 | A1 | 8/2019 | Macneille et al. |
| 2019/0295179 | A1 | 9/2019 | Shalev-Shwartz et al. |
| 2019/0299991 | A1 | 10/2019 | Horii et al. |
| 2019/0310632 | A1 | 10/2019 | Nakhaei Sarvedani |
| 2019/0317506 | A1 | 10/2019 | Ishioka |
| 2019/0329771 | A1 | 10/2019 | Wray et al. |
| 2019/0329782 | A1 | 10/2019 | Shalev-Shwartz et al. |
| 2019/0359209 | A1 | 11/2019 | Mizutani et al. |
| 2020/0079377 | A1 | 3/2020 | Yashiro et al. |
| 2020/0097008 | A1 | 3/2020 | Sadat et al. |
| 2020/0180647 | A1 | 6/2020 | Anthony |
| 2020/0269871 | A1 | 8/2020 | Schmidt et al. |
| 2020/0269875 | A1 | 8/2020 | Wray et al. |
| 2020/0279488 | A1 | 9/2020 | Shibasaki |
| 2020/0406906 | A1 | 12/2020 | Omari et al. |
| 2021/0089048 | A1 | 3/2021 | Tran |

(56) References Cited

U.S. PATENT DOCUMENTS

| | | | |
|---|---|---|---|
| 2021/0237759 A1* | 8/2021 | Wray | B60W 30/18159 |
| 2021/0240190 A1* | 8/2021 | Wray | G06F 40/56 |
| 2021/0294323 A1 | 9/2021 | Bentahar et al. | |

FOREIGN PATENT DOCUMENTS

| | | |
|---|---|---|
| CN | 105620470 A | 6/2016 |
| CN | 105635849 A | 6/2016 |
| CN | 106103232 A | 11/2016 |
| CN | 106184223 A | 12/2016 |
| CN | 106428000 A | 2/2017 |
| CN | 107577227 A | 1/2018 |
| DE | 10341753 A1 | 4/2005 |
| DE | 102012005245 A1 | 9/2012 |
| DE | 102012220134 A1 | 5/2014 |
| DE | 102016203086 A1 | 8/2017 |
| EP | 2084690 A2 | 8/2009 |
| EP | 2902864 A1 | 8/2015 |
| EP | 2958783 A1 | 12/2015 |
| EP | 3273423 A1 | 1/2018 |
| JP | H02-114304 A | 4/1990 |
| JP | 2007179388 A | 7/2007 |
| JP | 2012-221291 A | 11/2012 |
| JP | 2015-140181 A | 8/2015 |
| JP | 2015-199439 A | 11/2015 |
| JP | 2015191273 A | 11/2015 |
| JP | 2016017914 A | 2/2016 |
| JP | 2016139163 A | 8/2016 |
| JP | 201781426 A | 5/2017 |
| JP | 2018-49445 A | 3/2018 |
| RU | 2436167 C1 | 12/2011 |
| WO | 2008/053373 A2 | 5/2008 |
| WO | 2012-172632 A1 | 12/2012 |
| WO | 2014/024336 A1 | 2/2014 |
| WO | 2014/130178 A1 | 8/2014 |
| WO | 2015/052865 A1 | 4/2015 |
| WO | 2015112651 A1 | 7/2015 |
| WO | 2016121572 A1 | 8/2016 |
| WO | 2016124178 A1 | 8/2016 |
| WO | 2016129067 A1 | 8/2016 |
| WO | 2016130719 A2 | 8/2016 |
| WO | 2017/013746 A1 | 1/2017 |
| WO | 2017/013749 A1 | 1/2017 |
| WO | 2017/022448 A1 | 2/2017 |
| WO | 2017/120336 A2 | 7/2017 |
| WO | 2018147872 A1 | 8/2018 |
| WO | 2018147874 A1 | 8/2018 |

OTHER PUBLICATIONS

Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.

Kala et al.; Motion Planning of Autonomous Vehicles on a Dual Carriageway without Speed Lanes; Electronics; Jan. 13, 2015.

Matthews et al.; Intent Communication between Autonomous Vehicles and Pedestrians; 2015.

Ragi et al.; UAV path planning in a dynamic environment via partially observable Markov decision process; IEEE Transactions on Aerospace and Electronic Systems; Oct. 8, 2013.

Aoki, S. et al., A Merging Protocol for Self-Driving Vehicles, ICCPS, Apr. 2017.

International Application No. PCT/US2017/017493, filed Feb. 10, 2017.

International Application No. PCT/US2017/017502, filed Feb. 10, 2017.

International Application No. PCT/US2017/017516, filed Feb. 10, 2017.

International Application No. PCT/US2017/017527, filed Feb. 10, 2017.

U.S. Appl. No. 15/621,862, filed Jun. 13, 2017.

Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.

Wray et al., Online Decision-Making for Scalable Autonomous Systems; Conference: Twenty-Sixth International Joint Conference on Artificial Intelligence; Conference Paper • Aug. 2017 ; 7 pages https://www.researchgate.net/publication/318830226_Online_Decision-Making_for_Scalable_Autonomous_Systems.

Wray et al., Online Decision-Making for Scalable Autonomous Systems; Power Point Presentation; Aug. 23, 2017.

Miller, Tim, Explanation in Artificial Intelligence: Insights from the Social Sciences; Aug. 15, 2018; 66 pages; arXiv:1706.07269v3 ; https://arxiv.org/abs/1706.07269.

Bouton et al., Scalable Decision Making with Sensor Occlusions for Autonomous Driving; 2018 IEEE International Conference on Robotics and Automation (ICRA), Brisbane, Australia, May 21-25, 2018; 6 pages.

Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.

Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.

Extended European Search Report of corresponding application EP 17895657.9; dated Feb. 25, 2020; 9 pages.

\* cited by examiner

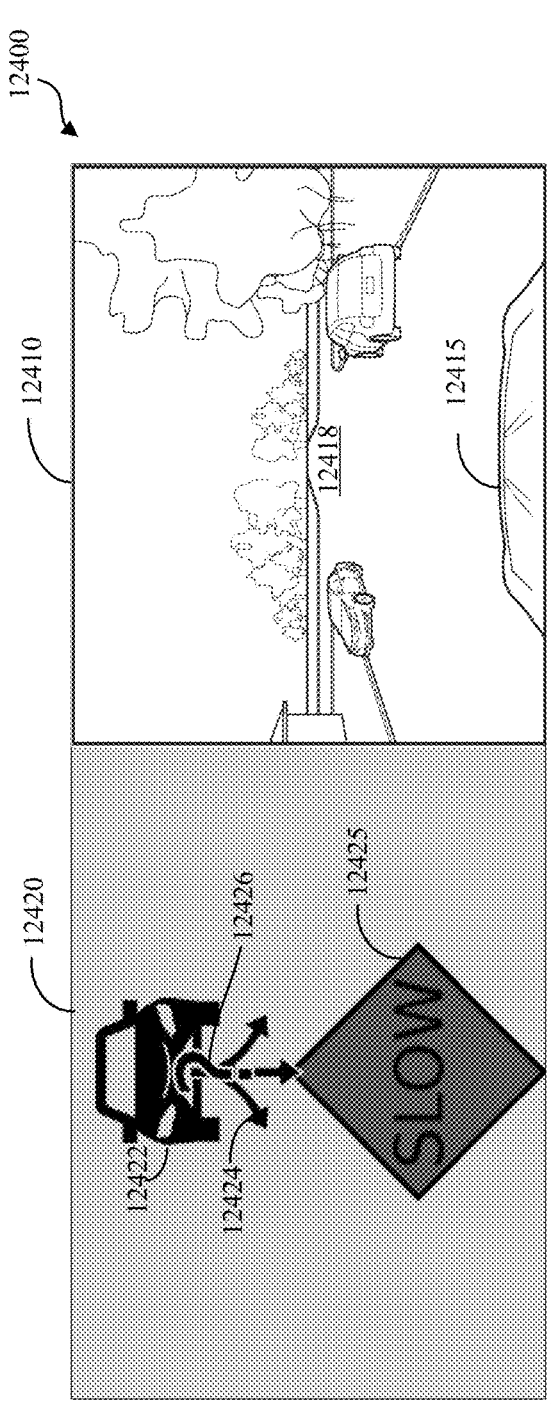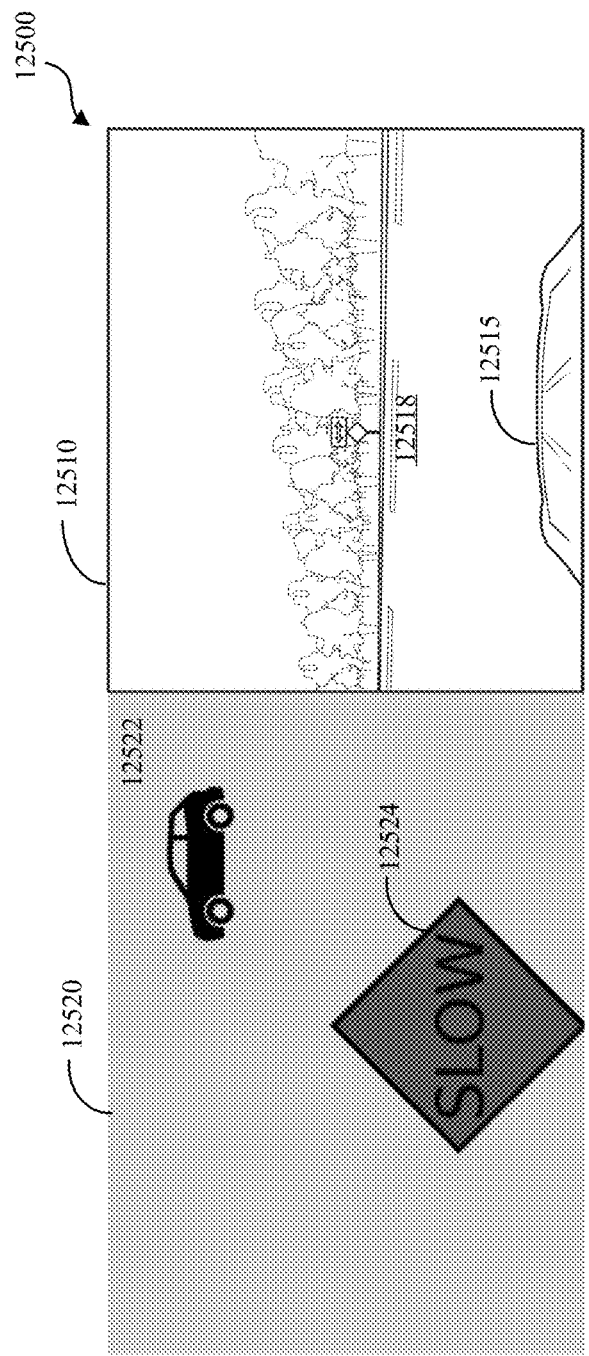
FIG. 12E
FIG. 12F

EXPLAINABILITY OF AUTONOMOUS VEHICLE DECISION MAKING

CROSS-REFERENCE TO RELATED APPLICATIONS

This application is a continuation in part of U.S. application patent Ser. No. 16/778,890, filed Jan. 31, 2020, the entire disclosure of which is hereby incorporated by reference.

TECHNICAL FIELD

This disclosure relates generally to autonomous vehicle operational management and autonomous driving, and more particularly to explainability of autonomous vehicle decision-making.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of autonomous driving in response to the captured data. It is desirable to provide user-understandable as to why the action was selected (such as by the decision-making components of the autonomous vehicle).

SUMMARY

A first aspect of the disclosed embodiments is an apparatus for use in traversing a vehicle transportation network by an autonomous vehicle (AV). The apparatus includes a memory and a processor. The processor is configured to execute instructions stored in the memory to determine, in response to identifying vehicle operational scenarios of a scene, an action for controlling the AV, where the action is from a selected decision component that determined the action based on level of certainty associated with a state factor; generate an explanation as to why the action was selected, such that the explanation includes respective descriptors of the action, the selected decision component, and the state factor; and display the explanation in a graphical view that includes a first graphical indicator of a world object of the selected decision component, a second graphical indicator describing the state factor, and a third graphical indicator describing the action.

A second aspect of the disclosed embodiments is a method for use in traversing a vehicle transportation network by an autonomous vehicle (AV). The method includes determining, in response to identifying vehicle operational scenarios of a scene, an action for controlling the AV, where the action is from a selected decision component that determined the action based on a level of certainty associated with a state factor; generating an explanation as to why the action was selected, such that the explanation includes respective descriptors of the action, the selected decision component, and the state factor; receiving, at an autonomous system, the explanation; and displaying the explanation to a tele-operator in a graphical view that includes a first graphical indicator of a world object of the selected decision component, a second graphical indicator describing the state factor, and a third graphical indicator describing the action.

A third aspect of the disclosed embodiments is a method for use in traversing a vehicle transportation network by an autonomous vehicle (AV). The method includes determining, in response to identifying vehicle operational scenarios of a scene, an action for controlling the AV, where the action is from a selected decision component that determined the action based on level of certainty associated with a state factor; generating an explanation as to why the action was selected, such that the explanation includes respective descriptors of the action, the selected decision component, and the state factor; and outputting the explanation in a haptic modality that includes a first haptic output of a world object of the selected decision component, a second haptic output describing the state factor, and a third haptic output describing the action.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

FIGS. 12A-12I are examples of explanations in accordance with embodiments of this disclosure.

DETAILED DESCRIPTION

Figure 1:
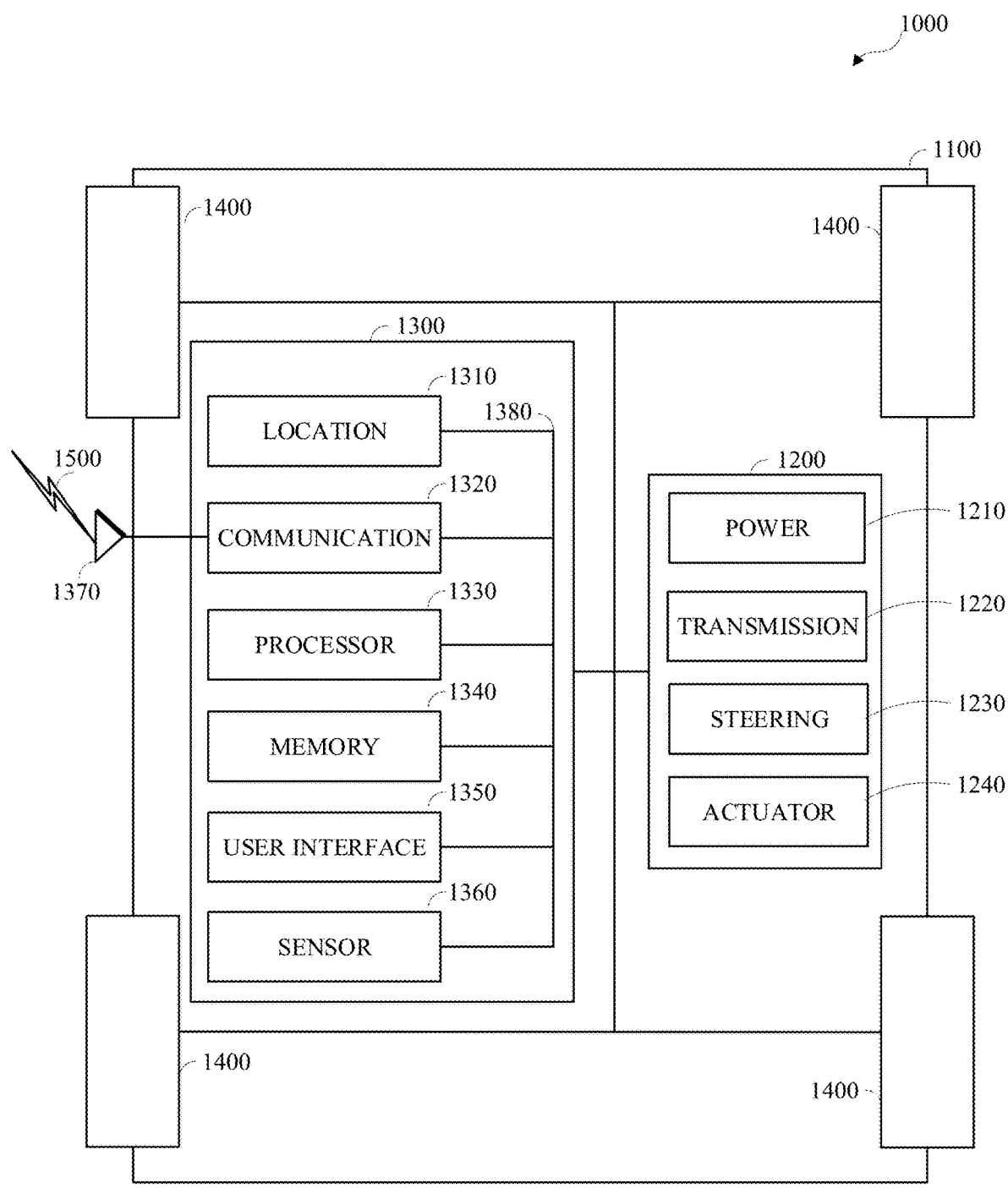
FIG. 1 is a diagram of an example of a vehicle in which the aspects, features, and elements disclosed herein may be implemented.

A vehicle, such as an autonomous vehicle (AV), or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

During autonomous driving, and at different time steps (e.g., at every time step), some component (e.g., a decision-making module such as a reasoning module, an inference module, or the like) of the AV may determine a respective action for controlling the AV in response to sensor information. Thus, at a high level, the component of the AV uses inputs (e.g., sensor data) and produces an output (e.g., the action to control the AV) where the output can be an action for controlling the AV.

The component can be a single component (e.g., module, circuitry, etc.), multiple cooperating components, or a command arbitration module (e.g., an executor or an autonomous vehicle operational management controller) that receives inputs (e.g., candidate actions) from multiple components and selects one of the candidate actions as the selected action for controlling the AV.

An explanation (i.e., a human-understandable explanation) as to why an action was selected for controlling the AV may sometimes be desirable. Examples of human-understandable explanations that may be generated (e.g., output) by an autonomous vehicle (or one or more modules therein) can include explanations that essentially convey the messages:

I stopped because I was uncertain about whether the vehicle on the left was blocking,
I stopped because I had uncertainty over the existence and the blocking of a pedestrian on the right,
I proceeded because I was certain there were no blocking objects,
I proceeded because the road is clear,
I stopped because I am at the stop line,
I went because the intersection was empty,
I edged because there was uncertainty over a pedestrian on the right, at the crosswalk on the intersection of Moffett and Bordeaux,
I went because the pedestrian was not blocking,
I stopped because the obstacle vehicle in front was certainly blocking,
I edged because I was uncertain if an oncoming vehicle existed, or
I went because I was certain the oncoming vehicle was yielding.

While, textual (e.g., human-readable) examples are given above, the human-understandable explanations can be textual, visual, auditory, haptic, some other type of human-understandable explanation, or a combination thereof. In the case of an auditory explanation, text-to-speech capabilities can be used to output a textual human-understandable explanation.

There can be many constituents who can benefit from and/or require human-understandable explanations. For example, occupants (e.g., passengers) of the AV may require appropriately-timed high-level short explanations of the actions to provide trust and comfort as to the reasoning (e.g., decision-making) capabilities and safety of autonomous driving. For example, developers (e.g., programmers, those who develop the reasoning capabilities of the AV, quality engineers, etc.) may require a very detailed summary of the actions of the AV and/or a fleet of AVs to validate (e.g., simulate, test, etc.) newly developed autonomous driving capabilities, fix bugs (e.g., logic errors, calculation errors, etc.), and write (e.g., develop) new features for enhancing the autonomous driving experience of the AV. For example, a tele-operator (i.e., a human operator that is responsible for remotely monitoring and assisting one or more autonomous vehicles) may require high-level explanations of the actions of the AV and/or a fleet of AVs to quickly obtain situational awareness and quickly resolve an issue of the AV, such as in a case where the AV cannot negotiate (e.g., get around, etc.) an obstruction or is not competent to proceed autonomously. For example, regulators may require detailed summaries of the actions of a fleet of AVs to ensure conformance with legal and/or safety regulations. For example, investigators (e.g., legal or insurance professionals) may require both high-level and very detailed summaries of the actions of an AV to retroactively understand legal issues (e.g., level of fault in a case of an accident). A legally mandated consumer right to an explanation may also be created in certain jurisdictions.

In some autonomous driving systems, the decision-making system may not be explainable. That is, the decision-making system may not be able to provide a human-understandable explanation. For example, the decision-making system may be a neural network (e.g., a deep-learning neural network, etc.). As such, the inference model of the decision-making system amounts to weight and activations values (e.g., millions of real numbers) that do not have semantic meanings. A decision (e.g., selected action) of such a decision-making system amounts to which nodes of the model were activated using the weight values. Extracting explanations from such decision-making systems, even if possible at all, is not straight forward and may require additional systems that attempt to explain the decision-making system itself (e.g., the meanings of the activation values based on the inputs). Such decision-making system amounts to a un-explainable black box. Such systems are not able to answer questions such as "why did you not yield for the car on your left?," "why did you run through the stop sign?," etc. While, the activation values resulting in a specific action of a neural network may be output, such activation values are not easy to interpret. In another example, to understand why an action was performed by a different type of decision-making system, the source code and the inputs (e.g., the sensor data) to the source code may need to be analyzed to provide the explanation.

Contrastingly, autonomous driving systems according to implementations of this disclosure are inherently explainable.

Described herein is an autonomous vehicle operational management system that is an example of an explainable decision-making system in autonomous driving. That is the autonomous vehicle operational management system can provide human-understandable explanations as to why actions for controlling an AV were selected. The autonomous vehicle operational management system may include one or more operational environment monitors that may process operational environment information, such as the sensor data, for the autonomous vehicle.

The autonomous vehicle operational management system may include an autonomous vehicle operational management controller, which may detect one or more operational scenarios, such as pedestrian scenarios, intersection scenarios, lane change scenarios, or any other vehicle operational scenario or combination of vehicle operational scenarios, corresponding to the external objects. An operational scenario or a set related to operational scenarios may be referred herein as environment state.

The autonomous vehicle operational management system may include one or more scenario-specific operational control evaluation modules (SSOCEMs). Each scenario-specific operational control evaluation module may be a model, such as a Partially Observable Markov Decision Process (POMDP) model, of a respective operational scenario. That is, each model is configured to handle a specific scenario. The autonomous vehicle operational management controller may instantiate respective instances of the scenario-specific operational control evaluation modules in response to detecting the corresponding operational scenarios.

To restate, the POMDP of a particular operational scenario may be solved a priori (e.g., off-line) to generate a policy. The policy can include one or more actions for controlling an AV given a currently observed and/or predicted state. Upon encountering the particular operational scenario during autonomous driving (e.g., online), the POMDP can be instantiated and its policy used by the instance to provide, at each time step, a respective action for controlling the AV based on the observed and/or predicted state at the time step.

The autonomous vehicle operational management controller may receive candidate vehicle control actions from respective instantiated scenario-specific operational control evaluation module (SSOCEM) instances, may identify a vehicle control action from the candidate vehicle control actions, and may control the autonomous vehicle to traverse a portion of the vehicle transportation network according to the identified vehicle control action.

The autonomous vehicle operational management system described herein has semantic attachments. For example, the autonomous vehicle operational management systems described herein, SSOCEM, and/or SSOCEM instances therein can maintain a semantic state (e.g., a collection of semantic state factors) that are used to derive the action to control an AV. While such components may employ complicated mathematics to derive (e.g., calculate, determine, select, etc.) the action, the elements (e.g., variables) of the mathematics are the state factors, which have semantic meaning.

In this context, semantic meaning means "relating to meaning in a language" where the language is understandable by a human. As such, any mathematics employed, such as by SSOCEMs and/or SSOCEM instances are grounded in human understandable concepts. For example, each state factor can be, or can be mapped, a noun and its possible values can, or can be mapped, be a list of adjectives. The nouns and corresponding adjectives used to describe a component (e.g., a scenario-specific operational control evaluation module) directly relate to how the mathematics that solve the corresponding operational scenario interpret that semantic descriptors because the solution is derived (e.g., implemented) using that semantic attachment.

FIG. 1 is a diagram of an example of a vehicle in which the aspects, features, and elements disclosed herein may be implemented. In the embodiment shown, a vehicle 1000 includes various vehicle systems. The vehicle systems include a chassis 1100, a powertrain 1200, a controller 1300, and wheels 1400. Additional or different combinations of vehicle systems may be used. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, transmits the energy to the wheels 1400 to provide a motive force. The transmission 1220 may be controlled by the controller 1300, the actuator 1240, or both. The steering unit 1230 may be controlled by the controller 1300, the actuator 1240, or both and control the wheels 1400 to steer the vehicle. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 1000.

The sensors 1360 include one or more sensors 1360 that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
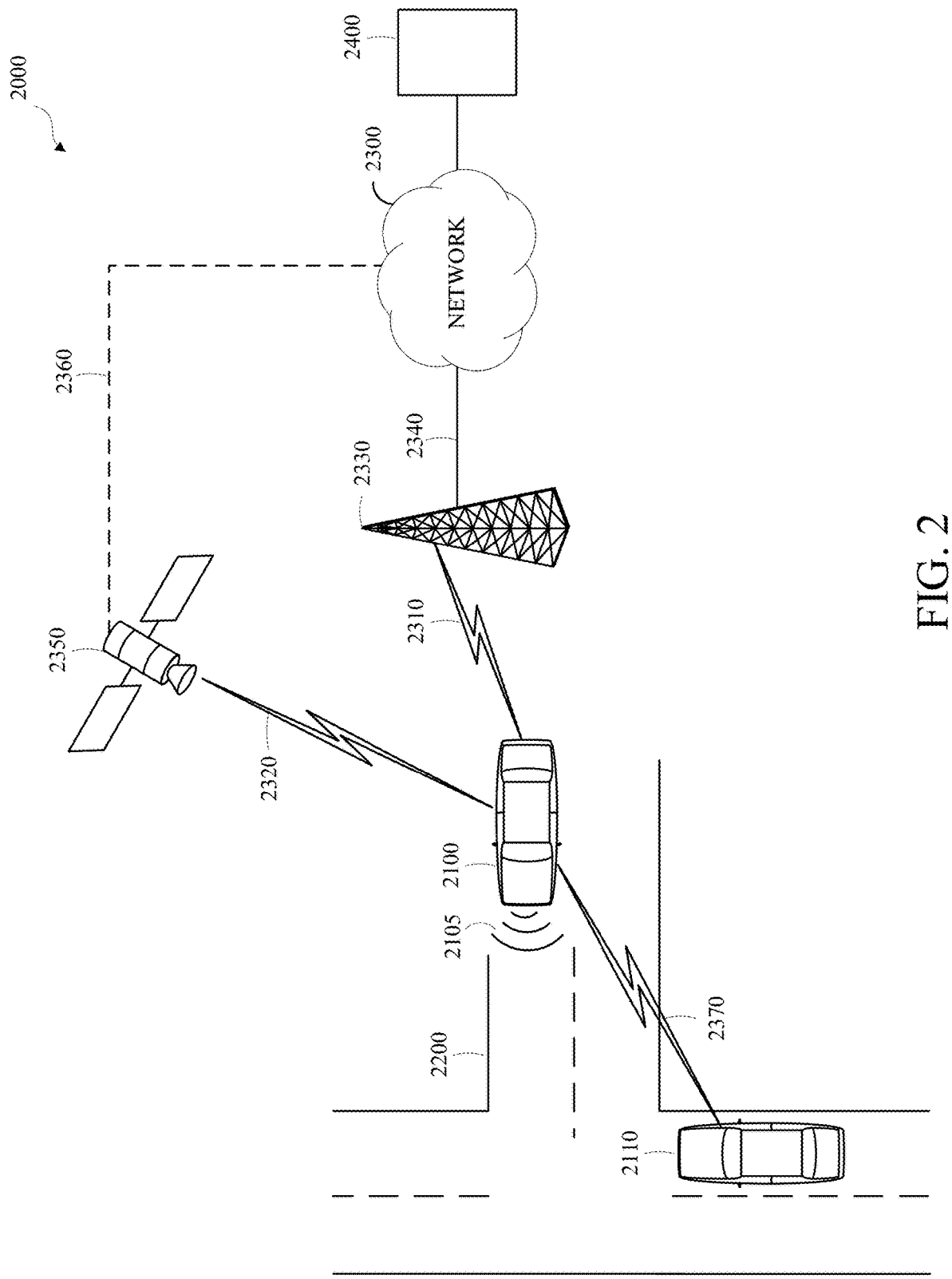
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensor 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
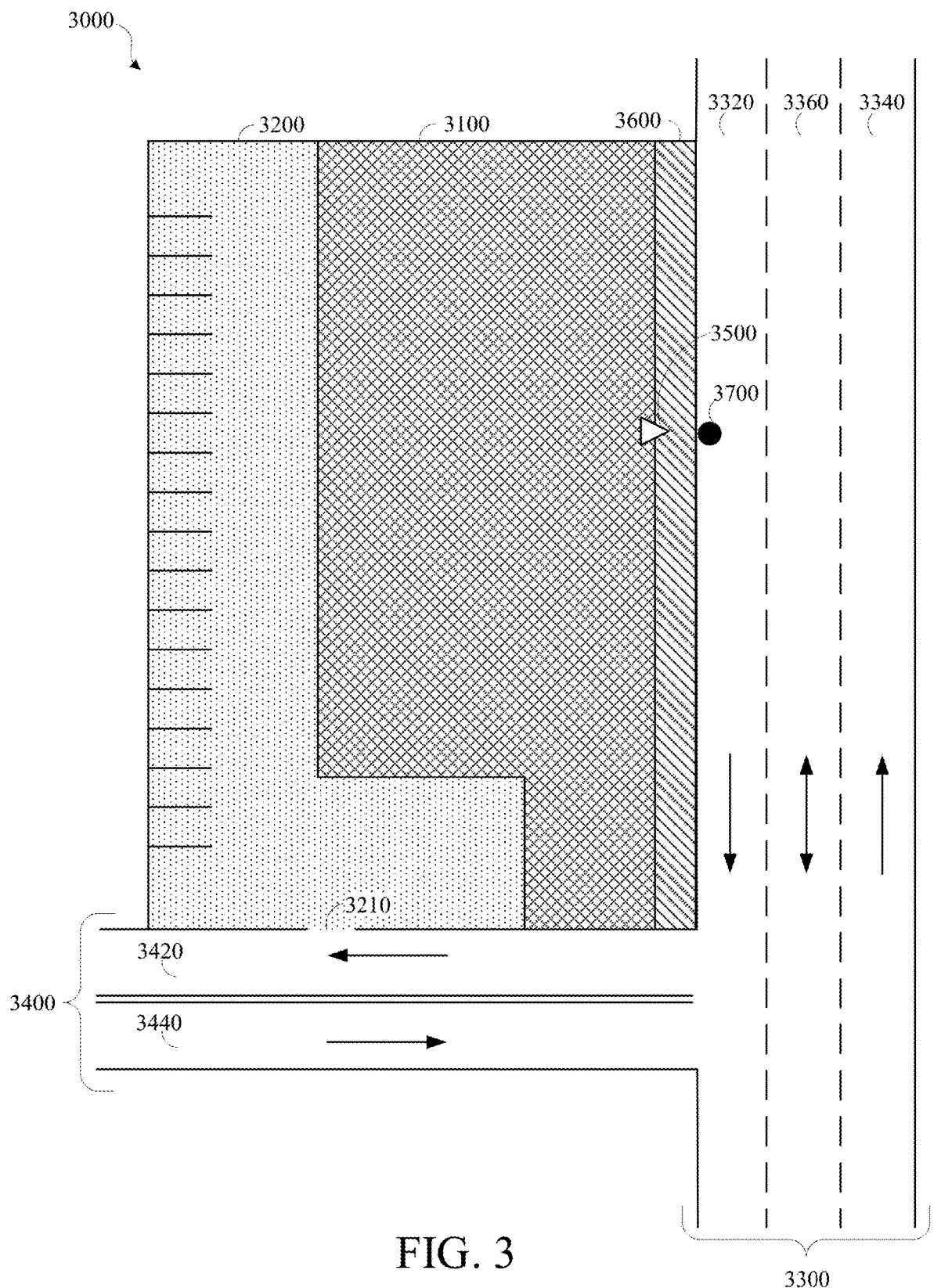
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, a number of lanes, known hazards, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian walkway or crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3. A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed.

Figure 4:
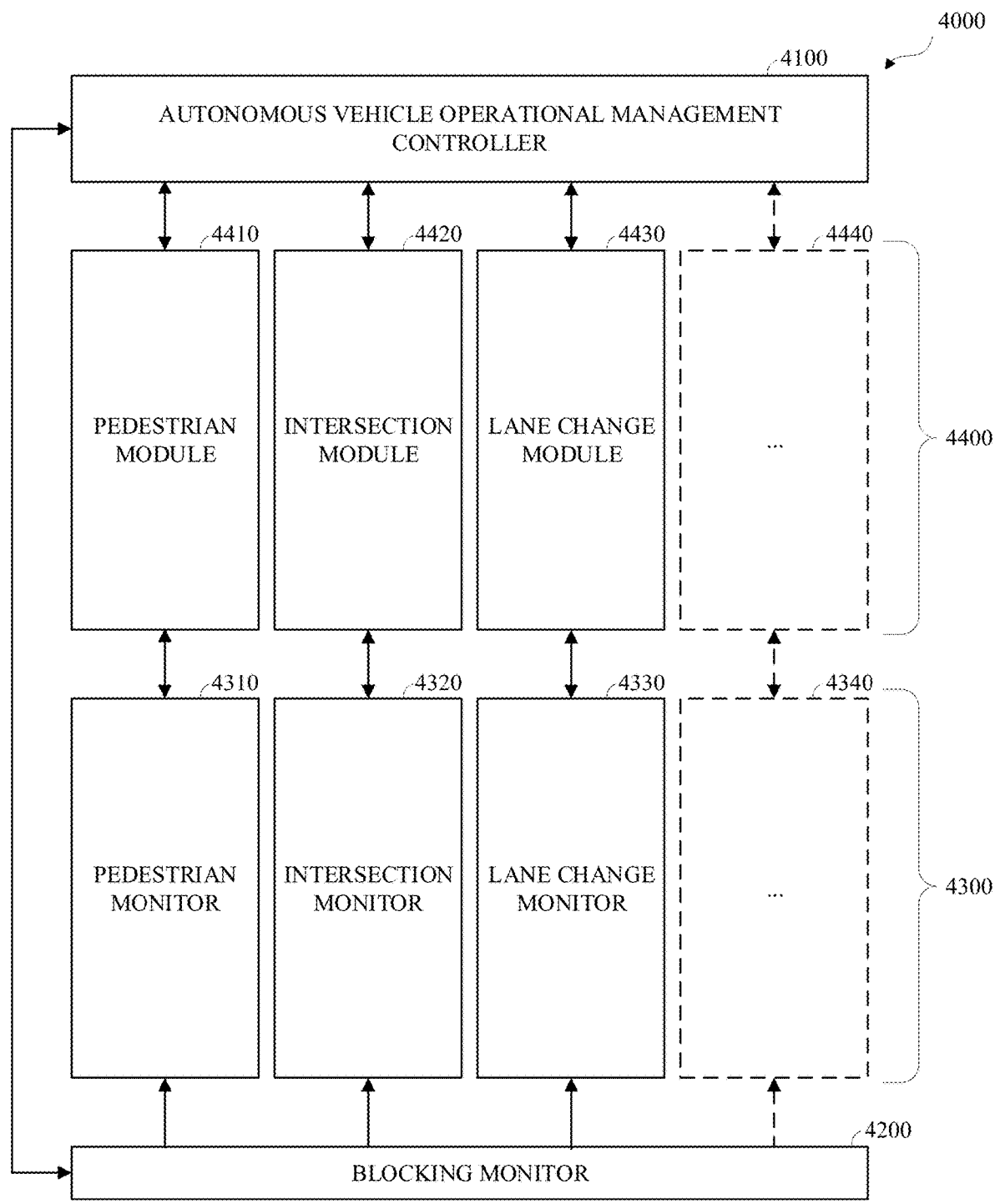
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario (also called a scenario herein) may include any distinctly identifiable set of operative conditions that may affect the operation of the autonomous vehicle within a defined spatiotemporal area, or operational environment, of the autonomous vehicle. A distinct vehicle operational scenario may be based on a number or cardinality of roads, road segments, or lanes that the autonomous vehicle may traverse within a defined spatiotemporal distance. A distinct vehicle operational scenario may be based on one or more traffic control devices that may affect the operation of the autonomous vehicle within a defined spatiotemporal area, or operational environment, of the autonomous vehicle. A distinct vehicle operational scenario may be based on one or more identifiable rules, regulations, or laws that may affect the operation of the autonomous vehicle within a defined spatiotemporal area, or operational environment, of the autonomous vehicle. A distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios include a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes. A distinct vehicle operational scenario may separately include merging lanes, or the distinct vehicle operational scenario wherein the autonomous vehicle is changing lanes may also include merging lanes.

For simplicity and clarity, similar vehicle operational scenarios may be described herein with reference to vehicle operational scenario types or classes. A type or class of a vehicle operational scenario may refer to a particular pattern or set of patters on the scenario. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

An autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

Controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, edging, or any other vehicle operation or combination of vehicle operations that may be performed by the autonomous vehicle in conjunction with traversing a portion of the vehicle transportation network.

The autonomous vehicle operational management controller 4100, or another unit of the autonomous vehicle, may control the autonomous vehicle to traverse the vehicle transportation network, or a portion thereof, in accordance with a vehicle control action. Examples of vehicle control actions include a 'stop' vehicle control action that stops or otherwise controls the autonomous vehicle to become or remain stationary, an 'advance' vehicle control action that moves the autonomous vehicle forward slowly for a short distance, such as a few inches or a foot, an 'accelerate' vehicle control action that accelerates the autonomous vehicle (e.g., at a defined acceleration rate or within a defined range), a 'decelerate' vehicle control action that decelerates the autonomous vehicle (e.g., at a defined deceleration rate or within a defined range), a 'maintain' vehicle control action that maintains the current operational parameters (e.g., a current velocity, a current path or route, a current lane orientation, etc.), a 'turn' vehicle control action (which may include an angle of a turn), a 'proceed' vehicle control action that begins or resumes a previously identified set of operational parameters, or any other standard vehicle operation.

A vehicle control action may be a compound vehicle control action, which may include a sequence, combination, or both of vehicle control actions. For example, an 'advance' or 'edge' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The autonomous vehicle operational management system 4000 may include the autonomous vehicle operational management controller 4100, a blocking monitor 4200, operational environment monitors 4300, SSOCEMs 4400, or a combination thereof. Although described separately, the blocking monitor 4200 may be an instance, or instances, of an operational environment monitor 4300.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the vehicle within a defined spatiotemporal area of the vehicle.

The operational environment information may include vehicle information for the autonomous vehicle, such as information indicating a geospatial location of the vehicle, information correlating the geospatial location to information representing the vehicle transportation network, a route of the vehicle, a speed of the vehicle, an acceleration state of the vehicle, passenger information of the vehicle, or any other information about the vehicle or the operation of the vehicle.

The operational environment information may include information representing the vehicle transportation network proximate to the autonomous vehicle, such as within a defined spatial distance (e.g., 300 meters) of the vehicle, information indicating the geometry of one or more aspects of the vehicle transportation network, information indicating a condition, such as a surface condition, of the vehicle transportation network, or any combination thereof.

The operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the vehicle.

The autonomous vehicle operational management controller 4100 may monitor the operational environment of the autonomous vehicle, or defined aspects thereof. Monitoring the operational environment may include identifying and tracking external objects, identifying distinct vehicle operational scenarios, or a combination thereof.

For example, the autonomous vehicle operational management controller 4100 may identify and track external objects with the operational environment of the autonomous vehicle. Identifying and tracking the external objects may include identifying spatiotemporal locations of respective external objects, which may be relative to the vehicle, identifying one or more expected paths for respective external objects, which may include identifying a speed, a trajectory, or both, for an external object. Descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

The operational environment monitors 4300 may include a pedestrian operational environment monitor 4310, an intersection operational environment monitor 4320, a lane change operational environment monitor 4330, or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian operational environment monitor 4310 may monitor operational environment information corresponding to multiple pedestrian vehicle operational scenarios, the intersection operational environment monitor 4320 may monitor operational environment information corresponding to multiple intersection vehicle operational scenarios, and the lane change operational environment monitor 4330 may monitor operational environment information corresponding to multiple lane change vehicle operational scenarios.

An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the pedestrian operational environment monitor 4310 may receive, or otherwise access, information, such as sensor data, which may indicate, correspond to, or may otherwise be associated with, one or more pedestrians in the operational environment of the autonomous vehicle.

An operational environment monitor 4300 may associate the operational environment information, or a portion thereof, with the operational environment, or an aspect thereof, such as with an external object, such as a pedestrian, a remote vehicle, an aspect of the vehicle transportation network geometry, or the like.

An operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information.

An operational environment monitor 4300 may output the information representing the one or more aspects of the operational environment to, or for access by, the autonomous vehicle operational management controller 4100, such by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. An operational environment monitor 4300 may output the information representing the one or more aspects of the operational environment to one or more elements of the autonomous vehicle operational management system 4000, such as the blocking monitor 4200.

The pedestrian operational environment monitor 4310 may correlate, associate, or otherwise process the operational environment information to identify, track, or predict actions of one or more pedestrians. For example, the pedestrian operational environment monitor 4310 may receive information, such as sensor data, from one or more sensors, which may correspond to one or more pedestrians. The pedestrian operational environment monitor 4310 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian operational environment monitor 4310 may output the identified, associated, or generated pedestrian information to, or for access by, the autonomous vehicle operational management controller 4100.

The intersection operational environment monitor 4320 may correlate, associate, or otherwise process the operational environment information to identify, track, or predict actions of one or more remote vehicles in the operational environment of the autonomous vehicle, to identify an intersection, or an aspect thereof, in the operational environment, to identify vehicle transportation network geometry, or a combination thereof. For example, the intersection operational environment monitor 4320 may receive information, such as sensor data, from one or more sensors, which may correspond to one or more remote vehicles in the operational environment, the intersection, or one or more aspects thereof, in the operational environment, the vehicle transportation network geometry, or a combination thereof. The intersection operational environment monitor 4320 may associate the sensor data with one or more identified remote vehicles in the operational environment, the intersection, or one or more aspects thereof, in the operational environment, the vehicle transportation network geometry, or a combination thereof, which may include identifying a current or expected direction of travel, a path, such as an expected path, a current or expected velocity, a current or expected acceleration rate, or a combination thereof for one or more of the respective identified remote vehicles, and the intersection operational environment monitor 4320 may output the identified, associated, or generated intersection information to, or for access by, the autonomous vehicle operational management controller 4100.

The lane change operational environment monitor 4330 may correlate, associate, or otherwise process the operational environment information to identify, track, or predict actions of one or more remote vehicles in the operational environment of the autonomous vehicle, such as information indicating a slow or stationary remote vehicle along the expected path of the vehicle, to identify one or more aspects of the operational environment, such as vehicle transportation network geometry in the operational environment, or a combination thereof geospatially corresponding to a current or expected lane change operation. For example, the lane change operational environment monitor 4330 may receive information, such as sensor data, from one or more sensors, which may correspond to one or more remote vehicles in the operational environment of the autonomous vehicle, one or more aspects of the operational environment, or a combination thereof geospatially corresponding to a current or expected lane change operation. The lane change operational environment monitor 4330 may associate the sensor data with one or more identified remote vehicles in the operational environment of the autonomous vehicle, one or more aspects of the operational environment, or a combination thereof geospatially corresponding to a current or expected lane change operation, which may include identifying a current or expected direction of travel, a path, such as an expected path, a current or expected velocity, a current or expected acceleration rate, or a combination thereof for one or more of the respective identified remote vehicles. The lane change operational environment monitor 4330 may output the identified, associated, or generated lane change information to, or for access by, the autonomous vehicle operational management controller 4100.

The autonomous vehicle operational management controller 4100 may identify one or multiple distinct vehicle operational scenarios based on one or more aspects of the operational environment represented by the operational environment information. The autonomous vehicle operational management controller 4100 may identify a distinct vehicle operational scenario in response to identifying, or based on, the operational environment information indicated by one or more of the operational environment monitors 4300. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the SSOCEMs 4400 based on one or more aspects of the operational environment represented by the operational environment information. For example, the autonomous vehicle operational management controller 4100 may instantiate a respective instance of a SSOCEM 4400 in response to identifying an upcoming scenario. An upcoming scenario may be a distinct vehicle operational scenario that the autonomous vehicle operational management controller 4100 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

A SSOCEM 4400, once instantiated, can receive the operational environment information, including sensor data, to determine and output a candidate vehicle control action, also called a candidate action herein. A candidate action is a vehicle control action that is identified by the particular SSOCEM 4400 as the likely optimal action for the vehicle to perform that will handle a particular scenario. For instance, a SSOCEM 4400 configured to handle intersections (e.g., an intersection SSOCEM 4420) may output a "proceed", a candidate action that suggests proceeding through an intersection. At the same time, a SSOCEM 4400 for handling lane changes (e.g., the lane change SSOCEM 4430) may output a "turn left" candidate action indicating that the vehicle should merge left by two degrees. In some implementations, each SSOCEM 4400 outputs a confidence score indicating a degree of confidence in the candidate action determined by the SSOCEM 4400. For instance, a confidence score greater than 0.95 may indicate a very high confidence in the candidate action, while a confidence score less than 0.5 may indicate a relatively low degree of confidence in the candidate action. Further details of a SSOCEM 4400 are described below.

The autonomous vehicle operational management controller 4100 receives the candidate actions and determines a vehicle control action based on the received candidate actions. In some implementations, the autonomous vehicle operational management controller 4100 utilizes hardcoded logic to determine the vehicle control action. For example, the autonomous vehicle operational management controller 4100 may select the candidate action having the highest confidence score. In other implementations, the autonomous vehicle operational management controller 4100 may select the candidate action that is the least likely to result in a collision. In other implementations, the autonomous vehicle operational management controller 4100 may generate a compound action based on two or more non-conflicting candidate actions (e.g., compounding 'proceed' and 'turn left by two degrees' to result in a vehicle control action that causes the vehicle to veer left and proceed through an intersection). In some implementations, the autonomous vehicle operational management controller 4100 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Processes (POMDP), which may describe how respective candidate actions affect subsequent candidate actions, and may include a reward function that outputs a positive or negative reward for respective vehicle control actions.

The autonomous vehicle operational management controller 4100 may uninstantiate an instance of a SSOCEM 4400. For example, the autonomous vehicle operational management controller 4100 may identify a distinct set of operative conditions as indicating a distinct vehicle operational scenario for the autonomous vehicle, instantiate an instance of a SSOCEM 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the SSOCEM 4400.

The blocking monitor 4200 may receive operational environment information representing an operational environment, or an aspect thereof, for the vehicle. For example, the blocking monitor 4200 may receive the operational environment information from the autonomous vehicle operational management controller 4100, from a sensor of the vehicle, from an external device, such as a remote vehicle or an infrastructure device, or a combination thereof. The blocking monitor 4200 may read the operational environment information, or a portion thereof, from a memory, such as a memory of the autonomous vehicle, such as the memory 1340 shown in FIG. 1.

The blocking monitor 4200 may determine a respective probability of availability, or corresponding blocking probability, for one or more portions of the vehicle transportation network. The portions may include those portions of the vehicle transportation network corresponding to an expected path of the autonomous vehicle.

A probability of availability, or corresponding blocking probability, may indicate a probability or likelihood that the autonomous vehicle will traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 4200 may identify a respective probability of availability for each of multiple portions of the vehicle transportation network within an operational environment, such as within 300 meters, of the autonomous vehicle.

A probability of availability may be indicated by the blocking monitor 4200 corresponding to each external object in the operational environment of the autonomous vehicle and a geospatial area may be associated with multiple probabilities of availability corresponding to multiple external objects. An aggregate probability of availability may be indicated by the blocking monitor 4200 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 4200 may identify external objects, track external objects, project location information, path information, or both for external objects, or a combination thereof. For example, the blocking monitor 4200 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 4200 may communicate probabilities of availability, or corresponding blocking probabilities, to the autonomous vehicle operational management controller 4100. The autonomous vehicle operational management controller 4100 may communicate the probabilities of availability, or corresponding blocking probabilities, to respective instantiated instances of the scenario-specific operational control evaluation modules 4400.

Although not expressly shown in FIG. 4, the autonomous vehicle operational management system 4000 may include a predictor module that may generate and send prediction information to the blocking monitor 4200, and the blocking monitor 4200 may output probability of availability information to one or more of the operational environment monitors 4300.

Each SSOCEM 4400 may model a respective distinct vehicle operational scenario. The autonomous vehicle operational management system 4000 includes any number of SSOCEMs 4400, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 4400 may include one or more models that are configured to determine one or more vehicle control actions for handling a scenario given a set of inputs. The models may include, but are not limited to, Partially Observable Markov Decision Process (POMDP) models, Markov Decision Process (MDP) models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 4400 includes computer-executable instructions that define a manner by which the models operate and a manner by which the models are utilized.

A SSOCEM 4400 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

A SSOCEM 4400 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represent an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

For example, a POMDP model may include an autonomous vehicle at a first geospatial location and a first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

The set of conditional observation probabilities may be identified based on the operational environment information, such as the operational environment information described with respect to the reward function.

A SSOCEM 4400 may implement a Dec-POMDP model, which may be a multi-agent model that models a distinct vehicle operational scenario. A Dec-POMDP model may be similar to a POMDP model except that a POMDP model models the vehicle and a proper subset, such as one, of external objects and a Dec-POMDP models the autonomous vehicle and the set of external objects.

A SSOCEM 4400 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 4400 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection. The autonomous vehicle then traverses the intersection using the candidate action as the vehicle control action for a temporal location. A result of traversing the intersection using the candidate action may be determined to update the RL model based on the result.

The autonomous vehicle operational management system 4000 may include any number or combination of types of models. For example, the pedestrian SSOCEM 4410, the intersection SSOCEM 4420, and the lane change SSOCEM 4430 may implement POMDP models. In another example, the pedestrian SSOCEM 4410 may implement a MDP model and the intersection SSOCEM 4420 and the lane change SSOCEM 4430 may implement POMDP models. Further, the autonomous vehicle operational management controller 4100 may instantiate any number of instances of the SSOCEMs 4400 based on the operational environment information. A module 4440 is shown using broken lines to indicate that the autonomous vehicle operational management system 4000 may include any number or additional types of SSOCEMs 4400.

One or more of the autonomous vehicle operational management controller 4100, the blocking monitor 4200, the operational environment monitors 4300, or the SSOCEMs 4400, may operate continuously or periodically, such as at a frequency of ten hertz (10 Hz). For example, the autonomous vehicle operational management controller 4100 may identify a vehicle control action many times, such as ten times, per second. The operational frequency of each component of the autonomous vehicle operational management system 4000 may be synchronized or unsynchronized, and the operational rate of one or more of the autonomous vehicle operational management controller 4100, the blocking monitor 4200, the operational environment monitors 4300, or the SSOCEMs 4400 may be independent of the operational rate of others.

In some implementations, an SSOCEM may be configured to autonomously complete some tasks while requiring the intervention of a human to complete other tasks. That is, an SSOCEM can operate autonomously under certain conditions, but may require human intervention or aid in order to achieve its goal (e.g., crossing an intersection). As such, the SSOCEM can be in one of two binary autonomous states or levels.

For example, in response to detecting an obstacle on the road (i.e., on a portion of a vehicle transportation network), an SSOCEM may issue a request for assistance to a tele-operator. The tele-operator can be a human operator that is responsible for remotely monitoring and assisting one or more autonomous vehicles. The tele-operator can cause sensor data (e.g., camera images and/or video) to be streamed to the tele-operator so that the tele-operator can gain situational awareness and plot a navigation path for the AV around the obstacle and/or remotely control the actions of the AV.

In another example, a lane-traversal SSOCEM may use lane markers to maintain an AV within a lane. In some situations, the lane-traversal SSOCEM may no longer be able to demarcate the lane boundaries, such as in a case where the sensors may be dirty or have malfunctioned or the lane markers are covered with snow or mud. In such situations, the lane-traversal SSOCEM may request that a human (e.g., a driver occupant of the AV or a tele-operator) assume control of the AV.

Reliance on human assistance (i.e., intervention) can be indicative of the limited competence of the SSOCEM in its autonomy model. Human intervention can be costly. For example, it may take a relatively long period of time for a tele-operator to respond to a request for assistance from an AV. In the meantime, the AV may be obstructing traffic. For example, as the number of tele-operator requests for assistance from AV increases, the number of available tele-operators needs to necessarily increase.

In some examples, an SSOCEM can be, or can include, an autonomy cognizant agent (ACA) that selects a next action to perform and an autonomy level for performing the action in based on an autonomy model that the ACA maintains and evolves. For example, initially, the autonomy model can indicate that the ACA is to seek human assistance (e.g., feedback) for an action given a detected environment state. As the ACA receives more and more feedback, such as from the human, the ACA can become less and less reliant on the human assistance becomes the ACA learns when it is appropriate to perform an action under lesser levels of assistance, which means higher of autonomy (i.e., competence). As such, the ACA can be said to be, or thought of as being, aware of its level of competence.

An ACA can consider all levels of autonomy available to it during plan generation (as opposed to, for example, adjusting the level of autonomy during plan execution). As such, the ACA can create plans that more effectively utilize the ACA's knowledge of its own levels of autonomy. The ACA can model multiple forms of human feedback, thereby enabling the ACA to proactively plan in a manner that also considers the likelihood of each form of human feedback. As such, the ACA can preemptively avoid situations where negative feedback is likely.

Furthermore, the ACA can maintain a predictive model of the human feedback and intervention through experience enabling the ACA to diminish the reliance of the ACA on humans over time by avoiding situations which are more likely to require human intervention as well as well as adjust the levels of autonomy of the ACA over time. As such, the ACA can perform at the least-cost level of autonomy for any situation (i.e., environment state) that the ACA encounters (i.e., detects based on sensor data).

The ACA can then use the autonomy model in to traverse the vehicle transportation network.

Figure 5:
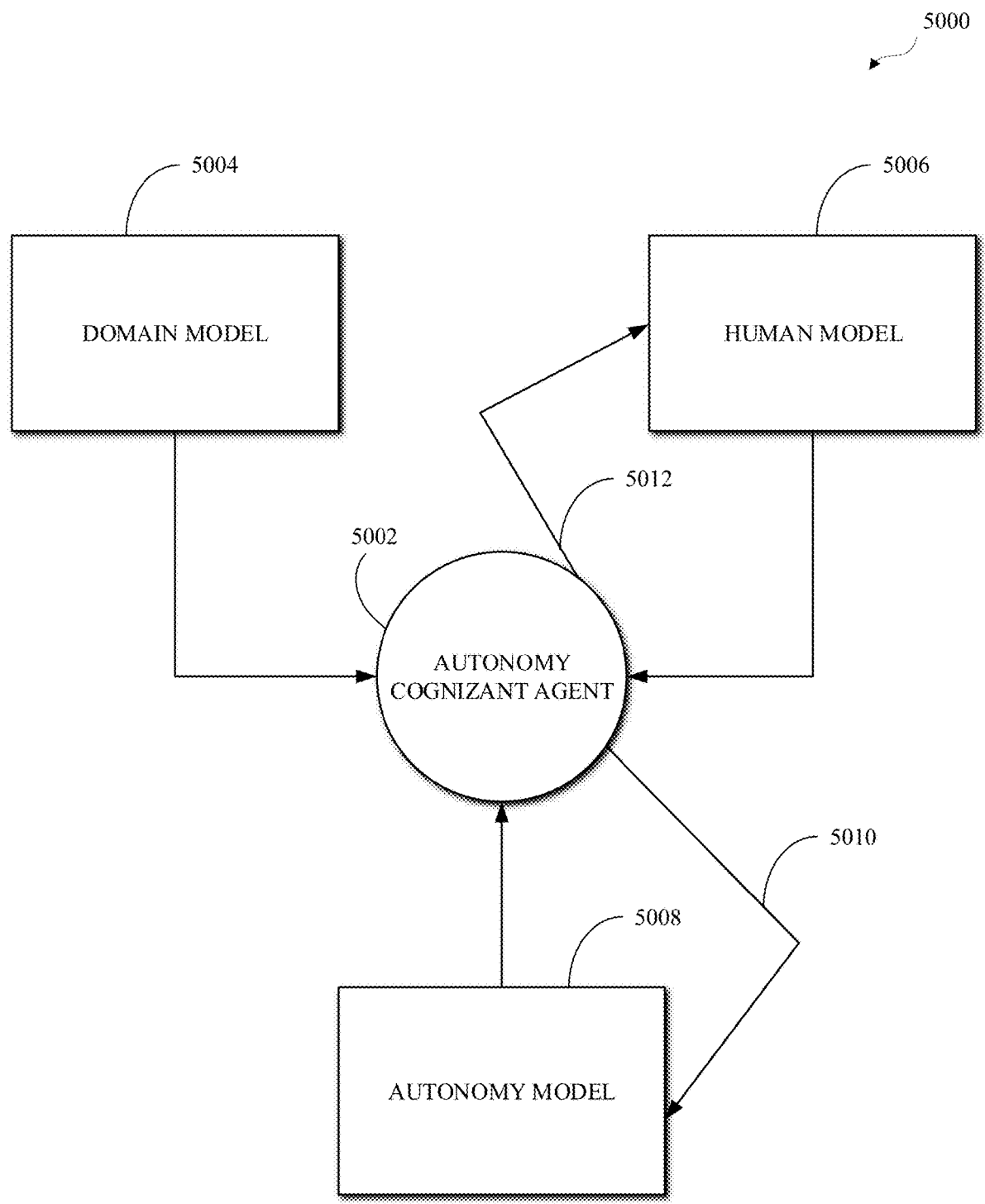
FIG. 5 is a diagram of an example of a competence aware system (CAS) in accordance with embodiments of this disclosure

FIG. 5 is a diagram of an example of a competence-aware system (CAS) 5000 in accordance with embodiments of this disclosure. The CAS 5000 includes an autonomy cognizant agent (ACA) 5002. Any of the SSOCEM, such one of the SSOCEM 4410, 4420, 4430, 4440 of FIG. 4 can be an ACA, as described below with respect to the ACA 5002. The ACA 5002 can have multiple levels of autonomy. The CAS 5000 can be the autonomous vehicle operational management system 4000 of FIG. 4.

The ACA 5002 uses as input a domain model (DM) 5004, a human model (HM) 5006, and an autonomy model (AM) 5008. The HM 5006 can also be referred to as a feedback model. The ACA 5002 updates the HM 5006, as illustrated by an arrow 5012 and as further described below. The ACA 5002 updates the AM 5008, as illustrated by an arrow 5010.

The DM 5004 can model the environment (i.e., the operational environment) that the ACA 5002 is operating in, as described above.

The AM 5008 can model the levels of autonomy that the ACA 5002 can operate in, when (e.g., under what conditions or constraints) the ACA 5002 can be allowed to operate at each of the autonomy levels, and what are the respective utilities of the levels of autonomy. Utility can indicate the expected value of executing a vehicle control action in the respective autonomy level. The utility values can be used to represent preferences among the autonomy levels.

The HM 5006 can describe a feedback model that models the feedback that the ACA 5002 can receive from the human (e.g., a tele-operator), how costly each type of feedback is, and how likely is the ACA 5002 to receive each type of feedback.

As mentioned, the DM 5004 can model the environment (i.e., the operational environment) that the ACA 5002 is operating in. For example, the DM 5004 can describe (e.g., include) transition and/or cost dynamics of the environment with respect to the ACA 5002. In an example, the DM 5004 can be modeled as a Stochastic Shortest Path (SSP) problem. As is known, SSP is a formal decision-making model for reasoning in fully observable, stochastic environments where the objective can be to find the least-cost path from a start state to a goal state. For example, the goal of the ACA 5002 may to be successfully traverse an intersection. As such, a start state can be a first temporal location before the intersection (e.g., 50 meters before the intersection) and the goal state can be a second temporal location after passing the intersection (e.g., 50 meters after the intersection). As the ACA 5002 is approaching the intersection, the ACA 5002 plans a trajectory, including a set of actions, to accomplish the goal. As a result of the planning, the ACA 5002 selects, according to the HM 5006 and the AM 5008, a next action to perform in an autonomy level.

The DM 5004 can be formally modeled as tuple $\langle S,A,T,C,s_o,s_g \rangle$. S can be a finite set of states (i.e., a set of sets of operational environment information). A can be a finite set of actions (i.e., a set of vehicle control actions). T (i.e., $T:S \times A \times S \rightarrow [0,1]$) can represent the probability of reaching a state $s' \in S$ after performing an action $a \in A$ in state $s \in S$. C (i.e., $C:S \times A \rightarrow C$) can represent the expected immediate cost of performing an action $a \in A$ in state $s \in S$. $s_0$ can be an initial state. $s_g$ can be a goal state such that $\forall a \in A$, $T(s_g,a,s_g)=1$ and $C(s_g,a)=0$, which indicates that once the goal state $s_g$ is reached, the system remains in the goal state no matter which action is then taken and that every action taken in the goal state $s_g$ has a cost of 0.

A solution to the SSP of the DM 5004 can be a policy $\pi:S \rightarrow A$. That is, under the policy $\pi$, an action a (i.e., $\pi(s)$) is selected for a state s. That is, the policy $\pi$ can indicate that the action $\pi(s) \in A$ should be taken in state s. The policy $\pi$ can include a value function $V^\pi:S \rightarrow C$ that can represent the expected cumulative cost $V^\pi(s)$ of reaching the goal state, $s_g$, from a state s following the policy $\pi$. That is, the value function provides a cost (i.e., a value) for each intermediate state $s_i$, from the start state until the goal state is reached. An optimal policy, $\pi^*$ minimizes the expected cumulative cost.

Thus, for every state configuration of interest, the policy can be used to determine an action that the AV will take in that state. A descriptive example of a state can be "pedestrian ahead of AV" and "AV at stop sign." Such a state can have associated the action "stop" to avoid hitting the pedestrian. Another descriptive example of a state can be "AV inside intersection" and "other vehicle at stop sign." Such a state can have associated the action "go" so that the AV can complete crossing the intersection.

Intuitively stated, the DM 5004 can include a descriptor for how the world (i.e., the operational environment) changes with one time step for all the combinations of states. The DM 5004 can include a notion of good states and bad states. That is, the DM 5004 can include descriptors of what configurations of the world are good. For example, in the scenario of crossing an intersection, a good state is a state in which the AV completes crossing the intersection; and a bad state may correspond with the AV colliding with another vehicle or a state in which the AV violated a law. A negative reward can be associated with a bad state and a positive reward can be associated with a good state. Given such descriptors and rewards, an optimal policy $\pi^*$, which is a set of actions (or equivalently, a path through the operational environment), that maximizes can reward, can be computed as a function of how the operational environment evolves over time.

As mentioned, the AM 5008 can model the extent of autonomous operation (i.e., the autonomy level) that the ACA 5002 can operate in. An autonomy level can indicate both the actual different forms or extents of autonomous operations (as described below with respect to the set of levels of autonomy $\mathcal{L}$) as well as when each of the autonomy levels can be allowed under some external constraints (as described below with respect to an autonomy profile $\kappa$).

The AM 5008 can be formally modeled as a tuple $\langle \mathcal{L}, \kappa, \mu \rangle$, where $\mathcal{L}$ denotes a set of autonomy levels, $\kappa$ denotes an autonomy profile, and $\mu$ denotes a utility function.

$\mathcal{L} = \{l_0, \ldots, l_n\}$ can be the set of levels of autonomy. Each autonomy level $l_i$ can correspond to a set of constraints on the autonomous operation of the ACA 5002. In an example, the set of action $\mathcal{L}$ can be a partially ordered set (i.e., a poset). That is, the actions of the set $\mathcal{L}$ have an order or sequence indicating, for example, in increasing level of autonomy.

In an example, the levels of autonomy of the set $\mathcal{L}$ can include four levels of autonomy; namely a "no-autonomy" level (i.e., $l_0$), a "verified-autonomy" level (i.e., $l_1$), a "supervised-autonomy" level (i.e., $l_2$), and an "unsupervised-autonomy" level (i.e., $l_4$). The disclosure herein is not limited to such autonomy levels set, $\mathcal{L}$. That is, other autonomy levels with different semantics are possible.

The "no-autonomy" level, $l_0$, can indicate that the ACA 5002 requires a human to perform the action for instead of the ACA 5002. The no-autonomy level can be summarized as the AV requesting that the human completely control the AV so that the human can get the AV out of a situation (e.g., an obstruction scenario).

The "verified-autonomy" level, $l_1$, can indicate that the ACA 5002 must query for, and receive, explicit approval from a human operator, before even attempting a selected (e.g., identified, determined, etc.) action. For example, in a sequence of actions (i.e., a plan) determined by the ACA 5002, the ACA must ask for explicit approval for each action before the action is performed.

The "supervised-autonomy" level, $l_2$, can indicate that the ACA 5002 can perform the action autonomously as long as there is a human supervising (e.g., remotely, or otherwise, monitoring) the ACA 5002. In the "supervised-autonomy" level, $l_2$, the human can intervene in the case that something goes wrong while the action is being autonomously performed. For example, a sequence of actions can be performed as long as a human is supervising the AV. If before or after performing an action of the sequence of actions, a failure is detected, then the ACA can request human (e.g., tele-operator) assistance.

To clarify the delineation between "verified-autonomy" level, $l_1$, and "supervised-autonomy" level, $l_2$, an example is now given. In "supervised-autonomy" level, $l_2$, the monitoring need not be remote. For example, an AV's testing procedure can be considered "supervised autonomy" as the AV can drive autonomously, but only with a supervising human in the AV who can be ready to override the AV and take control in dangerous situations. As a further delineation, "verified-autonomy" level, $l_1$, can require that the ACA receive explicit permission from a human (who may be either in the AV or remote), before executing the desired action. In particular, receiving explicit permission can mean that the ACA should stop until it receives the permission. On the other hand, in the "supervised-autonomy" level, $l_2$, there is no such requirement as long as there is a supervising human. That is, the ACA need not stop and can continuously perform its desired action, relying on the supervising human authority to override in the case of potential danger.

The "unsupervised-autonomy" level, $l_3$, can indicate that the ACA 500 can be in full autonomous operation without requiring approval, supervision, or monitoring by a human.

The autonomy profile, $\kappa$ (i.e., $\kappa:S \times A \rightarrow P(\mathcal{L})$), can map a state $s \in S$ and an action $a \in A$ to a subset of the set of autonomy levels, $\mathcal{L}$. $P(\mathcal{L})$ denotes the powerset of the set $\mathcal{L}$ of autonomy levels. The autonomy profile $\kappa$ can prescribe constraints on the allowed levels of autonomy for any situation (i.e., a state of the DM 5004). Given a current state of the environment and an action to be performed next, the autonomy profile, $\kappa$, defines a set of acceptable autonomy levels.

The constraints can be, or can include, hard constraints. For example, a constraint can be a technical, legal, or ethical constraint. To illustrate, a non-limiting example of a legal constraint can be that an autonomous vehicle cannot operate autonomously (i.e., at the unsupervised-autonomy level, $l_4$) in a school zone. A non-limiting example of a social constraint can be a rule of the road whereby when a traffic signal turns green, on-coming traffic yields to the first left-turning vehicle. Thus, a constraint is that the first left-turning vehicle must proceed instead of waiting for the traffic to clear.

The constraints can be, can include, or can be used as, temporary conservative constraints that can be updated over time as the ACA 5002 improves. The autonomy profile $\kappa$ can constrain the space of all policies ($\pi$) so that the ACA 5002 is only allowed to follow a policy that never violates the autonomy profile $\kappa$.

In the AM 5008, $\mu$ of the tuple $\langle \mathcal{L}, \kappa, \mu \rangle$ can represent the utility, $r \in \mathbb{R}$, of performing action $a \in A$ at autonomy level $l' \in \mathcal{L}$ given that the ACA 5002 is in a state $s \in S$ and just operated in level $l \in \mathcal{L}$; that is, $\mu:S \times \mathcal{L} \times A \times \mathcal{L} \to \mathbb{R}$. As such, the utility $\mu$ can be denoted as $\mu:S \times \mathcal{L} \times A \times \mathcal{L} \to \mathbb{R}$.

The utility $\mu$ represents the following: Given that an action at timestep t was performed at autonomy level l, what is the utility of performing another action at timestep t+1 at another autonomy level l'? The action at timestep t+1 need not be, but can be, the same action as that taken at timestep t. There may be a negative utility associated with swapping autonomy levels in some situations. For example, in a dynamic situation (e.g., a complex intersection), in which the ACA may, given no utility $\mu$, swap between "supervised autonomy" and "unsupervised autonomy" at every time step. The constant swapping of autonomy levels may in fact be more discomforting to a human who must constantly make an attention swap, than simply remaining in "supervised" mode the entire time.

As further described below, the AM 5008 can evolve. That is, the AM 5008 can be trained, based on the experiences of the ACA 5002. To illustrate, assume that a first AV is to be deployed to a first market (e.g., Japan) and a second AV is to be deployed to a second market (e.g., France). The first AV and the second AV may initially include the same autonomy model, which operates in the binary autonomy modes. That is, either the AV can confidentially handle a situation that it is programmed a priori to recognize and traverse or the AV requests human (e.g., tele-operator) assistance. As each of the first market and the second market may have different (e.g., social) rules of the road, the autonomy model of the first AV evolves differently from the autonomy model of the second AV based on feedback that each receives from humans. Once an autonomy model learns of the situations that it is competent to handle in its respective market, the ACA no longer needs to request human (e.g., tele-operator) assistance for the learned situations (i.e., scenarios.

As mentioned above, the HM 5006 (i.e., the feedback model) can model the belief of the ACA 5002 about the interactions of the ACA 5002 with a human operator. The HM 5006 can be formally represented as a tuple $\langle \Sigma, \lambda, \rho, \tau \rangle$, where $\Sigma$ denotes a set of feedback signals, denotes a feedback profile, $\rho$ denotes a human cost function, and $\tau$ denotes a human state transition function.

$\Sigma = \{\sigma_0, \ldots, \sigma_n\}$ can be a set of possible feedback signals that the ACA 5002 can receive from the human operator. The feedback profile, $\lambda$, can represent the probability that the ACA 5002 receives a signal $\sigma \in \Sigma$ when performing the action $a \in A$ at an autonomy level $l' \in \mathcal{L}$ given that the ACA 5002 is in a state $s \in S$ and the ACA 5002 just operated in an autonomy level $l \in \mathcal{L}$. As such, the feedback profile $\lambda$ can be represented symbolically as $\lambda: S \times \mathcal{L} \times A \times \mathcal{L} \to \Delta^{|\Sigma|}$.

"Just operated in" can mean the following: At a timestep t, "just operated in" can mean the level of autonomy that the action the ACA took at timestep t−1 was performed in. As an example, assume that at timestep t the ACA performed action a at autonomy level $l_2$ (i.e., "supervised-autonomy"). As such, the human is already engaged and observing the behavior of the ACA. If, at timestep t+1, the ACA performs an action a' again at autonomy level $l_2$, the probability that the human will override the action a' may be lower than if the ACA performed action a at autonomy level $l_3$ (i.e., "unsupervised-autonomy") in which case the human may be more surprised and hence may be more likely to override the action.

The human cost function, $\rho$, can return a positive cost to the human of performing action $a \in A$ at an autonomy level $l' \in \mathcal{L}$ given that the ACA 5002 is in a state $s \in S$ and the ACA 5002 just operated in autonomy level $l \in \mathcal{L}$. The human cost function, $\rho$, can be represented symbolically as $\rho: S \times \mathcal{L} \times A \times \mathcal{L} \to \mathbb{R}^+$.

The human state transition function, $\tau$, can represent the probability of the human (e.g., tele-operator) taking the ACA 5002 to state $s' \in S$ when the ACA 5002 selected to perform an action $a \in A$ in a state $s \in S$ and the human took control over the AV. "Taking the ACA 5002 to a state s" means that the human operates the AV so that the state s is realized. The human state transition function, $\tau$, can be represented symbolically as $\tau: S \times A \to \Delta^{|S|}$. For example, assume that the state is s (e.g., s="at an intersection") and the ACA intends to take action a (e.g., a="make a left turn"), but the human overrides the ACA and takes over control. In this case, the human state transition function, $\tau$, represents the probability that the human takes the ACA to some state (e.g., completes the left turn or, instead, goes straight) given the state the ACA was in (i.e., the state s) and the action the agent intended to take (i.e., make a left turn).

It is noted that, in practice, the feedback profile, $\lambda$, and the human state transition function, $\tau$, are not known a priori. As such, the ACA 5002 can maintain respective estimates of the feedback profile, $\lambda$, and the human state transition function, $\tau$, based on previous data the ACA 5002 gathers in the same or similar situations. Updating the HM 5006 is illustrated by an arrow 5012. As such, after the ACA 5002 performs an action (in an action execution stage), the system 5000 can record the feedback that the ACA 5002 receives from the human operator, if any, and can use the feedback to update at least one of the feedback profile, $\lambda$, or the human state transition function, $\tau$.

The system 5000 (i.e., the competence-aware system (CAS)), and more specifically, the ACA 5002, can be thought of as being (e.g., defining, determining, etc.) a solution to a problem that combines the DM 5004, the HM 5006, and the AM 5008 in the context of automated planning and decision making.

While the DM 5004 can represent the fundamental underlying SSP that the ACA 5002 finds a solution to, the ACA 5002 can use the AM 5008 to proactively generate plans that operate across multiple levels of autonomy (e.g., for and using the different autonomy levels). This is to be contrasted with autonomy agents that may adjust a plan during the plan execution. The proactively generated plans can be subject to a set of constraints $\kappa$. The ACA 5002 can use the HM 5006 to predict the likelihood of each feedback signal ahead of time so that the ACA 5002 can avoid situations that the ACA 5002 is unlikely to be able to operate autonomously in.

The system 5000 can combine all three of the DM 5004, the HM 5006, and the AM 5008 into one decision-making framework. The system 5000 (and more specifically, the ACA 5002) is used to solve the problem of generating a policy for accomplishing its task (e.g., successfully crossing an intersection).

The problem can be defined formally as an extended SSP, the details of which are now presented. The competence-aware system (CAS) can be represented as a tuple $\langle \bar{S}, \bar{A}, T, \bar{C}, \bar{s}_0, \bar{s}_g \rangle$, where $\bar{S} = S \times \mathcal{L}$ is a set of factored states, where S is the set of domain states and $\mathcal{L}$ is the set of levels of autonomy; (in MDP, a "factored state" is a state that can be represented as a vector of distinct components or features; thus, a "factored state" $\bar{s}$ is a state that can be formally represented as a vector of features <feature$_1$, feature$_2$, ..., feature$_n$> for some set of features);

$\bar{A} = A \times \mathcal{L}$ is a set of factored actions, where A is the set of domain actions and $\mathcal{L}$ is the set of levels of autonomy;

$T: \bar{S} \times \bar{A} \rightarrow \Delta^{|\bar{S}|}$ is a transition function that includes a state transition function $T_{l_i}: S \times A \rightarrow \Delta^{|\bar{S}|}$ for each autonomy level $l_i$ in the set $\mathcal{L}$ of autonomy levels; ($\Delta^{|\bar{S}|}$ represents the simplex of dimension $|\bar{S}|$, which represents a probability distribution over $\bar{S}$ given a state s in S and an action a in A. For example, given a state s in S and an action a in A, under the notation, T(s,a) can be thought of as a list [$(p_1,s_1), (p_2,s_2), \ldots, (p_n,s_n)$] where $p_i$ is the probability of reaching state $s_i$ given the tuple (s,a));

$\bar{C}: \bar{S} \times \bar{A} \rightarrow \mathbb{R}^+$ is a positive cost function that includes C (i.e., the expected immediate cost of performing an action $a \in A$ in state $s \in S$), the utility $\mu: \bar{S} \times \bar{A} \rightarrow \mathbb{R}$, and the human cost function $\rho: \bar{S} \times \bar{A} \rightarrow \mathbb{R}^+$;

$\bar{s}_0 \in \bar{S}$ is the initial state such that $\bar{s}_0 = \langle s_0, l \rangle$ for some autonomy level $l \in \mathcal{L}$; and $\bar{s}_g \in \bar{S}$ is the goal state such that $\bar{s}_g = \langle s_g, l \rangle$ for some autonomy level $l \in \mathcal{L}$.

As mentioned, a solution to the above extended SSP problem is a policy π that maps states and autonomy levels $\bar{s} \in \bar{S}$ to actions and autonomy levels $\bar{a} \in \bar{A}$. That is, given that the ACA was just in state $\bar{s} = (s,l)$, $\pi(\bar{s})$ returns some action $\bar{a} = (a,l)$ for the ACA to take. In general $\pi(\bar{s})$ returns the best (e.g., cost-optimal) action for the ACA to take. The space of policies π that the ACA 5002 can solve for can be restricted by constraints, as described above with respect to the autonomy profile κ. The space of policies π that the ACA 5002 can solve for can be restricted as follows.

Let $\bar{a} = \langle a, l \rangle$ be a factored action of the set of factored actions, $\bar{A}$. Given a factored state $\bar{s} = \langle s, l' \rangle$ of the set of factored states $\bar{S}$, the combination of the factored state and action, $(\bar{s}, \bar{a})$, can be allowed if the action $l \in \kappa(s,a)$. That is, the combination of the factored state and action, $(\bar{s}, \bar{a})$ is allowed if the combination of the action $\bar{a}$ and the state $\bar{s}$ is allowed under the autonomy profile κ. Additionally, a policy π can be allowed if for every state $\bar{s} \in \bar{S}$, the combination of the state $\bar{s}$ and the action under the policy π, (i.e., $(\bar{s}, \pi(\bar{s}))$), is allowed. Let Π denote the set of all policies. As such the policy $\pi \in \Pi$. The set of allowed policies can be denoted $\Pi_\kappa$. A solution to the above extended SSP problem can be required to be taken from $_{\pi \in \Pi_\kappa} J(\pi)$. $J(\pi)$ represents the expected cost that the ACA will receive when following the policy π starting in the initial state as defined in the SSP definition.

Because policies are restricted to be chosen from $\Pi_\kappa$, if the autonomy profile κ is altered, so too is the space of allowed policies. This in turn can mean that the optimal policy, $\pi^*$, can be, intuitively, only as good as the function κ. Hence there is a trade-off when deciding the initial constraints (κ) on the allowed autonomy.

In an implementation, a conservative approach, which constrains the system significantly, can be selected, such as by setting $|\kappa(s,a)| = 1$ for every $(s,a) \in S \times A$, thereby reducing the problem complexity to solving the underlying domain model with deterministic levels. However, doing so risks a globally suboptimal policy with respect to the level of autonomy $\mathcal{L}$ and may, depending on the initial autonomy profile, κ, make reaching the globally optimal policy impossible.

In another implementation, a risky approach can be chosen by not constraining the system at all a priori, thereby leaving the decision of choosing a level of autonomy completely up to the system. This approach, while necessarily containing the optimal policy (subject to the ACA's model) is naturally slower due to the larger policy space and inherently less safe as the ACA can take actions in undesirable levels, in some sense defeating the entire purpose of the model.

In yet another implementation, in most domains, the ideal initialization can be somewhere closer to the middle of the above extremes. The autonomy profile κ can be less constraining in situations where the expected cost of failure is relatively low, and more constraining in situations where the cost of failure is high. For instance, in an AV, the autonomy profile κ can be more constraining initially in situations involving pedestrians, poor visibility, or chaotic environments such as large intersections with multiple vehicles; however, driving along a highway is generally low-risk and may benefit much less from a constrained autonomy profile.

FIGS. 6A-6D illustrate different operational scenarios 6100-6400 for which explanations are desirable according to implementations of this disclosure.

Figure 6A:
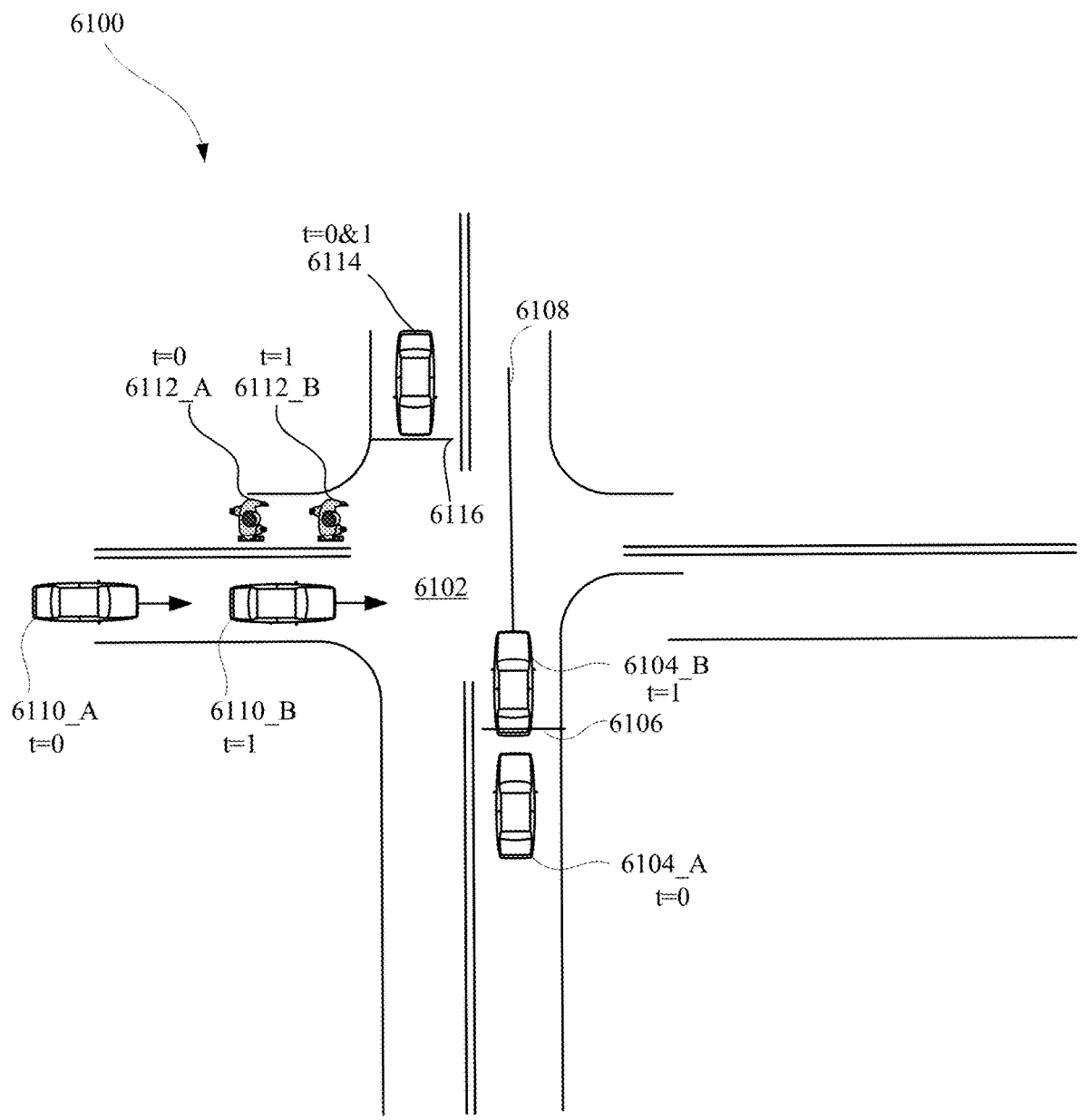
FIGS. 6A-6D illustrate different operational scenarios for which explanations are desirable according to implementations of this disclosure.

The operational scenario 6100 of FIG. 6A illustrates an intersection 6102. A vehicle 6104 is approaching the intersection 6102. A stop line 6106 (e.g., a stop sign) is a line where the vehicle 6104 may stop or yield to ensure that it can safely proceed along a trajectory 6108 (i.e., a path). The goal of the vehicle 6104 is to safely traverse the intersection from the current side of the vehicle 6104 to the other side. The vehicle 6104 can be the vehicle 1000 of FIG. 1. The vehicle 6104 can be one of the vehicles 2100/2110 of FIG. 2. The vehicle 6104 can include an autonomous vehicle operational management system, such as the autonomous vehicle operational management system 4000 of FIG. 4. As such, the vehicle 6104 can be an autonomous vehicle or can be a semi-autonomous vehicle.

The operational scenario 6100 also includes a vehicle 6110 that is approaching the intersection 6102 from the left side of the vehicle 6104, a pedestrian 6112 is crossing the intersection 6102 along the same direction as the vehicle 6110, a vehicle 6114, which is in the opposite-lane traffic as the vehicle 6114 is stopped at a stop line 6116.

The vehicle 6110 has the right of way and does not have a stop sign. Thus, vehicle 6110 can proceed through the interaction without stopping first. However, the vehicle 6110 begins slowing down to a stop before crossing the path of the vehicle 6104. Thus, the intersection 6102 is a T-like intersection with respect to the vehicle 6104.

At a first time step, $t_0$, the vehicle 6104 stops at the stop line 6106 at a position 6104_A, then the vehicle 6104 edges slowly forward; the vehicle 6110 is at a position 6110_A, has the right of way, and is traveling at high speed; the vehicle 6114 is yielding to the pedestrian 6112, who is at a position 6112_A; and the pedestrian 6112 is traveling on a crosswalk and blocking the vehicle 6114 and the vehicle 6104.

At a next time step, $t_1$, the vehicle 6104 continued edging forward and then slowed down to come to a stop at a position 6104_B so as not to cross the path of the vehicle 6110; the vehicle 6110 continues at a high speed into the intersection 6102 and is now at a position 6110_B; and the pedestrian 6112 continued crossing the road and is now at a position 6112_B.

It is desirable to provide a human-understandable explanation as to why the vehicle 6104 stopped, then edged, and then stopped again.

Figure 6B:
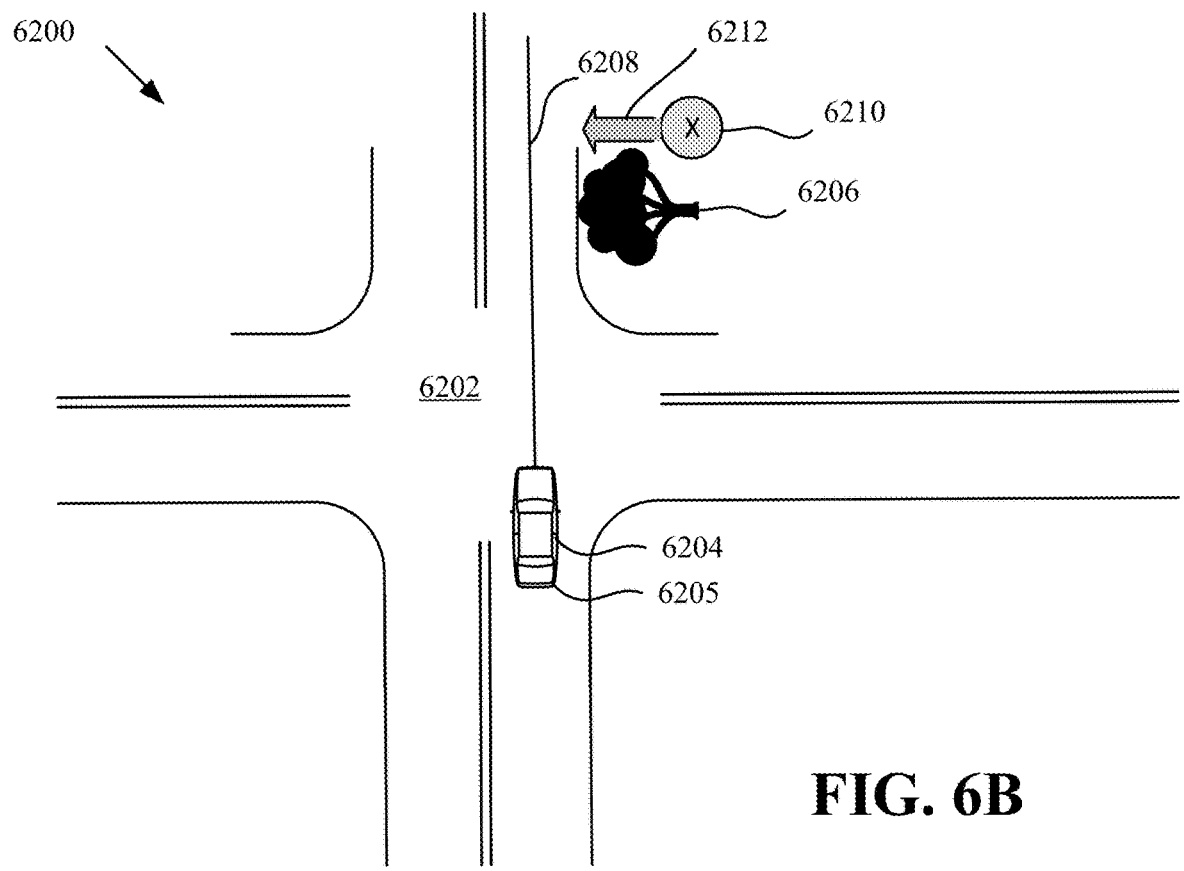

The operational scenario 6200 of FIG. 6B illustrates an intersection 6202 and a vehicle 6204. The vehicle 6204 can be similar to the vehicle 6104 of FIG. 6A. In the operational scenario 6200, the vehicle 6204 performs a stop action after having passed a stop line 6205 along a trajectory 6108 (i.e., a path). The vehicle 6204 performed the stop action even though there are no obstructions in the path of the vehicle 6204. The reason that the vehicle 6204 stopped may have been due to a faulty sensor. The vehicle 6204, using the faulty sensor data, detected a non-existent pedestrian 6210 behind a tree 6206. The vehicle 6204 stopped because it predicted that the non-existent pedestrian 6210 will walk in front of the vehicle 6204, as illustrated by an arrow 6212.

An explanation as to why the vehicle 6204 stopped is desirable. An explanation would allow a developer, who is debugging the issue, to understand why the vehicle 6204 erroneously stopped. For example, the developer may want to understand whether there is a perception issue with at least one sensor of the vehicle 6204. For example, sensor noise may be mis-classified as the non-existent pedestrian 6210 behind the tree 6206. A passenger of the vehicle 6204, who may be confused and awkwardly waiting for the vehicle 6204 to continue moving, would want to ask for an explanation as to why the vehicle 6204 stopped. An explanation to the passenger can be along the lines of "I stopped because I am uncertain whether a pedestrian is behind the tree." The explanation may be followed by "Can you confirm that there's no pedestrian jumping out from behind the tree?" The passenger may respond with "no" and the vehicle 6204 can then proceed. A tele-operator, who is asked to remotely help quickly resolve the issue (i.e., that the vehicle 6204 has stopped for a relatively long time) may first want to quickly gain situational awareness by asking for the explanation as to why the vehicle 6204 stopped.

Figure 6C:
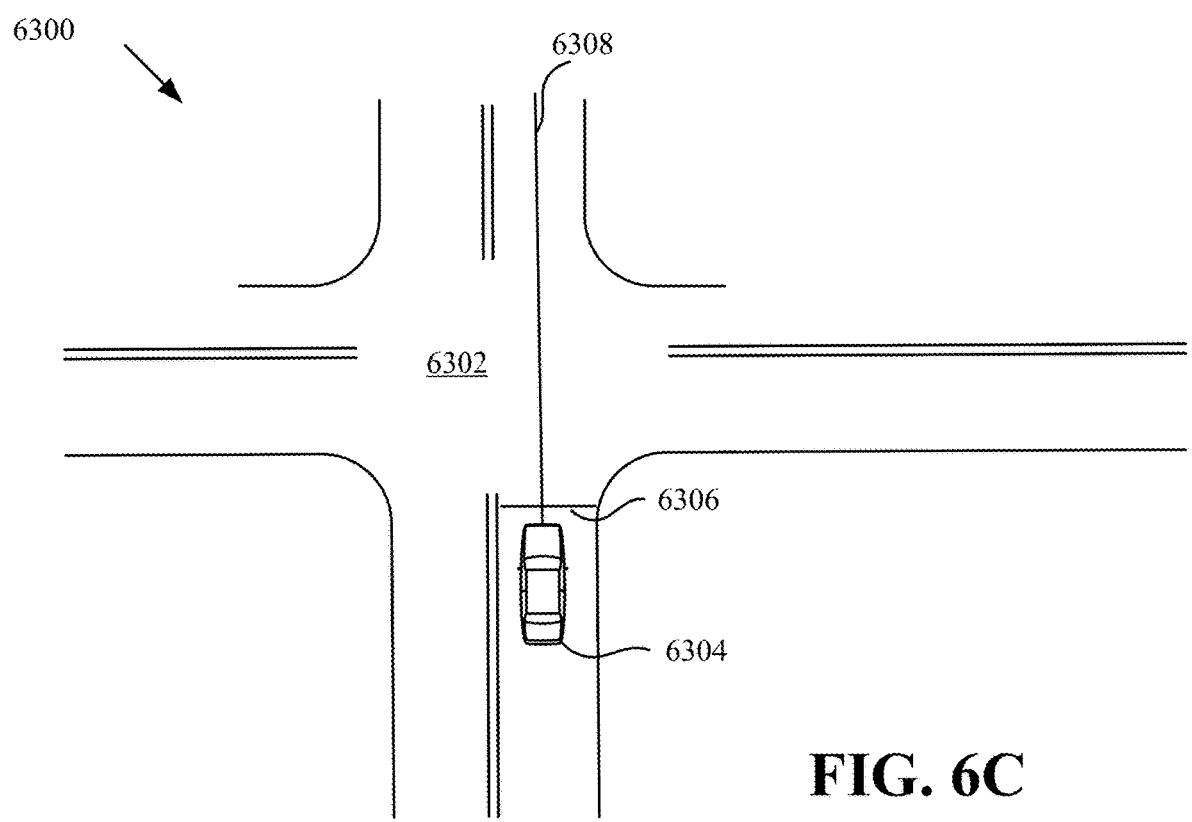

The operational scenario 6300 of FIG. 6C illustrates an intersection 6302 and a vehicle 6304 that is traveling along a trajectory 6308 to the other side of the intersection 6302. The vehicle 6304 can be similar to the vehicle 6104 of FIG. 6A. The intersection 6302 is a T-like intersection from the point of view of the vehicle 6304. The vehicle 6304 can be one of a fleet of AVs that are equipped (e.g., programmed, outfitted, etc.) with similar autonomous driving capabilities (e.g., logic, reasoning, sensors, etc.). The operational scenario 6300 illustrates that the vehicle 6304 and all AVs of the fleet request tele-operator assistance at this intersection even though, given sensor data (e.g., video from cameras, LIDAR, etc.), there seems to be nothing strange in the scene and that there are no obstructions.

The vehicle 6304 determines that is it obstructed and/or is sufficiently uncertain about certain aspects (e.g., one or more state factors) of the operational scenario 6300. The vehicle 6304 (and all other AVs of the fleet) stop at a stop line 6306, determines that it cannot proceed (for whatever reason) and requests tele-operator assistance so that the tele-operator can remotely assess the scene around the vehicle 6304 to determine the reasons for the blocking. It may also be that the vehicle 6304 and all other vehicles in the fleet always request tele-operator assistance at all similar T-like intersections.

The reason that the vehicle 6304 is requesting tele-operator assistance may be because the vehicle 6304 determined that it is not yet competent for T-like intersections with unprotected incoming lanes.

An explanation is desirable for a passenger so that the passenger can understand (e.g., in a sentence) why the vehicle 6304 stopped at this particular spot and is not proceeding even though there is no cross traffic. The tele-operator would want an explanation so that the tele-operator can understand what about these kinds of T-like intersections is causing the issue, since the issue is happening at any intersection of this type.

Figure 6D:
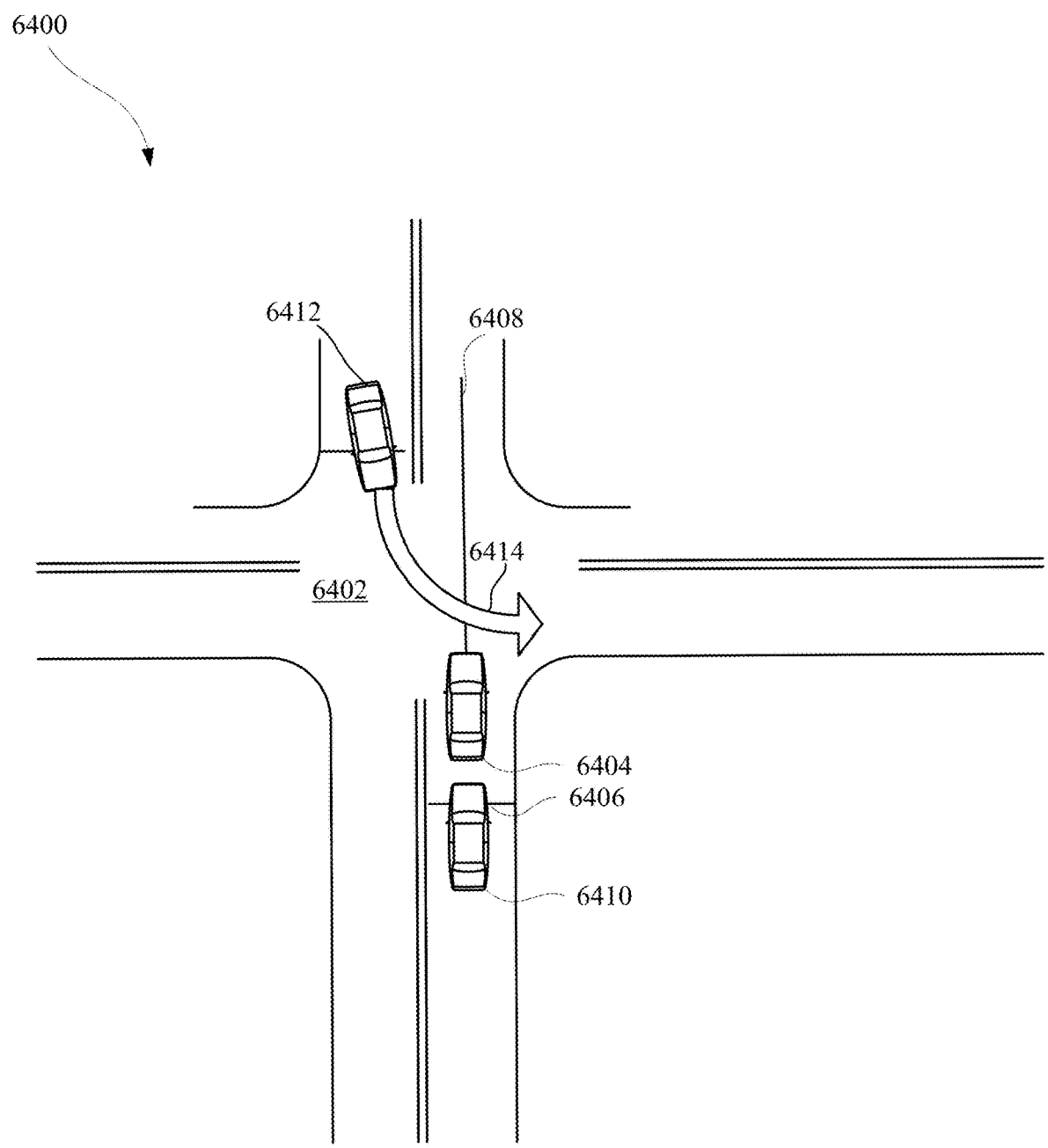

The operational scenario 6400 of FIG. 6D illustrates an intersection 6402 and a vehicle 6404. The vehicle 6404 passed a stop line 6406 and came to an abrupt stop. A vehicle 6410, which is in the rear of the vehicle 6404 and has also crossed the stop line 6406, rear-ends the vehicle 6404 because the vehicle 6410 was too close to the vehicle 6404. The reason for the abrupt stop was to avoid a collision with a reckless vehicle 6412 that seems to be obstructing a path 6408 of the vehicle 6406 as shown by a trajectory 6414, even though the vehicle 6406 has the right of way.

An explanation as to why the vehicle 6404 abruptly stopped is desirable. The explanation would allow a developer who is debugging the reason for the accident to understand why the vehicle 6404 (correctly) stopped. An explanation would also be helpful in identifying the level of fault (if any) of the vehicle 6404 and/or the vehicle 6410 (e.g., a driver of the vehicle 6410). The explanation can be useful in analyzing all decision-making information of the vehicle 6404, as well as what information the vehicle 6404 did not have and which information the vehicle 6404 should have had. Thus, the explanation can be useful in assessing who might have been at fault.

Figure 7:
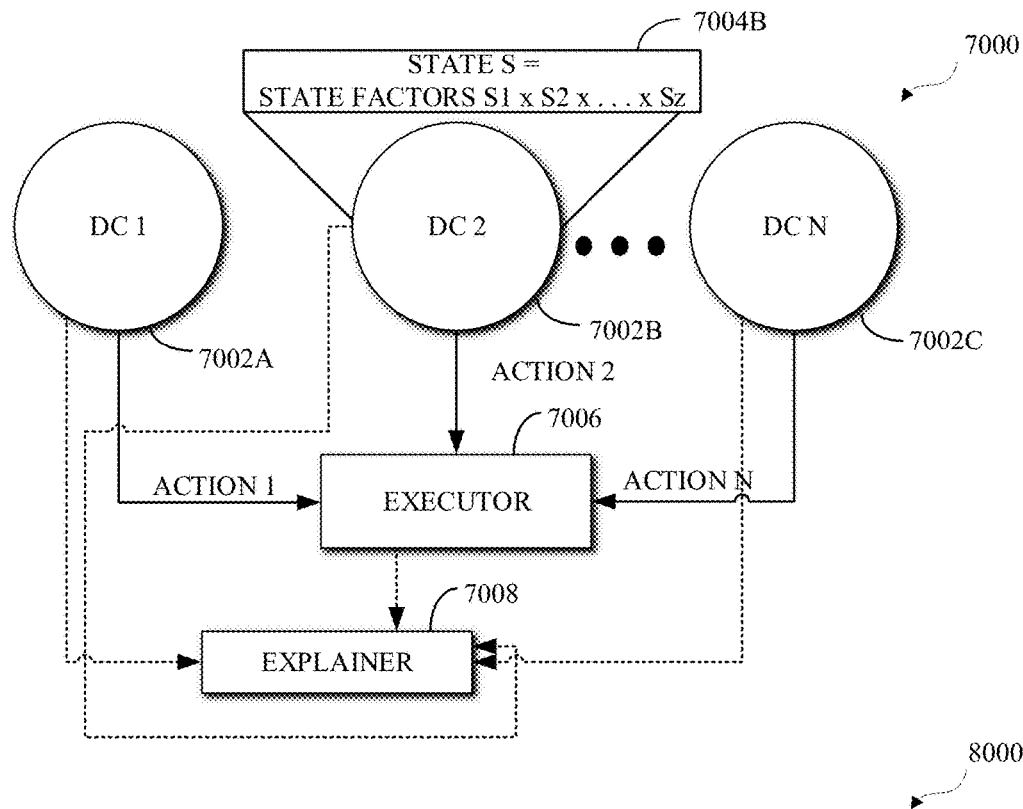
FIG. 7 is a diagram of an example of a system for providing explanations in autonomous driving according to implementations of this disclosure.

FIG. 7 is a diagram of an example of a system 7000 for providing explanations in autonomous driving according to implementations of this disclosure. The system 700 includes one or more decision components 7002. The system 7000 is shown as including three decision components (e.g., decision components 7002A-7002C); however more or fewer decision components can be included in the system 7000.

Each decision component can be directed to (or can) solve a particular aspect of a scenario in autonomous driving. The scenario can be as described above with respect to operational scenarios. Each of the decision components 7002A-7002C provides one or more recommended (e.g., candidate) actions for controlling the AV. An executor 7006 selects one action for controlling the AV from amongst the candidate actions.

An explainer 7008 (e.g., an explanation module) provides the human-understandable explanation of the reason why the action was selected by the executor 7006. The explainer 7008 is shown as being separate from any of the executor 7006 and/or the decision components 7002A-7002C. The explainer 7008, in providing the explanation, may receive information from one or more of the executor 7006 and/or one or more of the decision components 7002A-7002C, such as the one(s) decision component(s) whose candidate action was selected by the executor 7006. In another example, the explainer 7008 may be several cooperating components, where each of the cooperating components can be part of the executor 7006, part of a decision component, a standalone component, or a combination thereof.

Each of the decision components can provide a semantic description of its problem domain (e.g., state) and solution. For the system 7000 to be an explainable decision-making system, the system 7000 needs to be, or to provide, a semantically-sound decomposition of its decision-making components and a final action (i.e., a final decision) final action chosen by an aggregation method (e.g., the executor 7006).

In an example, a decision component can be an instance of a decision problem. Decision problems describe each potential pairwise interaction problem in a scene. A decision problem is a specific abstract problem that is known a priori and solved offline to provide an action of autonomous driving (e.g., stop, edge, go, pass on right, pass on left, etc.) given a current state of the environment. The decision component can be created (i.e., instantiated from a solved decision problem) online while driving when the operational scenario that the decision problem solves is encountered. In an example, a decision problem and a corresponding decision component can be as described above with respect to scenario-specific operational control evaluation modules and instances thereof. In an example, the decision component can be a Markov decision process or a partially observable Markov decision process.

In an example, decision components can be different types of Artificial Intelligence (AI) components. For example, one of the decision components can be an AI that receives sensor data and produce an action for controlling an AV directly from the sensor data. The decision component can be a neural network, such as a deep learning neural network, or the like. That is, the decision component may solve a small problem (e.g., one aspect) of an overall scene in autonomous driving. Such decision component may be able to provide a weak explanation that is implicit in the output of the neural network. To illustrate, in a visual output of the explanation of the decision component, regions surrounding the AV can be highlighted in red to indicate that, for example, a stop action was selected because of something in the highlighted region. In another example, a second neural network may be trained to provide explanations of the decision component. Thus, the explanation of the decision component may be provided by another neural network that may be trained to provide explanations for the actions selected by the decision component. Other techniques can be used for providing explanations for such decision components.

Each of the decision components 7002A-7002C can have a respective state (e.g., a state 7004B associated with the decision component 7002B) about which the decision component reasons in order to output an action. The state 7004 is composed of state factors. Each state factor can have multiple values. At any time step, the state factors can take on difference values, which may be inferred by the decision component or derived from sensor information. The decision component uses the values of the state factors to obtain an action for controlling the AV. The decision component can associate levels of certainty (or, equivalently, uncertainty) with the values of the state factors. The state 7004B illustrates that the state 7004 is comprised of the values of the state factors S1, S2, . . . Sz.

The state factors and their values have semantic meaning. The state can describe the configuration of the world that the decision component is reasoning about. Thus, the decision component is reasoning about semantically meaningful state factors thereby enabling and/or facilitating the explainability of the reasoning and/or the decision making of the decision component.

Each of the decision components 7002A-7002C can provide, to an executor 7006, at least one action which can be used for controlling the AV. For example, the decision components 7002A-7002C are shown as providing, respectively, an ACTION 1, an ACTION 2, and an ACTION N. While only one action is shown, each decision component 7002A-7002C can provide more than one action.

To illustrate, the vehicle 6104 of FIG. 6A is now used. As the vehicle 6104 detects, at time $t_0$, that it is approaching the intersection 6102 with the vehicle 6114 being across from the vehicle 6104 at the intersection 6102, a decision component corresponding to the operational scenario consisting of the intersection 6102 and the vehicle 6114 may be instantiated.

The decision component maintains a state. The state may include, by way of example only, the following state factors and potential values: AV Position∈{Approaching, At, Edged, Inside, Goal} (which describes the position of the vehicle 6104 with respect to the intersection 6102); AV wait time∈{Short, Long} (which describes how long the vehicle 6104 has been stopped at the intersection 6102); Other position∈{Approaching, At, Edged, Inside} (which described the position of the vehicle 6114 with respect to the intersection 6102); Other wait time∈{Short, Long} (which describes how the vehicle 6114 has been stopped at the intersection 6102); Blocking∈{Yes, No} (which describes whether the trajectories of the vehicle 6104 and the vehicle 6114 intersect); and Priority∈{AV, OtherVehicle} (which described which of the vehicle 6104 or the vehicle 6114 has the right of way at the intersection). A semantic meaning and/or a semantic descriptor can be associated with each state factor and its values.

At time $t_0$, the state may be AV Position=Approaching; AV wait time=Short; Other position=At; Other wait time=Short; Blocking=No; and Priority=OtherVehicle. At time $t_1$, the state may be AV Position=Edged; AV wait time=Short; Other position=At; Other wait time=Long; Blocking=No; and Priority=OtherVehicle.

Figure 8:
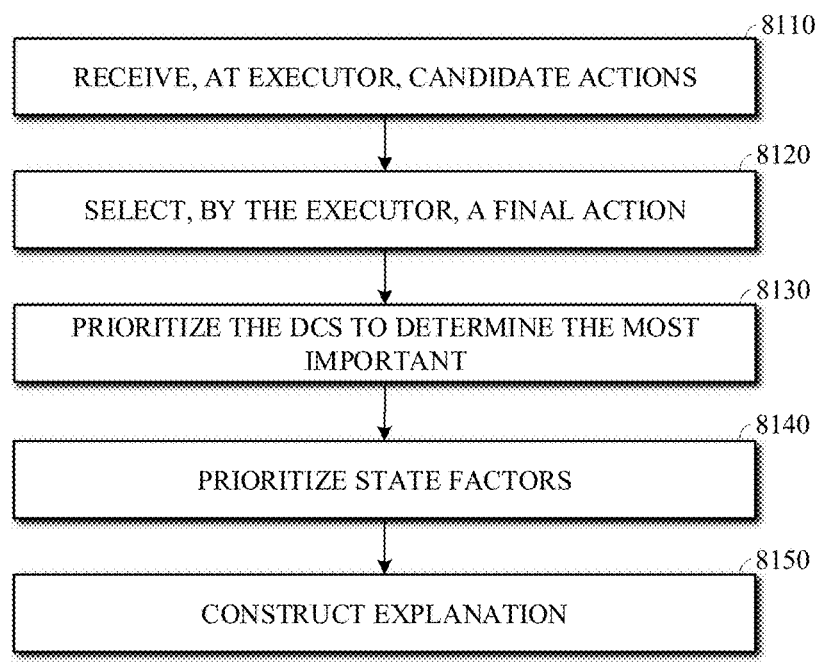
FIG. 8 is a flow chart diagram of an example of a technique for providing an explanation of an action selected for controlling an autonomous vehicle (AV) in accordance with embodiments of this disclosure.

FIG. 8 is a flow chart diagram of an example of a technique 8000 for providing an explanation of an action selected for controlling an autonomous vehicle (AV) in accordance with an embodiment of this disclosure. The technique 8000 of FIG. 8 can be implemented by the system 7000 of FIG. 7. For example, the technique 8000 can be implemented by the explainer 7008 of FIG. 7. The technique 8000 can be implemented in the AV, which can be the vehicle 1000 shown in FIG. 1, one of the vehicles 2100/2110 shown in FIG. 2, a semi-autonomous vehicle, or any other vehicle implementing autonomous driving. The technique 800 can be implemented as instructions that are stored in a memory, such as the memory 1340 of FIG. 1. The instructions can be executed by a processor, such as the processor 1330 of FIG. 1.

At a high level, the technique 8000 can be summarized as follows. After the executor 7006 selects and action for controlling the AV, the technique 8000 determines which decision components recommended the action as a candidate action; the decision components are prioritized to determine the most relevant one; the state factors of the most relevant decision component are examined to determine the ones that the most relevant decision component was most certain or least certain about; and finally, the explanation is constructed. In some examples, instead generating the explanation using the most relevant decision component, any number of the decision components that recommended the action can be used. Thus, in an example, it may not be necessary to prioritize the decision components.

At 8110, the executor receives candidate actions from each of the decision components. Each decision component can provide one or more candidate actions. At 8120, the executor selects one of the candidate actions as a final action for controlling the AV. For example, the executor can select the safest of the candidate actions. For example, as between a go action and a stop action, the executor may select the stop action.

The selected action may be recommended by more than one decision component. In an example, to provide a simple and concise explanation, only the most relevant (e.g., important, etc.) decision component is determined so that the most relevant decision component can be used to generate the explanation. In another example, all or less than all of the decision components recommending the action can be used. Thus, at 8130, the decision components recommending the action are prioritized. For example, a priority may already be assigned to the decision components. For example, a decision component that relates to children or to a school zone can be prioritized higher than other decision components. Thus, prioritizing the decision components can be used to determine the most important scenario (e.g., operational scenario) and/or entity (e.g., fast moving vehicle, a pedestrian, a child, etc.). In an example, and as described above, if a decision component is an instance of a respective decision problem, the priority may be assigned to the decision problem itself.

At 8140, the state factors within the most relevant decision component (or decision problem) are prioritized to evaluate the most important factor(s)/feature(s) used by decision component (or decision problem).

At 8150, the explanation can be constructed. In an example, constructing the explanation can mean substituting (e.g., inserting, etc.) operational-scenario specific values for placeholders in a template. In an example, the template can have the format "I <action taken> because I had <importance measure> about <state factor> for <decision component>," where each of <action taken>, <importance measure>, <state factor>, and <decision component> is a placeholder for a respective semantic descriptor. The placeholder <action taken> can be a placeholder for the action selected, at 8120, by the executor; the placeholder <decision component> can be a placeholder for the decision component that is determined, at 8130, to be the most relevant decision component; the placeholder <state factor> can be the state factor(s) determined, at 8140, to be the most important; and <importance measure> can be a level of certainty or uncertainty associated (e.g., maintained, etc.) by the most relevant decision component for the most important state factor.

In an example, more than one template may be available and the explainer 7008 can select one of the templates. In an example, a template may not include one or more of the placeholders described above. For example, a template can be "I <action taken> because I had <importance measure> about <state factor>."

To illustrate, and referring to FIG. 7, in a case where the executor 7006 selected the ACTION 2 action, which is recommended by the decision component 7002B (i.e., DC 2), and assuming that the decision component 7002B was most uncertain about the state factor Sz, then the explanation can be "I ACTION 2 because I had uncertainty measure about state factor Sz for DC 2." As already mentioned, the explanation can include more than one decision component (e.g., descriptors thereof) and/or one more state factors (e.g., descriptors thereof).

In an example of an explanation that is based on a certainty (as opposed to uncertainty), assume that the AV is being driven on a highway on a clear day with no traffic, the explanation can be "I went because I was certain of no obstructions for the highway driving" or "I am going because I am confident no vehicles exist." In these cases, a most important state factor may be an OtherVehicles that is a number of identified other vehicles in the scene. In this example the value of OtherVehicles is zero.

Returning again to FIGS. 6A-6D.

With respect to FIG. 6A, the explainer 7008 of FIG. 7 can construct an explanation as to why the vehicle 6104 edged: "I edged because of had uncertainty over blocking at the intersection;" and a subsequent explanation as to why the vehicle 6104 stopped: "I stopped because of certainty over blocking at the intersection."

With respect to FIG. 6B, the explanation constructed by the explainer 7008 can be: "I stopped because of uncertainty over blocking (or existence) for the pedestrian." In an example, a developer can use a visualization, over time, of the belief (e.g., value) over each state factor, which may highlight a "spike" over uncertainty over existence of a pedestrian. A passenger can be provided with the explanation: "I stopped because I had uncertainty over existence and the blocking of a pedestrian on the right." A mobility manager may be shown a visualization of the scene and the explanation.

With respect to FIG. 6C, as mentioned above, the vehicle 6304 stopped because the vehicle 6304 is not yet competent for T-like intersections with unprotected incoming lanes. Thus an explanation can indicate that the component for the T-intersection has a competence measure (e.g., a competence probability) that is low, when at the stop line 6306, for both the edge and the go actions. The explainer 7008 can provide an explanation to a passenger that communicates the message "I stopped because I believe I am not competent for the edge and go actions at a T-intersection stop." A teleoperator, who would want to understand what the issue (i.e., why AVs stop at T-intersections) can be provided with a user interface that displays the type of intersection (e.g., T-like intersection) and a competence measure (e.g., a number between 0 and 1, where, for example, 0.2 means low confidence in competence) for the action types edge and go.

With respect to FIG. 6D, the explanation can be that the decision component for the vehicle 6412 had certainty over the location of the vehicle 6412 and that the vehicle 6412 is blocking. A developer may be shown a visualization of the belief of the explanation.

In an example, the explanations can be saved to a log. For example, every time an action is selected by the executor, a corresponding explanation can be saved (e.g., such as to a log) so that the actions of the autonomous vehicle can be replayed at a later time. In an example, a timestamp can be associated with each explanation. The timestamp indicates the time that the action was performed to control the AV. In an example, the timestamp can include a first timestamp indicating when the executor selected the action and a second timestamp of when the action was performed to control the AV. In an example, each entry of the log can include only the placeholder values (as opposed to whole sentences) of the explanations. The log can be organized as a table, a delimited set of values, or the like, where each placeholder value can be stored in a respective field. Thus, the log can include four facts (i.e., the placeholder values) over time (i.e., the timestamp(s)). Additional supplemental information can also be stored in the log. For example, the supplemental information can include geographic-related information (e.g., a geo-location) relating to where the actions were taken.

In an example, an explanation is generated only when a selected action differs from the immediately selected action. For example, if the previous action was "go," and a current action is also "go," then an explanation of the second "go" action may not be generated. In an example, an explanation can be generated for a current action even if the current action is the same as the immediately preceding action in a situation where a first decision component that recommended the immediately preceding action is different than a second decision component that recommended the current action.

By keeping a log of the history of the actions selected by the executor, the decision-making in autonomous driving can be evaluated (e.g., analyzed, etc.). For example, the explanations can be replayed in a case of an accident to determine what information the decision making of the AV did not have and which information the AV should have had. The explanations history can be used to, for example, asses which party (e.g., the AV or another party) might have been at fault for the accident.

In an example, a respective explanation for each action recommended by a decision component can be logged. That is, even though only the explanation corresponding to the action selected by the executor may be shown to a passenger of the AV, the explainer 7008 of FIG. 7 can still log an explanation for every recommended action. For example, and referring to FIG. 7, an explanation for the ACTION 1 recommended by the decision component 7002A, an explanation for the ACTION 2 recommended by the decision component 7002B, and an explanation for the ACTION 3 recommended by the decision component 7002C can all be logged.

The logged explanations can be combined with other sensor (e.g., camera, video, LiDAR, etc.) data of a scene to aid in recreating the scene and in evaluating the decision-making capabilities of the AV. For example, in a replay of the video data or other visualizations of the a scene, explanations (which can include the timestamps of the explanations) can be displayed proximal (e.g., above) the objects to which the explanations correspond.

As mentioned above, while for illustration purposes the explanations are mainly described as sentences, the disclosure herein is not so limited. The explanation can be provided visually. For example, the explanation can be provided as icons that are displayed to passengers on a display of the AV. The display can be head-up display, a monitor, the dashboard, an LCD display, an OLED display unit, a personal device of the passenger, some other display, of a combination thereof. The explanation can be in the form of indicator lights. The explanation can be a raw output in terms of, for example, programming code outputs that can be used by a developer. The explanation can be a visualization of decision components, the most important state factors, and/or the competency levels. For example, the visualization can be a visualization of a scene, similar to one of the FIGS. 6A-6D, where at least some of the information of the explanation (e.g., the data of the placeholders) can be overlaid onto the other relevant world objects of the scene.

Writing the explanations to the log can be initiated by an explicit command or implicitly. An explicit command can be a command from a passenger of the AV. In an example, an AV (e.g., an explainer therein) can keep track (e.g., in a buffer, such as a circular buffer) of explanations of a the last N number of minutes. In an example N can be 5, 10, 15, more, or fewer minutes. In response to a first passenger command (e.g., a record command), the explainer can start accumulating the explanations in the buffer. In response to a second passenger command (e.g., a save command), the explainer can write the explanations of the buffer to the log.

Figure 9:
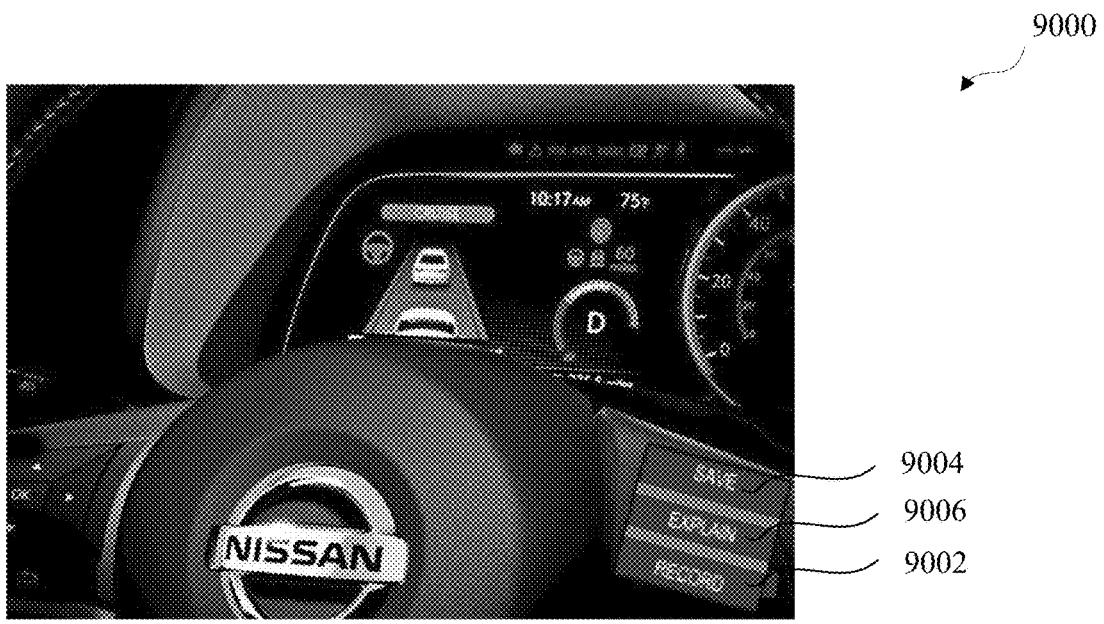
FIG. 9 is an example of an interface of explicit commands to record explanations to a log in accordance with implementations of this disclosure.

The record command can be a verbal command (e.g., "Hey Nissan, record actions," or the like). The save command can be verbal command (e.g., "Hey Nissan, save the actions," or the like). FIG. 9 is an example of an interface 9000 of explicit commands to record explanations to a log in accordance with implementations of this disclosure. A button 9002 can be used by a driver (such as in an advanced driver-assistance system) to issue the record command A button 9004 can be used by the driver to issue the save command.

In the implicit case of outputting the explanations to the log, each explanation can be automatically stored in the log. In another example, a buffer of explanations can be kept (as mentioned above) and the contents of the buffer can be written to the log in response to detecting an incident. Examples of incidents include, but are not limited to, detecting a hit at a bumper of the AV, an air bag deploying, the vehicle breaks being depressed, a crash, a sharp turn of the steering wheel, or other incidents. In an example, accident investigators can use the log of saved explanations to recreate the conditions and/or decision-making (e.g., the autonomous driving) capabilities of the AV leading up to an accident.

The logs of the explanations from two or more AVs (such as a fleet of AVs) can be aggregated and analyzed. For example, the actions taken (e.g., percentages of each type of the actions taken) by the AVs of the fleet at certain geographic locations, at a certain intersection (e.g., the intersection at Adams and Crooks), at certain intersection types (e.g., all T-intersections), and the like can be determined. For example, explanations generated before incidents in a fleet can be compared to derive a statistically common situation in which AVs may currently have trouble operating. For example, the aggregation of the most important decision component and state factor may provide a reason for the most common statistically-sound decision-making reason(s) an incident. Examples of such aggregation and analysis include information such as: in 11.2% of the cases, AVs of the fleet proceeded because a pedestrian was not blocking; in 9.7% of the cases, the AV went because it was certain that an oncoming vehicle was yielding.

Figure 10:
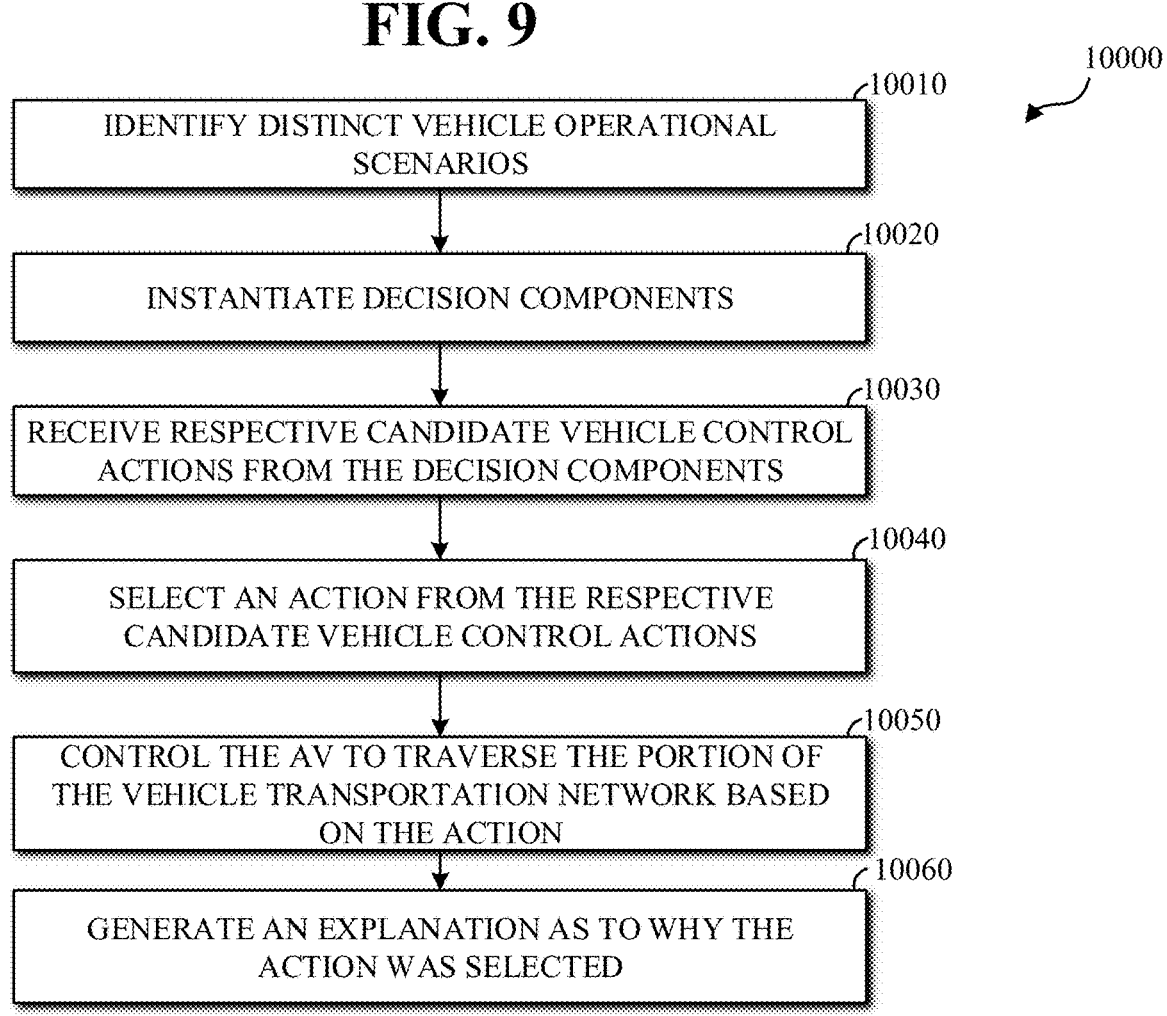
FIG. 10 is a flowchart diagram of an example of a technique for use in traversing a vehicle transportation network by an autonomous vehicle (AV) in accordance with an embodiment of this disclosure.

FIG. 10 is a flowchart diagram of an example of a technique 10000 for use in traversing a vehicle transportation network by an autonomous vehicle (AV) in accordance with an embodiment of this disclosure. The technique 10000 can be implemented, partially or fully, by the system 7000 of FIG. 7. The technique 10000 can be implemented in the AV, which can be the vehicle 1000 shown in FIG. 1, one of the vehicles 2100/2110 shown in FIG. 2, a semi-autonomous vehicle, or any other vehicle implementing autonomous driving. The technique 1000 can be implemented as instructions that are stored in a memory, such as the memory 1340 of FIG. 1. The instructions can be executed by a processor, such as the processor 1330 of FIG. 1. The technique 10000 can generate human-understandable explanations of autonomous driving actions.

At 10010, the technique 10000 identifies distinct vehicle operational scenarios, as described above. At 10020, the technique 10000 instantiates decision components. Each of the decision components is an instance of a respective decision problem that models a respective distinct vehicle operational scenario of the distinct vehicle operational scenarios. For example, the decision problem can be a scenario-specific operational control evaluation module (SSOCEM), as described above. Thus, the decision component can be an instance of the scenario-specific operational control evaluation module (SSOCEM). As described above, each of the decision components maintains a respective state describing the respective vehicle operational scenario.

At 10030, the technique 10000 receives respective candidate vehicle control actions from the decision components, such as described with respect to FIG. 7. At 10040, the technique 10000 selects an action from the respective candidate vehicle control actions, such as described with respect to FIG. 7. The action is from a selected decision component of the decision components, such as described with respect to the decision component 7002B of FIG. 7. As described above, the action is used to control the AV to traverse a portion of the vehicle transportation network. At 10050, the technique 10000 controls the AV to traverse the portion of the vehicle transportation network using the action.

At 10060, the technique 10000 generates an explanation as to why the action was selected. The explanation includes respective descriptors (e.g., human-readable descriptors, labels, etc.) of the action, the selected decision component, and a state factor of the respective state of the selected decision component. In an example, the explanation can indicate a level of certainty or uncertainty of the selected decision component with respect to the state factor.

In an example, the decision problem corresponding to the selected decision component can maintain a prioritized list of state factors and the state factor of the explanation is either the lowest or the highest priority state factor of the prioritized list of state factors. In an example, the selected decision component is a partially observable Markov decision process (POMDP) and the state factor corresponding to the state factor.

In an example, the technique 10000 can include constructing the explanation by inserting values (e.g., human-understandable descriptors, labels, etc.) into a template. The template can have the format "I <action taken> because I had <importance measure> about <state factor> for <decision component>," where each of <action taken>, <importance measure>, <state factor>, and <decision component> is a placeholder for a respective semantic descriptor.

In an example, the technique 10000 can include receiving the action from a second selected decision component, wherein the explanation further comprising the second selected decision component and a second state factor of a second state of the second selected decision component. That is, for example, if the selected action is received as a candidate action from a second decision component, that second decision component and its corresponding most important state factor (and/or importance level) can also be described (e.g., included, etc.) in the explanation.

In an example, the explanation can be provided (e.g., displayed, shown, etc.) to a tele-operator or to an occupant (e.g., passenger) of the AV. The explanation can be output in one or more modalities. For example, the explanation can be output in at least one of a graphical/visual, textual, audio, or haptic format.

In an example, the explanation can be output in response to a request from the occupant of the AV for the explanation. For example, the occupant may verbally ask "why did you do that?" or "what are you doing?" In an example, a button 9006 of FIG. 9, can be used by the occupant to request the explanation. In response to the question, the technique 10000 can output the explanation associated the last selected (and performed by the AV) action. In an example, the occupant can ask for an explanation of a previous action. If the occupant asks a question regarding an action that wasn't the last action, the technique 10000 provides an explanation of the last action that matches the action inquired about by the occupant. For example, assume that a first action at time $t_n$ was a stop action, which was followed at time $t_{n+1}$ by an edge action. If the user asks "why did you stop?" the technique 10000 outputs the explanation related to the first action of the time $t_n$. In an example, the technique 10000 can search for the explanation in one of the buffer and/or the log, which are described above.

As mentioned above, in an example, the technique 10000 can output the explanation to a log that incudes historical actions of controlling the AV.

Another technique for use in traversing a vehicle transportation network by an autonomous vehicle (AV) includes identifying distinct vehicle operational scenarios; solving, to provide candidate actions, each of the distinct vehicle operational scenarios using respective decision components, wherein each of the respective decision components maintains a semantic state of the respective vehicle operational scenario; controlling the AV to traverse a portion of the vehicle transportation network based on a selected action of the candidate actions, wherein the selected action is from a selected decision component of the respective decision components; and generating, using the semantic state, an explanation of the selected action, wherein the explanation comprises the selected action. Each decision component can be such that it maintains a semantic state (e.g., a collection of semantic state factors) that are used (e.g., reasoned about, etc.) to derive (e.g., select, infer, calculate, etc.) the action to control an AV.

In an example, at least one of the decision components can be an SSOCEM instance, as described above. Thus, solving each of the distinct vehicle operational scenarios using the respective decision components can include identifying a respective decision problem (e.g., a respective scenario-specific operational control evaluation module) for at least some of the each of the distinct vehicle operational scenarios, where the respective decision problem is solved offline to provide a policy for the each of the distinct vehicle operational scenarios; and instantiating the respective decision problems to provide the respective decision components.

In an example, and as mentioned above, the explanation can indicate a level of certainty of the selected decision component with respect to at least one state factor. In an example, the selected decision component can maintain a prioritized list of state factors and the at least one state factor of the explanation being either a lowest or highest priority state factor of the prioritized list of state factors.

In an example, the technique can include constructing the explanation by inserting values into a template, wherein the template has a format "I <action taken> because I had <importance measure> about <state factor> for <decision component>," and wherein each of <action taken>, <importance measure>, <state factor>, and <decision component> is a placeholder for a respective semantic descriptor. The explanation can be output in at least one of an graphical, textual, audio, or haptic format.

Another technique for use in traversing a vehicle transportation network by an autonomous vehicle (AV) can include, in response to identifying at least one vehicle operational scenario, selecting an action for controlling the AV; controlling the AV according to the action; and outputting an explanation of the action. The action can be provided by a decision component that selects the action based on at least one state factor associated with the at least one vehicle operational scenario and a respective human-understandable, semantic meaning is associated with the at least one state factor. The explanation includes the action, the at least one state factor, and the decision component. More specifically, the explanation includes descriptors of the action, the at least one state factor, and the decision component. The explanation can be constructed by inserting values into a template having respective placeholders for the action, an importance measure corresponding to the at least one state factor, the at least one state factor, and the decision component.

As mentioned above, the explanation can be presented to a passenger of a vehicle. The vehicle can be an autonomous vehicle or a semi-autonomous vehicle.

In the case that the vehicle is autonomous, a decision-making system, such as the autonomous vehicle operational management system 4000 of FIG. 4, can select and execute (or cause to be executed) an action for controlling the vehicle without any passenger input; and an explanation system, such as the system 7000 of FIG. 7, can provide a post hoc explanation of the action to the passenger. In another example, the action can be selected but not executed until and unless the action is approved by a human, such as a tele-operator or an occupant of the vehicle.

In the case that the vehicle is semi-autonomous, such as a vehicle that is equipped with an Advanced Driving Assistance System (ADAS), the decision-making system can proactively identify unsafe situations for a driver and either proactively perform the action thereby overriding the driver or, at the least, warning the driver that the driver should take the action. The warning can be in the form of the explanation, as described above. Thus, the explanation can be provided to the driver before the action is performed. In some situations, the decision-making system may not perform the action; however in other situations, the decision-making system will perform the action (thereby overriding the driver).

For example, if the decision-making system selects an action based on perception uncertainty (e.g., a faulty sensor), the action may not be performed because the decision-making system can assume that the driver can see where the sensors of the vehicle are not able to. On the other hand, and as described with respect to FIG. 6D, if a collision is eminent, the decision-making system may provide the explanation to the driver and then use the action to control the vehicle. Thus, a template for an explanation (i.e., a warning explanation or a recommendation explanation) of a prospective action can be "You should <action taken> because I had <importance measure> about <state factor> for <decision component>," or some other format/template. If the decision-making system overrides the driver, a second explanation can be given to the driver where the second explanation can be in the format "I <action taken> because I had <importance measure> about <state factor> for <decision component>," or some other format/template.

Many accidents (e.g., minor collisions and fender benders), involving pedestrians, bicycles, and/or other vehicles, happen in slow-speed scenes, such as at four-way stops or uncontrolled streets of residential areas. Warning explanations can be helpful in avoiding such accidents. Non-limiting examples of warning/recommendation explanation can be "You should stop because you are going out of priority at the intersection" and "You should edge because I cannot see at the left of this T-intersection."

In another example, and as further described below, the AV (e.g., a decision component therein) may not have sufficient confidence in the selected action. Thus, before executing the action to control the AV, human assistance may be requested. The human can be a tele-operator or an occupant of the vehicle. The request to the tele-operator can include the explanation. Thus, the explanation can indicate to the tele-operator the action that the AV would perform, if approved by the tele-operator. Thus, in such situation, the explanation is provided ante hoc.

Figure 11:
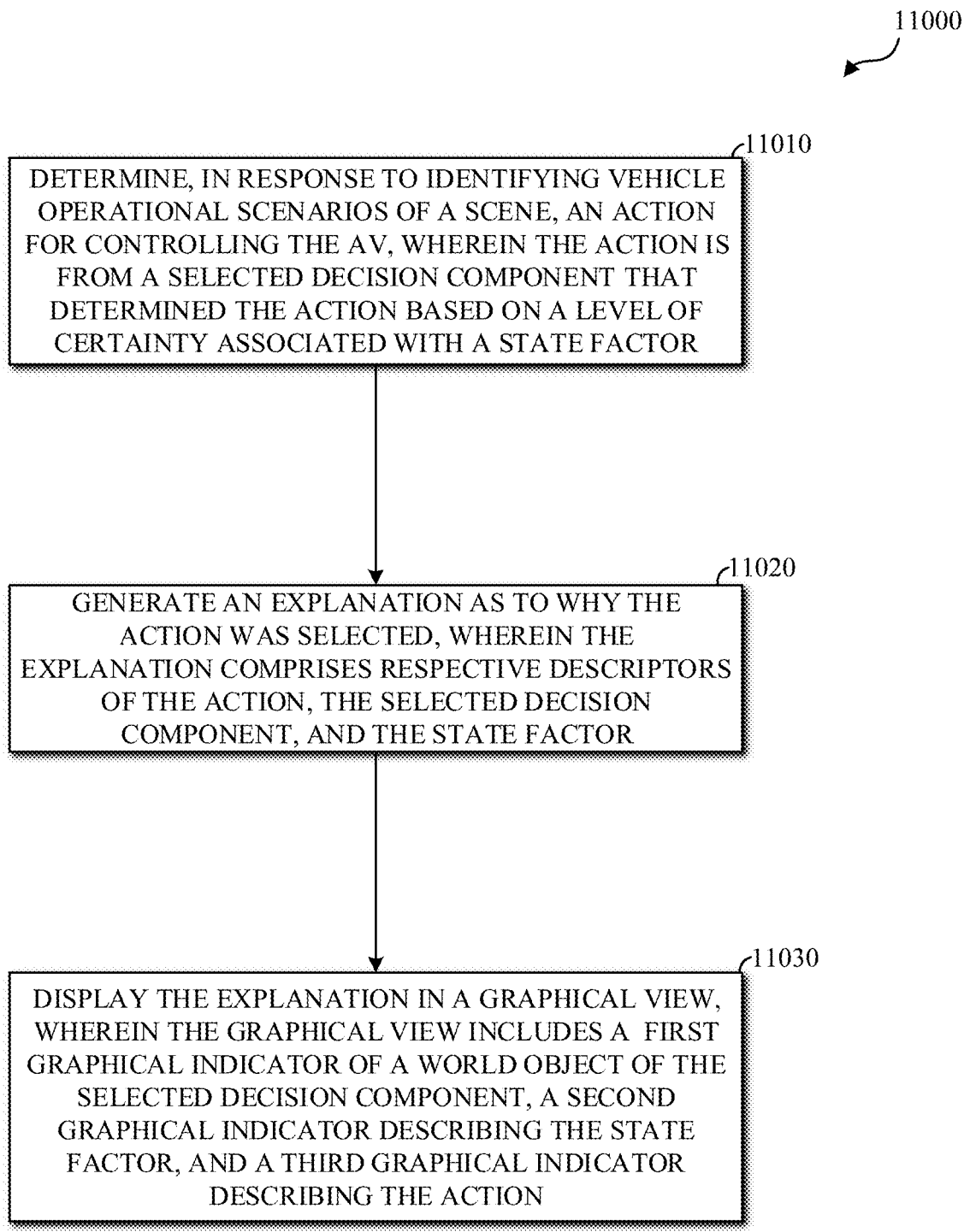
FIG. 11 is a flowchart diagram of an example of a technique for displaying an explanation of an action for controlling a vehicle in accordance with an embodiment of this disclosure.

FIG. 11 is a flowchart diagram of an example of a technique 11000 for displaying an explanation of an action for controlling a vehicle in accordance with an embodiment of this disclosure. The technique 11000 can be used in traversing a vehicle transportation network by an autonomous vehicle (AV). The technique 11000 of FIG. 11 can be implemented at least partially by the system 7000 of FIG. 7. For example, the technique 11000 can be implemented by the explainer 7008 of FIG. 7. The AV can be the vehicle 1000 shown in FIG. 1, one of the vehicles 2100/2110 shown in FIG. 2, a semi-autonomous vehicle, or any other vehicle implementing autonomous driving. The technique 11000 can be implemented as instructions that are stored in a memory, such as the memory 1340 of FIG. 1. The instructions can be executed by a processor, such as the processor 1330 of FIG. 1.

At 11010, the technique 1100 determines, in response to identifying vehicle operational scenarios of a scene, an action for controlling the AV. The action is from a selected decision component that determined the action based on a level of certainty associated with a state factor.

In an example, and as described above, determining the action for controlling the AV can include identifying distinct vehicle operational scenarios, instantiating decision components, receiving respective candidate vehicle control actions from the decision components, and selecting the action from the respective candidate vehicle control actions. Each of the decision components can be an instance of a respective decision problem that models a respective distinct vehicle operational scenario of the distinct vehicle operational scenarios. Each of the decision components can maintain a respective state describing the respective vehicle operational scenario. The action is from the selected decision component of the decision components and the action is used to control the AV to traverse a portion of the vehicle transportation network.

At 11020, the technique 11000 generates an explanation as to why the action was selected. The explanation can be generated as described above, such as with respect to FIGS. 7-8 and 10. The explanation can include respective descriptors of the action, the selected decision component, and the state factor.

At 11030, the technique 11000 displays the explanation in a graphical view that includes a first graphical indicator of a world object of the selected decision component, a second graphical indicator describing the state factor, and a third graphical indicator describing the action.

In an example, the explanation can be overlaid on and/or displayed adjacent to a camera view, an augmented satellite view, an abstracted view, a dashboard view, another view, or a combination thereof of the scene.

Camera views can be views of the scene as captured by one or more cameras of the AV and/or other cameras (e.g., public cameras, other vehicle cameras) that may be available at the scene (e.g., cameras on utility poles). Augmented satellite views can be satellite views of the scene that are augmented with current world objects (e.g., the AV, other vehicles, pedestrians, bicycles, policemen, etc.) of the scene as perceived using sensors of the AV and/or as maintained by a world modeling module, which is described below. Abstracted views can be abstracted views of the world as perceived through the sensors of the AV. An abstracted view can include representations of only those world objects that are relevant to the decision component and/or the action. In an example, the abstracted view can be, or can be based on, a view of a navigation route application of the AV. For example, a navigation application (which displays a route and provides navigation instructions) may be displayed on a display of the AV. The explanation can be overlaid on, or adjacent to, the user interface of the navigation application. In the dashboard view, the explanation can be displayed as fixed dashboard lights.

The world modeling module can track continuous (e.g., object pose, velocity, geometry, etc.) and discrete world object states (e.g., object classification, intention, etc.); estimate and track multiple object state hypotheses (e.g., intentions) with associated probabilities (e.g., likelihoods); generate and track abstract object intentions, depending on object state, map and/or environmental information; predict future object states with multiple hypotheses for a variable-length of time; and perform real-time processing and fuse data from various sensors (e.g., LiDAR, radar, camera, etc.).

The explanation can be overlaid, or displayed, as icons, highlights, other graphical indicators, or a combination thereof. In an example, the explanation can be overlaid on an abstracted view of the scene.

For example, a question mark icon can indicate uncertainty over the existence of an object. That is, a question can be used to convey a portion of a textual explanation "uncertain if this vehicle/bike/pedestrian/etc. exists." For example, multiple arrows can indicate certainty that a trajectory of a world object will block the trajectory of the AV. Thus, the multiple arrows can be the second graphical indicator describing the state factor. The multiple arrows can be used to convey a portion of a textual explanation "I am certain that the trajectory of vehicle/bike/pedestrian/etc. is blocking" the trajectory of the AV. For example, multiple arrows with a question mark can indicate uncertainty over which trajectory a world object will follow and that at least one of the trajectories may block the path of the AV. That is, the multiple arrows can be used to convey a portion of a textual explanation "uncertain if this vehicle/bike/pedestrian/etc. is blocking" the trajectory of the AV. For example, a portion of an textual explanation "I <action> because I detected vehicle/bike/pedestrian/etc." can be conveyed with the absence of question marks and/or arrows.

For example, a priority icon can be used to convey which of the AV or another world object has priority, such as at a stop sign. In another example, the priority can be indicated using numbers or number icons. For example, assuming that the AV and 2 other vehicles arrived at an n-stop way, then number icons showing the number 1 to 3 can be used to indicate the priority of each of the 3 vehicles at the n-stop way. Thus, the state factor can describe priority at an n-way stop and the second graphical indicator can be a numerical number indicating the priority of the world object of the explanation at the n-way stop.

Icons representing the classifications of the world objects can be used in graphical views. For example, if an object is classified by the world modeling module as a bicycle/pedestrian/truck/etc. then bicycle/pedestrian/truck/etc. icons can be used to represent the object (e.g., the object and/or the object location) in the graphical view. The icons can vary in position and/or rotation to depict the perceived (e.g., estimated) position and/or rotation of the respective objects.

As mentioned above, the explanation can be displayed as fixed dashboard lights. Thus icons, as described above, can be displayed on a dashboard similarly to how dashboard "check engine," "anti-lock brakes," and other lights are displayed on a dashboard.

In an example, the selected decision component can be assigned a color. Thus, in a scene that involves multiple operational scenarios and, therefore, multiple decision components, a respective color can be assigned to each decision component. The color can be used to shade and/or show a shape to ensure distinct decision component highlights. The action performed by each decision component entity (i.e., world object) and the AV itself can be shown in different colors, shapes, and/or letters. An arrow can be used to accent the predicted path of the world object. In the visual depiction of an explanation, only the relevant decision component (i.e., the relevant world object) is highlighted. Explanations can use extra symbols, color, and/or opacity to explain the particular state factor the AV believes is the major influencer in its decision (i.e., the selection of the action).

As mentioned above, in an example, the technique 11000 can control the AV to traverse the vehicle transportation network using the action before the displaying the explanation, such as described above with respect to warning explanations (e.g., recommendation explanations). In an example, the technique 11000 can control the AV to traverse the vehicle transportation network using the action after the displaying the explanation, such as described above.

FIGS. 12A-12I are examples of explanations in accordance with embodiments of this disclosure. The examples of FIGS. 12A-12I are non-limiting examples and other explanations are possible for the described scenarios and other scenarios.

Figure 12A:
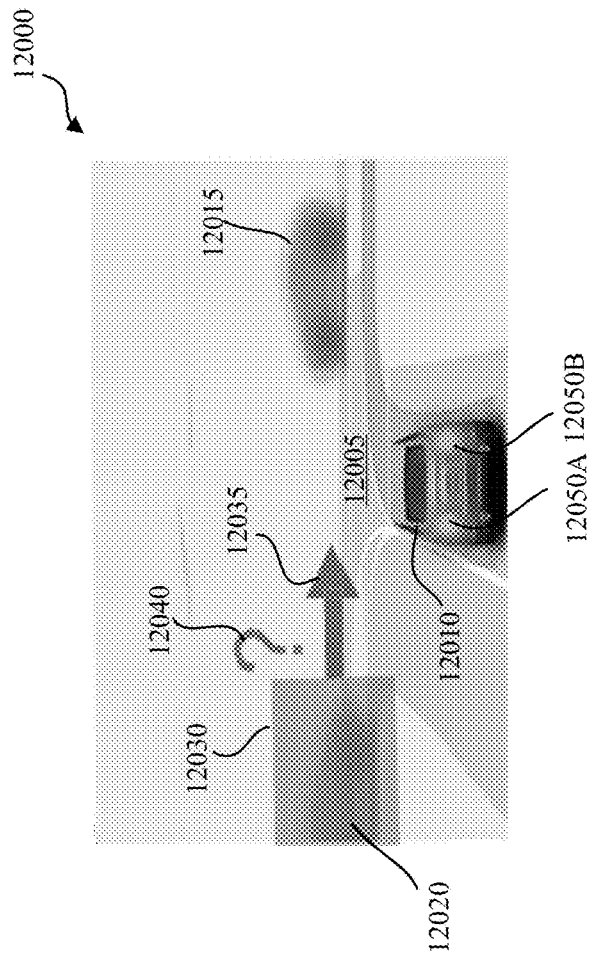

In FIG. 12A, an abstracted view 12000 illustrates a scene (e.g., the operational scenario) that is at a T-intersection 12005 and involves a vehicle 12010 (e.g., an AV), a first vehicle 12015, and a second vehicle 12020. The decision component in this scene can be an intersection operational scenario. Alternatively, the operational scenario in this scene can be a vehicle approaching from the left at an intersection operational scenario. The route of the vehicle 12010 is to turn right at the T-intersection 12005. Thus, the path of the vehicle 12010 is not affected by the path of the first vehicle 12015. However, the path of the vehicle 12010 may be affected by the path of the second vehicle 12020. In an example, the first vehicle 12015 may not be shown in the abstracted view, such as when the explanation is overlaid on the user interface of the navigation route application.

The explanation illustrated in the abstracted view 12000 is "I stopped because I am uncertain if the vehicle on the left is blocking." Thus, the explanation includes a highlight 12030 of the relevant world object (i.e., the second vehicle 12020). In the abstracted view 12000, the highlight 12030 is illustrated at a transparent, shaded box on top of the second vehicle 12020. However, other highlights are possible. For the example, the highlight 12020 can simply be a bounding box. For example, the highlight 12020 can be a thick outline around the shape of the second vehicle 12020. An arrow 12035 illustrates a predicted trajectory of the second vehicle 12020.

In the scene of the abstracted view 12000, there is uncertainty as to whether the second vehicle 12020 will continue going straight forward (as opposed to, for example, turning left at the T-intersection 12005). Thus, a question mark 12040 illustrates the uncertainty.

A question mark can be displayed proximal to the state factor with which the uncertainty is associated. For example, if there is uncertainty associated with the existence of a vehicle, the question mark can be displayed over a vehicle (or a box representing the vehicle) at the predicted/suspected location in the abstracted view.

Icons 12050 illustrate the action of the explanation. The action is the stop action. Thus, the icons 12050 can be red-colored icons displayed at the location of the brake lights of the vehicle 12010. The standard red, yellow, and green colors can be used to illustrate, respectively, a stop action, an edge action or a proceed slowly action, and a proceed (i.e., go) action.

Figure 12B:
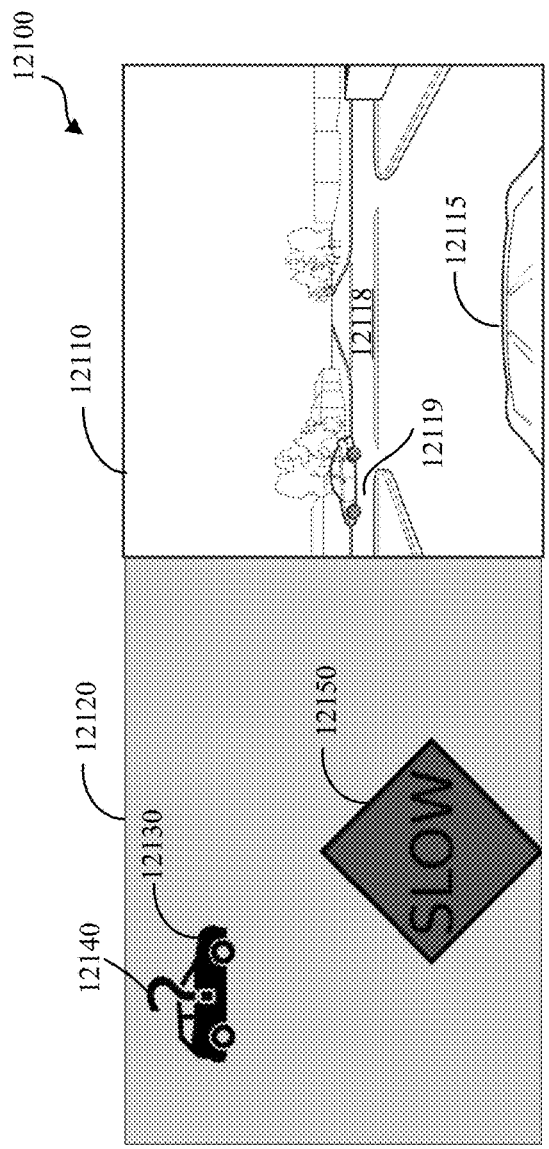

FIG. 12B illustrates a graphical view 12100 that includes a front-facing camera view 12110 of a vehicle 12115 (i.e., the AV) that is approaching an intersection 12118 and an explanation 12120. The explanation 12120 graphically depicts the textual explanation "I am edging forward slowly because I am uncertain if a vehicle on the left exists or not." In the case of assisted driving, the explanation can indicate to the driver "you should slow down because I'm uncertain if there are vehicles on the left and whether or not they're going to be blocking." The uncertainty over the existence of a vehicle 12130 that may be approaching from the left side on a road 12119 is illustrated with a question mark 12140. The "edge forward slowly" action is illustrated with a "slow" icon 12150. In an example, the slow icon 12150 can be painted using a color indicating caution, such as the yellow color. In the explanation 12120, the first graphical indicator is the vehicle 12130 (e.g., the icon of a vehicle that may be on the left side), the second graphical indicator describing the state factor is the question mark indicating existence, and the third graphical indicator is the slow icon 12150.

Figure 12C:
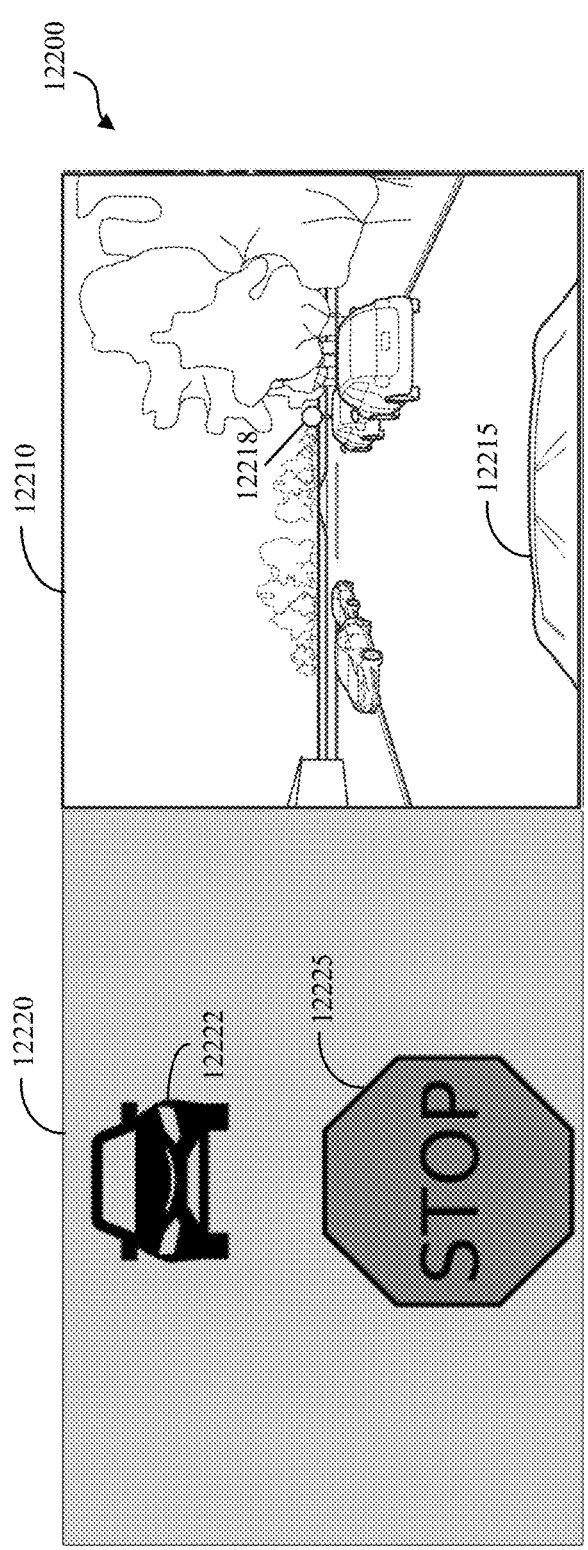

FIG. 12C illustrates a graphical view 12200 that includes a front-facing camera view 12210 of a vehicle 12215 that is approaching a stop sign 12118 at an intersection and an explanation 12220. The explanation 12220 graphically depicts the textual explanation "there is a vehicle ahead; watch for it while stopping at the stop line." The explanation 12220 includes an icon 12222 that depicts the vehicle that is ahead and a stop icon 12225 indicating that the vehicle is approaching the stop sign 12218. The stop icon 12225 can be painted using a color indicating stop, such as the red color and/or the stop icon 1225 can include the word "STOP." In the explanation 12220, the first graphical indicator is the vehicle 12222, the second graphical indicator describing the state factor is the absence (indicating certainty) of a question mark, and the third graphical indicator is the stop icon 12225.

To reiterate, an explanation can include a vehicle, which may be at the left, center, or right of the AV. In the case of FIG. 12C, the vehicle is at the center (i.e., ahead) of the vehicle 12215. A type (e.g., car, bicycle, truck, pedestrian, etc.) of the vehicle can also be shown. In the case of FIG. 12C, the type of vehicle is a car. Optionally, a question mark can be shown to illustrate uncertainty about the vehicle. Optionally, an additional explanation can be added, typically based on the state factor that is most reflective of the decision. In the case of FIG. 12C, there is no uncertainty.

Figure 12D:
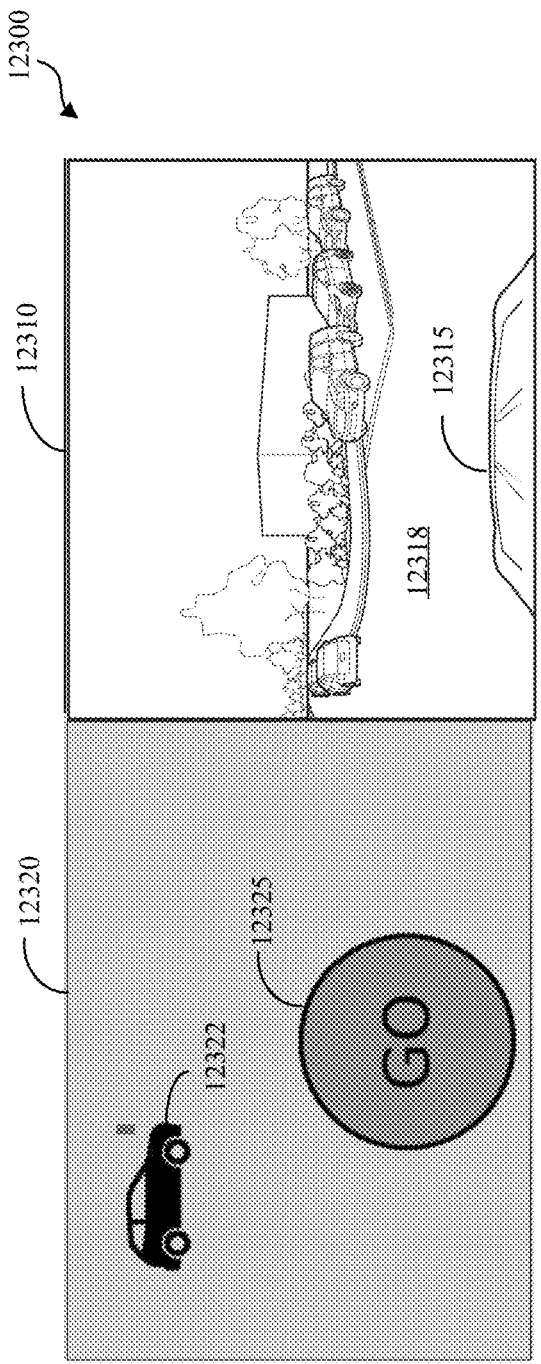

FIG. 12D illustrates a graphical view 12300 that includes a front-facing camera view 12310 of a vehicle 12315 that is turning right at an intersection 12318 and an explanation 12320. The explanation 12320 graphically depicts the textual explanation "I am going because I am certain the road is clear," "I am going because safety is certain for turning right at the intersection," or "I am going because the vehicle 12322 is not an obstruction at the intersection." The explanation 12320 includes an icon 12322 that depicts a vehicle that is detected coming from the left side of the vehicle 12315 and a go icon 12325 indicating that the go action to be performed by the vehicle 12315. In the case of assisted driving, the explanation indicates to the driver "you can go because it's safe to go." The go icon 12325 can be painted using a color indicating proceed or go, such as the green color, and/or include the word "GO." In the explanation 12320, the first graphical indicator is the vehicle 12322, the second graphical indicator describing the state factor is the absence of a question mark, and the third graphical indicator is the go icon 12325. The absence of a the question mark indicates certainty. In this case, the certainty is that the detected vehicle 12322 does not obstruct the path of the vehicle 12315.

To reiterate, the reason the explanation 12320 states "Go" in the go icon 12325 is that, while the vehicle 12322 is detected, the vehicle 12322 is predicted to not intersect with the vehicle 12315. For example, the vehicle 12322 may be predicted to be turning on a different road (e.g., turning left at the intersection 12318) whereas the vehicle 12315 is turning right at the intersection 12318. The explanation 12320 builds confidence in the "Go" recommendation, because the explanation 12320 is essentially stating that "I see that other vehicle on the left, but don't worry about it because it isn't interfering with you."

The abstracted view 12000 of FIG. 12A includes the question mark 12040 whereas the graphical view 12300 of FIG. 12D does not include a question mark. The question mark in FIG. 12A refers to the uncertainty as to whether the vehicle 12020 exists. The uncertainty can arise, for example, because of occlusions that prevent the sensors of an AV from seeing around walls, buildings, other vehicles (parked or moving), or some other occlusions. The state factor is "existence of vehicle" in the decision component. Thus an absence of question mark indicated certainty with respect to the decision factor.

FIG. 12E illustrates a graphical view 12400 that includes a front-facing camera view 12410 of a vehicle 12415 that is going straight through an unprotected intersection 12418 and an explanation 12420. The explanation 12420 graphically depicts the textual explanation "I am slowing down because I am uncertain whether there are vehicles approaching the intersection and whether any of their trajectories are blocking." That is, the explanation 12420 indicates uncertainty with respect to existence of other world objects and the directions they may be travelling in. As described above, arrows 12424 with a question mark 12424 indicate uncertainty whether a vehicle 12422 will block the trajectory of the vehicle 12415. The proceed slowly action is illustrated with a "slow" icon 12424, which is similar to the slow icon 12150 of FIG. 12B. In an example, the explanation 12420 can include additional first graphical indicators and second graphical indicators. For example, the explanation 12420 can include an eastward-facing vehicle icon on the left side and a west-facing vehicle icon on the right side of the explanation 12420 with question marks to indicate uncertainty over the existence of such vehicles approaching the unprotected intersection 12418.

FIG. 12F illustrates a graphical view 12500 that includes a front-facing camera view 12510 of a vehicle 12515 that is turning left at a T-intersection 12518 and an explanation 12520. The explanation 12520 graphically depicts the textual explanation "I am edging forward and stopping because I detected a vehicle on the right approaching the intersection." The vehicle that is approaching the intersection from the right of the vehicle 12515 is depicted in the explanation 12520 using a vehicle icon 12522. The "edge forward slowly" action is illustrated with a "slow" icon 12524, which is similar to the slow icon 12150 of FIG. 12B.

Figure 12G:
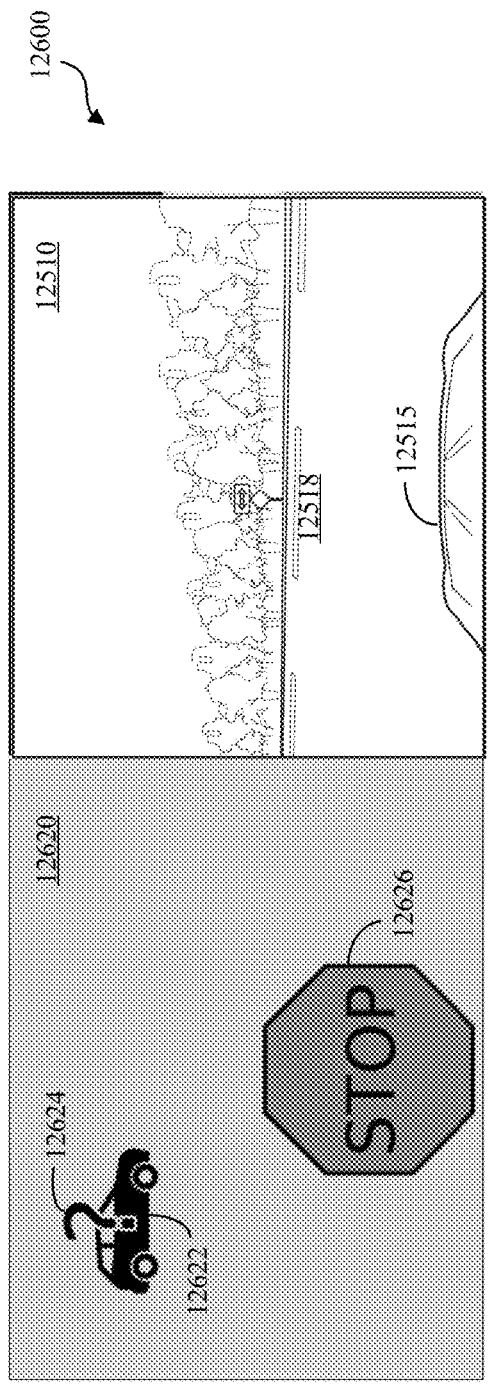

FIG. 12G illustrates a graphical view 12600 that includes the front-facing camera view 12510 of FIG. 12F an explanation 12620. The explanation 12620 graphically depicts the textual explanation "I am stopping because I am uncertain of the existence of a vehicle on the left approaching the intersection." A vehicle that may be approaching the intersection from the left is depicted using a vehicle icon 12622, the uncertainty over the existence is depicted using a question mark icon 12624 overlaid the vehicle icon 12622 (i.e., overlaid over the item that the vehicle 12515 is uncertain about), and the stopping action is depicted as a stop icon 12626, which can be as described with respect to the stop icon 12225 of FIG. 12C.

Figure 12H:
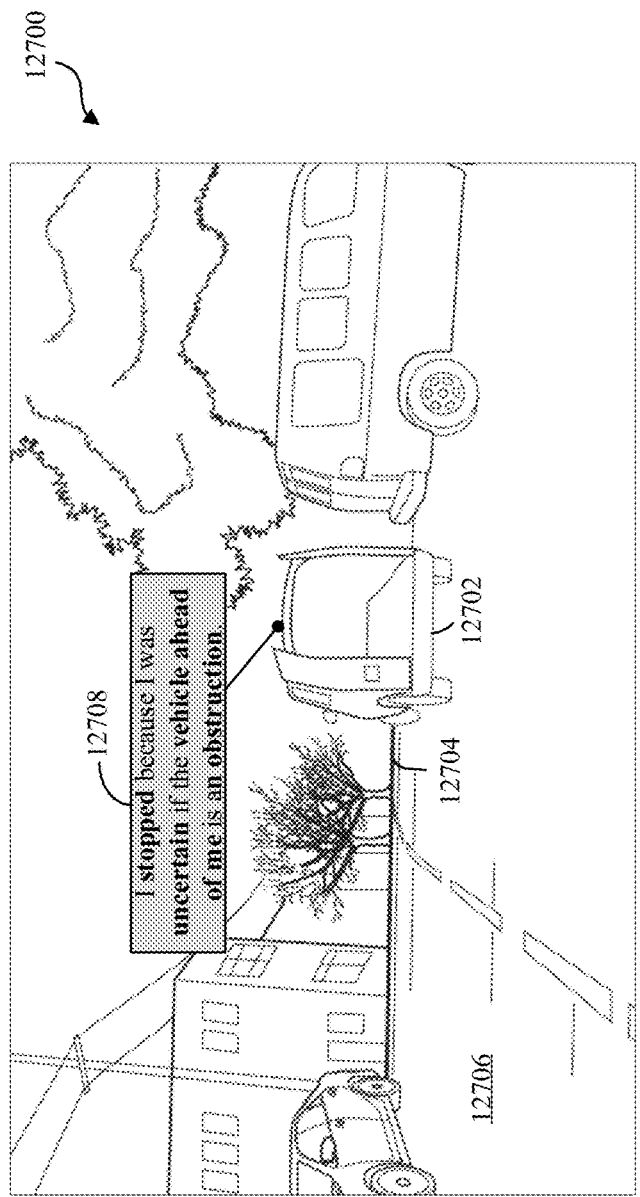

FIG. 12H illustrates a graphical view 12700 that includes a view of a scene that is scene through a front-facing camera of an AV (not shown). The graphical view 12700 illustrates that the AV is approaching an intersection 12704. The intersection 12704 is at the top of a hill. As such, sensors of the AV cannot observe other world objects that may be on the other side of the hill in an opposite-direction lane 12706. A vehicle 12702 is stopped. In some examples, the AV may be able to detect that the vehicle 12702 is a van. A decision component of the AV associated with the vehicle 12702 may be uncertain whether the vehicle 12702 is obstructing the path of the AV. Thus, the AV stops and provides an explanation 12708 (e.g., a textual explanation) to an occupant of the vehicle. The graphical view 12700 (including the explanation 12708) can be displayed on a display of the AV.

As mentioned above, the explanations of the actions of the AV can be provided to a tele-operator so that, for example, the tele-operator can quickly obtain situational awareness.

In some situations, an AV can request assistance from a human user (i.e., a tele-operator) to resolve an exception situation. An exception situation can be any situation such that the AV is not able to make progress (e.g., continue along its path) to a destination, for whatever reason. For example, when the AV encounters an obstruction (e.g., a construction site, a stopped vehicle, an accident, etc.) in a roadway, the AV might not go around the obstruction if doing so means, for example, that the AV will travel through an area that is physically safe but is restricted by traffic regulations. Accordingly, a tele-operator can be tasked with remotely assisting the AV in negotiating its problematic situation by, for example, mapping a path (i.e., a trajectory) for the AV around the obstruction or approving a proposed action by the AV. The tele-operator may be one of many tele-operators that are available at a tele-operation center where each tele-operator can monitor the state or condition of one or more AVs.

In an example workflow, upon encountering an exception situation (e.g., an obstruction), the AV (i.e., a module therein) can issue a request for assistance, which can be received at an autonomous system that is at a tele-operator center, is accessible to the tele-operator, and via which the tele-operator can provide the assistance to the AV. The autonomous system can create a ticket for the request for assistance. The ticket can be assigned to a tele-operator at the tele-operation center. The ticket can be assigned to a specific tele-operator who may be selected based on expertise of the tele-operator, a geographical location of the AV, state information of the AV, information regarding the obstruction situation, or some other criteria. In another implementation, the ticket may be placed in a first-in-first-out queue and is assigned to a next available tele-operator.

To resolve the exception situation, the tele-operator may need to first obtain situational awareness of the exception situation. The situational awareness of the exception situation can be attained using information received from the AV including raw sensor data, features, feature values, camera images and the like. The tele-operator can selectively review (e.g., analyze) at least a subset of the received data to gain an awareness of the situation so that the tele-operator is better positioned to provide the assistance. To illustrate, the tele-operator can view the surroundings of the AV by interrogating (e.g., requesting views from) the different cameras of the AV. The tele-operator then solves the problem (i.e., provides the assistance) and closes the ticket. In an example, where the exception situation is an obstruction, the tele-operator assistance can be in the form of a path around the obstruction that the tele-operator provides to the AV. In an example, the tele-operator assistance can be in the form of approving a proposed action by the AV.

Tele-operators are typically non-technical persons. That is, the tele-operators are not typically trained in the programming, the reasoning capabilities, and/or the inner workings of autonomous driving logic and/or control capabilities. Rather, tele-operators are typically trained to solve the real-life driving situations.

To make the tele-operator even more situationally aware, thereby enabling the tele-operator to more effectively and quickly resolve an exception situation, non-technical, human-understandable explanations, as described herein, can be provided to the tele-operator.

In some situations, the AV can propose an action for resolving the exception situation. Even though the AV (i.e., a decision component therein) does generate an action for resolving the exception situation, the AV may not have sufficient confidence in its ability to perform the action and/or the action may violate social and/or legal norms. Thus, the action is not performed without the approval of the tele-operator. Thus, in the process of resolving the ticket (e.g., the exception situation), the tele-operator can view the explanation of what the AV proposes to do (i.e., the action) and the reasons (e.g., the decision component, state factor, and uncertainty) for why the AV proposes the action.

Referring again to FIG. 12H, the AV can issue a request for assistance to a tele-operator because the AV is blocked and cannot make progress. To gain situational awareness, the tele-operator can view sensor information from the AV, which can include the graphical view 12700. The explanation 12708 can be overlaid on the camera view. Based on this display (i.e., the view of the scene and the explanation), the mobility manager is able to more readily understand why the AV is asking for assistance and gains an understanding of the scene.

Figure 12I:
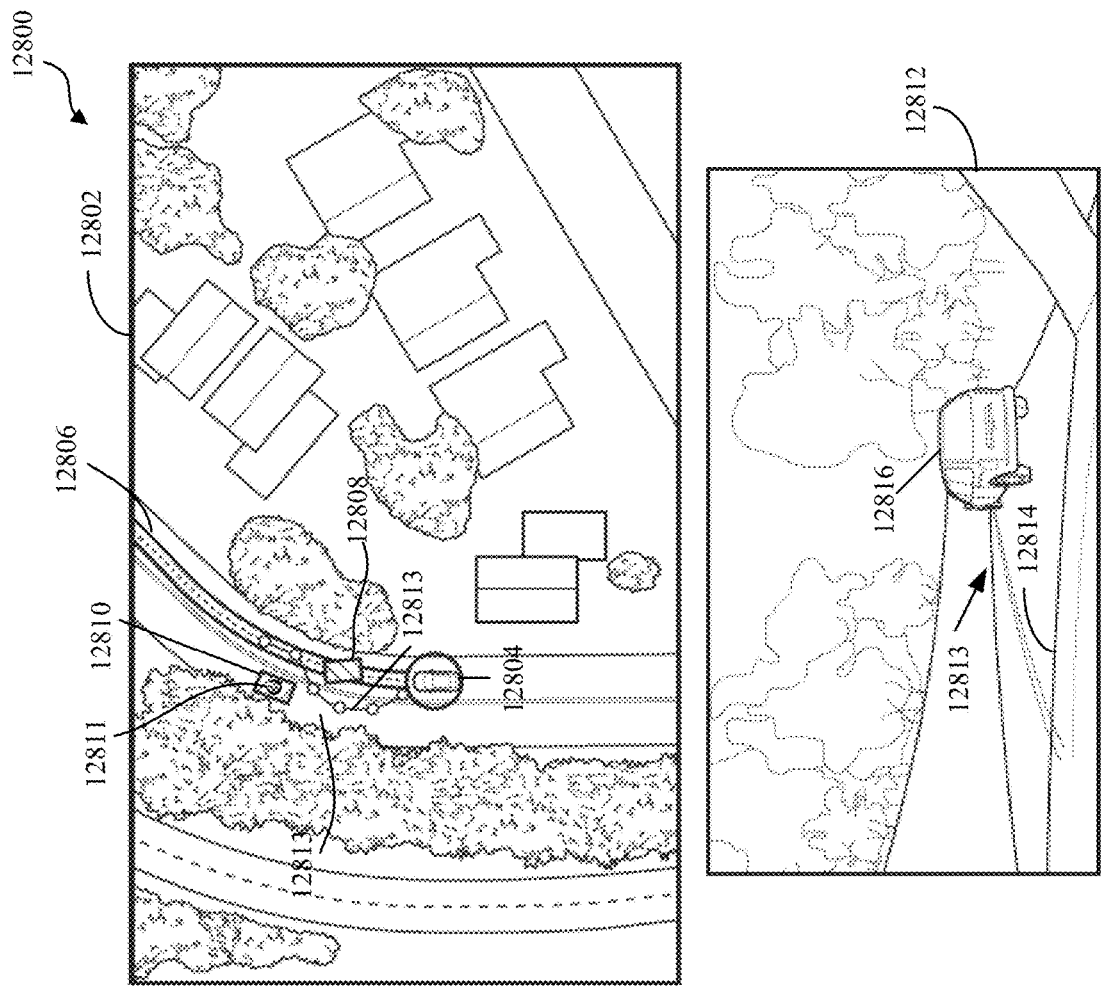
Figure 12I:
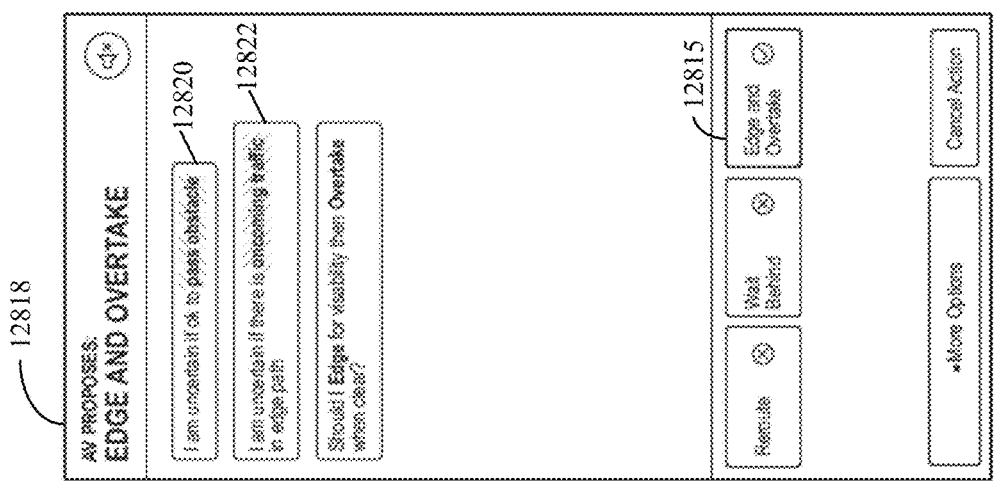

FIG. 12I is an illustration of user interfaces 12800 of a tele-operator according to implementations of this disclosure. The user interfaces 12800 are mere illustrative examples of visual information that a tele-operator may need in order to respond to the request for assistance from an AV. The AV in FIG. 12I is a vehicle 12804 that is traveling along a planned trajectory 12806.

The scene of FIG. 12I illustrates that the path of the vehicle 12814 is blocked by a vehicle 12816. The vehicle 12814 cannot, with certainty, safely overtake the vehicle 12816 because, first, doing so would cause the vehicle 12814 to cross the center line of the road and travel on an opposite-traffic lane and, second, there is uncertainty as to whether there is any oncoming traffic since the sensors of the vehicle 12814 cannot see around a curve 12813 in the road.

One or more of the user interfaces 12800 can be displayed (or available for display) to the tele-operator. The user interfaces 12800 include an augmented view 12802, a dashcam view 12812, and a dialog window 12818. However, the user interfaces 12800 can include more, fewer, or other user interfaces and/or information that can aid the tele-operator in responding to the received request for assistance. In an example, the user interfaces 12800 can include a map view that depicts one or more vehicles that are managed by the tele-operation center overlaid on a street map. The map view can be generated using location information that is received from the vehicle 12804. That is, the vehicle 12804 can regularly (e.g., every several milliseconds) send its location information to a system that enables the creation of the map view.

The dashcam view 12812 is a view from a front-facing camera of a vehicle 12814. The camera view shows that the road curves and that a vehicle 12816 is stopped in the middle of the road and obstructing the vehicle 12814. In an example, and as described with respect to FIG. 12H, any explanations from the vehicle 12814 can be overlaid on the dashcam view 12812.

The augmented view 12802 illustrates a satellite view of streets (which may or may not be empty) overlaid with the vehicle 12804 and other road users (e.g., the vehicle 12808).

The other road users include any road users that constitute the obstruction and/or other proximal road users. State information transmitted from the vehicle 12804 can be used to generate the augmented view 12802. For example, pose and size state information of the other road users can be used to create the augmented view 12802. The vehicle 12804 and the vehicle 12808 are augmented information that correspond, respectively, to the vehicle 12814 and the vehicle 12816 of the dashcam view 12812.

As uncertainty is associated with whether a vehicle 12810 exists or not (i.e., the state factor), a question mark icon 12811 is overlaid over the vehicle 12810 in the augmented view 12802. A stop line 12813 indicates that the vehicle 12804 cannot proceed past the stop line 12813. As such, the explanation displayed to the tele-operator in the graphical view (e.g., the augmented view 12802) includes a first graphical indicator of a world object (e.g., the vehicle 12810) of the selected decision component, a second graphical indicator describing the state factor (e.g., the existence of the vehicle 12810), a question mark icon 12811 indicating uncertainty over the existence of the vehicle 12810, and a third graphical indicator describing the action (e.g., the stop action implied by the stop line 12813).

Via the dialog window 12818, the tele-operator can issue textual commands to the AV and/or receive information from the vehicle 12814. For example, the tele-operator can issue a "Edge and Overtake" command by selecting a button 12815. The command is then transmitted to the vehicle 12814. In an example, explanations generated by the vehicle 12814 (i.e., an explanation system therein, such as the system 7000 of FIG. 7) can be displayed textually (i.e., in a textual representation) in the dialog window 12818. The textual representation can include a textual highlighting of at least one of the state factor or the selected decision component the text highlighting is in a respective similar color in the graphical view.

The displayed explanations can include hot words, which cross reference the textual explanation with a visual display. The hot words can be readily distinguishable by the tele-operator such as by being highlighted (e.g., underlined, colored, etc.) in the same highlight as the corresponding visual item. A hot word can correspond to a decision component, a state factor, or a state factor value. Thus, in an example, the world object can be displayed using a highlight (e.g., a shade, a pattern, etc.) in the graphical view and the explanation includes a hot word describing (e.g., corresponding to, etc.) the world object and that is formatted using the highlight.

A first explanation 12820 in the dialog window 12818 states that "I am uncertain if OK to pass obstacle." The word "obstacle" is a hot word. The hot word is highlighted in the same pattern as the corresponding visual object (i.e., the vehicle 12808). In an example, the word obstacle can be underlined using a first color (e.g., red) and the vehicle 12808 can be filled with the same color (e.g., red). A second explanation 12822 in the dialog window 12818 states that "I am uncertain if there is oncoming traffic in edge path." The term "oncoming traffic" is a hot word. The hot word is highlighted in the same pattern as the corresponding visual object (i.e., the vehicle 12810). In an example, the term "oncoming traffic" can be underlined using a second color (e.g., orange) and the vehicle 12810 can be filled with the same color (e.g., orange).

Figure 13:
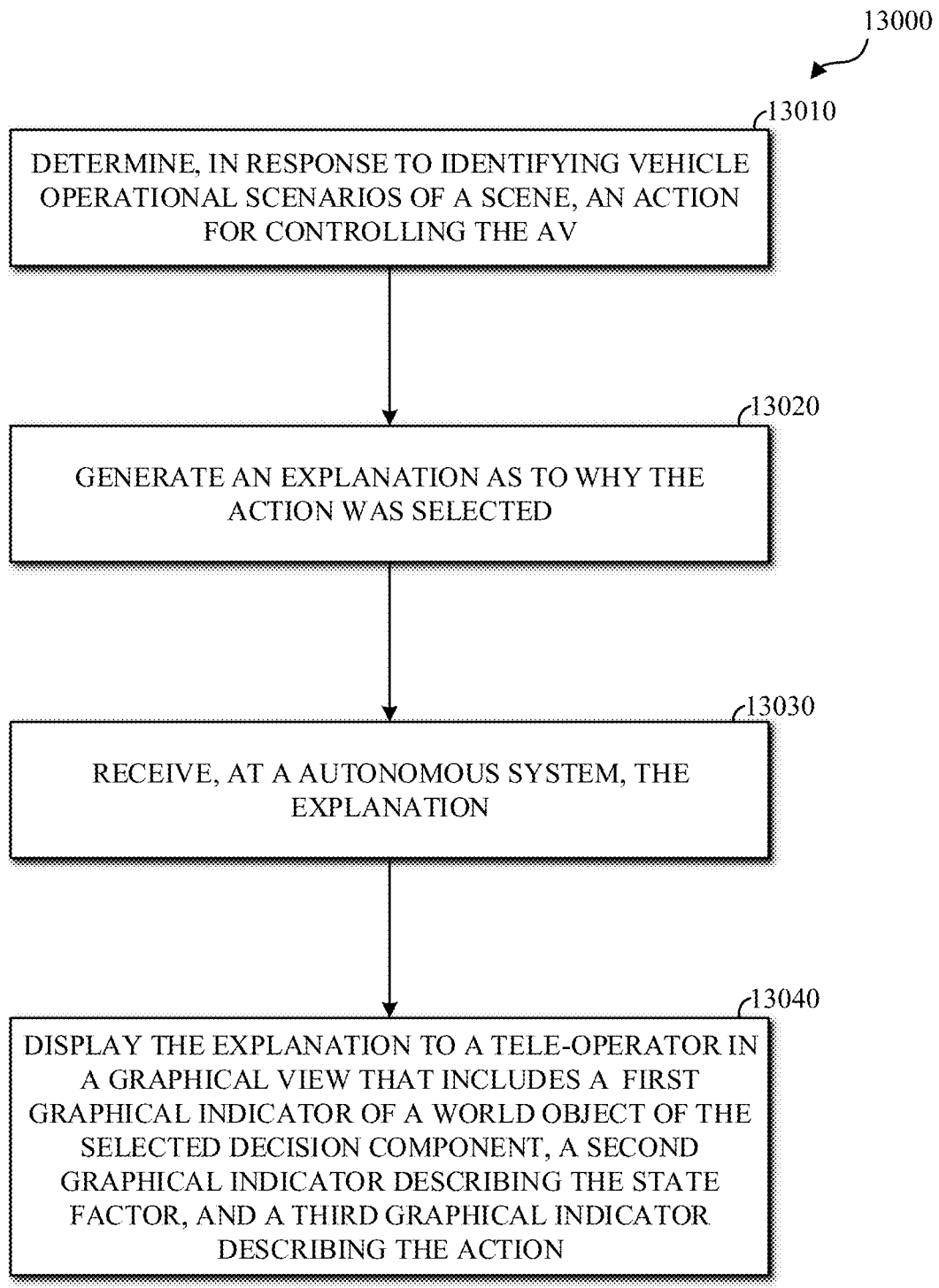
FIG. 13 is a flowchart diagram of an example of a technique for displaying an explanation of an action for controlling a vehicle in accordance with an embodiment of this disclosure.

FIG. 13 is a flowchart diagram of an example of a technique 13000 for displaying an explanation of an action for controlling a vehicle in accordance with an embodiment of this disclosure. The technique 13000 can be implemented partially by an autonomous vehicle. The technique 13000 can be implemented partially by an autonomous system. The autonomous system can be a system that is remote to, and/or accessible by, a vehicle, such as the autonomous vehicle. The autonomous system can be used by a tele-operator to monitor the status of one or more vehicles and to provide assistance in response to receiving requests for assistance. The autonomous system can include one or more module for displaying user interfaces to the tele-operator. For example, the autonomous system can display one or more of the interfaces of FIGS. 12A-12I.

At 13010, the technique 13000 determines, in response to identifying vehicle operational scenarios of a scene, an action for controlling the AV, as described above. The action can be determined by a selected decision component that determined the action based on a level of certainty associated with a state factor. As used herein, certainty encompasses both certainty and uncertainty. The action can be determined by the AV as described with respect to 11010 of FIG. 11.

At 13020, the technique 13000 generates an explanation as to why the action was selected. The explanation includes respective descriptors of the action, the selected decision component, and the state factor. The explanation can be generated by an AV (e.g., by an explanation system therein, such as the system 7000 of FIG. 7) such as described with respect to 11020 of FIG. 11.

At 13030, the technique 13000 receives the explanation at the autonomous system. For example, the explanation can be received at the autonomous system when the AV initiates a request for assistance. In an example, a ticket, as described above, can be created in response to the request for assistance and the explanation can be linked to (e.g., included in, associated with, etc.) the ticket.

At 13040, the technique 13000 displays the explanation to a tele-operator in a graphical view. The graphical view can include a first graphical indicator of a world object of the selected decision component, a second graphical indicator describing the state factor, and a third graphical indicator describing the action. The explanation can be displayed to the tele-operator in response to the tele-operator responding to a request from the AV for assistance.

In an example, the graphical view can be displayed as an overlay of a satellite view of the scene, such as described with respect to the augmented view 12802 of FIG. 12I. In an example, the explanation can be output in a dialog window, such as described with respect to the dialog window 12818 of FIG. 12I. In an example, the world object can be displayed using a highlight in the graphical view and the explanation includes a hot word describing the world object and that is formatted using the highlight (or a similar highlight), as described above with respect to FIG. 12I. In an example, the world object can be highlighted (e.g., shaded, etc.) using a color and the hot word can be underlined using the same color.

As mentioned above, the human-understandable explanation can be output using haptic feedback. Haptic feedback can be useful, for example, to hearing and/or visually impaired occupants. The haptic explanation can be provided by vibrating one or more physical components (e.g., steering wheel, seat, pedal, etc.) of the AV.

Different vibration patterns and locations (e.g., a left side of steering wheel, a right side of steering wheel, a left side of seat cushion, a right side of seat cushion, both sides of the steering wheel, both sides of a seat, etc.) can be used to communicate the different aspects (e.g., the four aspects) of the explanation. In an example, the steering wheel can be used in those situations where sensors of the steering wheel detect that a person is holding the steering wheel.

In an example, If a vehicle on the left (right) side of the AV is the issue-to-be-explained (i.e., the decision component entity, the world object to which the explanation pertains), then the left (right) side of the steering wheel and/or seat can be vibrated. Different vibration patterns can be used to convey respective combinations of uncertainty/certainty and the state factor. In an example, if the uncertainty is about a vehicle's blocking, then a first vibration pattern can be used. For example, the first pattern can be "RRR---RRR---." In an example, if the uncertainty is with respect to the existence of a vehicle, then a second pattern can be used. For example, the second pattern can be "R-----R-----." In an example, if the uncertainty is with respect to whether a pedestrian is blocking, then a third pattern can be used. For example, the third pattern can be "RRR---R-----RRR---R-----." Other vibration patterns for uncertainty/certainty and the state factor combinations can be available. In the vibration patterns, "R" can represent a vibration or a buzz and "-" can represent a pause; alternatively, "R" can represent a high-intensity vibration or buzz and "-" can represent a low-intensity vibration or buzz. In an example, if the decision component entity (i.e., the world object to which the explanation pertains) is in front of the AV, then a top side or both left and right sides are vibrated.

Figure 14:
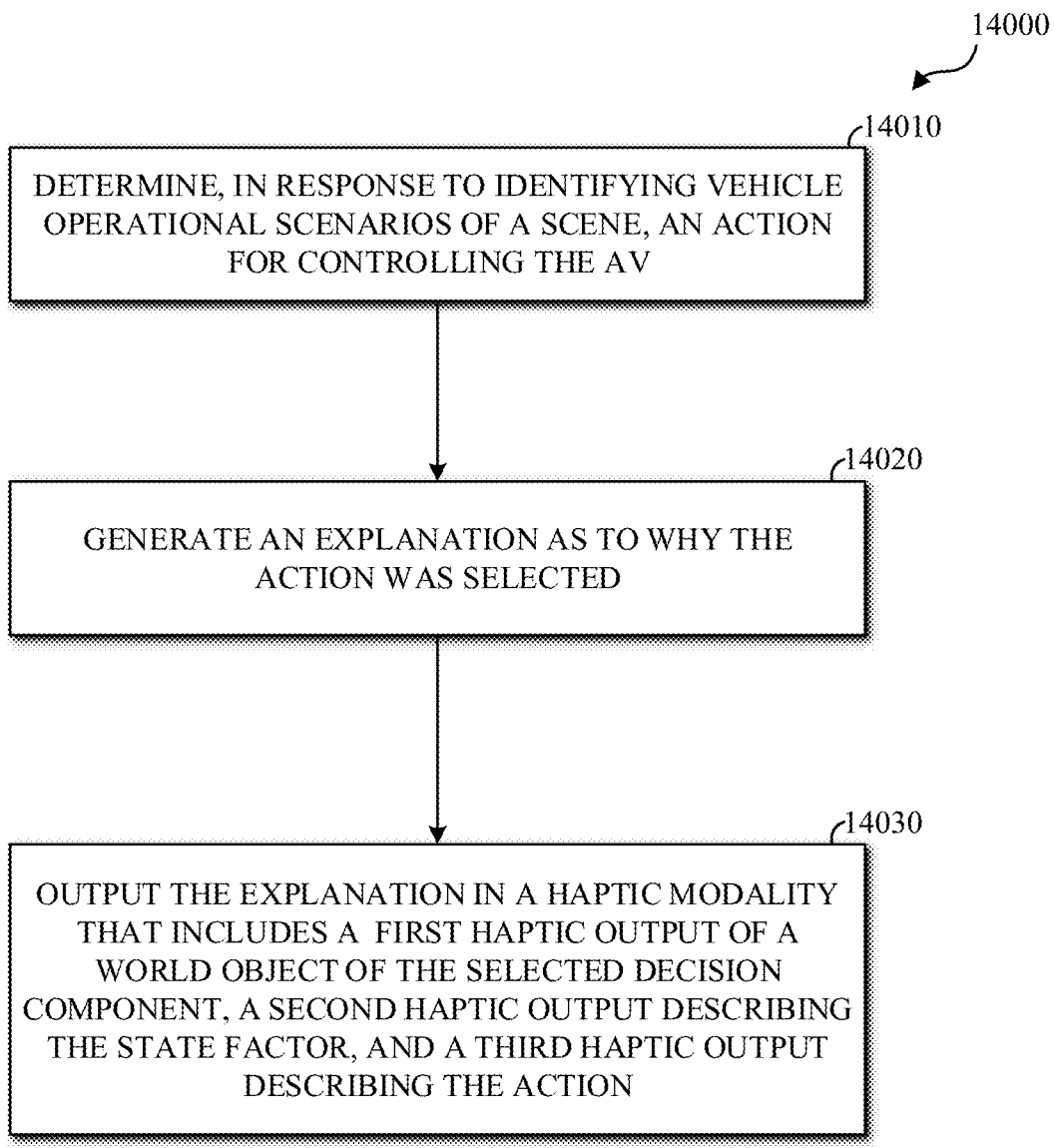
FIG. 14 is a flowchart diagram of an example of a technique for outputting an explanation of an action for controlling a vehicle in accordance with an embodiment of this disclosure.

FIG. 14 is a flowchart diagram of an example of a technique 14000 for outputting an explanation of an action for controlling a vehicle in accordance with an embodiment of this disclosure. The technique 14000 can be used in traversing a vehicle transportation network by an autonomous vehicle (AV). The technique 14000 can be implemented by the system 7000 of FIG. 7. For example, the technique 14000 can be implemented by the explainer 7008 of FIG. 7. The AV can be the vehicle 1000 shown in FIG. 1, one of the vehicles 2100/2110 shown in FIG. 2, a semi-autonomous vehicle, or any other vehicle implementing autonomous driving. The technique 14000 can be implemented as instructions that are stored in a memory, such as the memory 1340 of FIG. 1. The instructions can be executed by a processor, such as the processor 1330 of FIG. 1.

At 14010, the technique 14000 determines, in response to identifying vehicle operational scenarios of a scene, an action for controlling the AV. The action can be from a selected decision component that determined the action based on level of certainty associated with a state factor. Determining the action can be as described with respect to 13010 of FIG. 13. At 14020, the technique 14000 generates an explanation as to why the action was selected. The explanation can include respective descriptors of the action, the selected decision component, and the state factor. The explanation can be generated as described with respect to 13020 of FIG. 13.

At 14030, the technique 14000 outputs the explanation in a haptic modality (i.e., haptically). The haptic modality includes a first haptic output of a world object of the selected decision component, a second haptic output describing the state factor, and a third haptic output describing the action, as described above. In an example, the explanation can be output by vibrating, using a pattern, at least one of a seat or a steering wheel of the AV. In an example, the pattern can be indicative of a combination of a certainty or uncertainty and a state factor. In an example, one side of the at least one of the seat or the steering wheel of the AV is vibrated. The one side can correspond to a location of the world object with respect to the AV.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An apparatus for use in traversing a vehicle transportation network by an autonomous vehicle (AV), comprising:
   a memory; and
   a processor, the processor configured to execute instructions stored in the memory to:
      determine, in response to identifying vehicle operational scenarios of a scene, an action for controlling the AV, wherein the action is from a selected decision component that determined the action based on level of certainty associated with a state factor;
      generate an explanation as to why the action was selected, wherein the explanation comprises respective descriptors of the action, the selected decision component, and the state factor;
      display the explanation in a graphical view, wherein the graphical view includes a first graphical indicator of a world object of the selected decision component, a second graphical indicator describing the state factor, and a third graphical indicator describing the action, wherein the second graphical indicator is an icon displayed over an arrow indicating a trajectory of the world object of the selected decision component, and wherein the state factor is the trajectory and the icon indicates uncertainty with respect to the trajectory; and
      control the AV to traverse the vehicle transportation network using the action after displaying the explanation.

2. The apparatus of claim 1, wherein to determine, in response to identifying the vehicle operational scenarios, the action for controlling the AV comprises to:
   identify distinct vehicle operational scenarios;
   instantiate decision components,
      wherein each of the decision components is an instance of a respective decision problem that models a respective distinct vehicle operational scenario of the distinct vehicle operational scenarios, and
      wherein the each of the decision components maintains a respective state describing the respective vehicle operational scenario;
   receive respective candidate vehicle control actions from the decision components; and
   select the action from the respective candidate vehicle control actions,
      wherein the action is from the selected decision component of the decision components, and
      wherein the action is used to control the AV to traverse a portion of the vehicle transportation network.

3. The apparatus of claim 1, wherein the instructions further comprise instructions to:
   control the AV to traverse the vehicle transportation network using the action before the displaying the explanation.

4. The apparatus of claim 1, wherein the first graphical indicator of the world object being at least one of a bounding box around the world object or a shading of the world object.

5. The apparatus of claim 1, wherein the world object being a portion of the vehicle transportation network, and wherein the first graphical indicator being a shading of the portion of the vehicle transportation network.

6. The apparatus of claim 1, wherein the state factor describes a predicted action of the world object and wherein the second graphical indicator depicts the state factor.

7. The apparatus of claim 1, wherein the state factor describes a priority at an n-way stop and wherein the second graphical indicator being a numerical number indicating a priority of the world object at the n-way stop.

8. A method for use in traversing a vehicle transportation network by an autonomous vehicle (AV), comprising:
   determining, in response to identifying vehicle operational scenarios of a scene, an action for controlling the AV, wherein the action is from a selected decision component that determined the action based on a level of certainty associated with a state factor;
   generating an explanation as to why the action was selected, wherein the explanation comprises respective descriptors of the action, the selected decision component, and the state factor;
   receiving, at an autonomous system, the explanation;
   displaying the explanation to the tele-operator in a graphical map view, wherein the graphical map view includes a first graphical indicator of a world object of the selected decision component, a second graphical indicator describing the state factor, and a third graphical indicator describing the action;
   outputting the explanation in a dialog window, wherein information from the AV is displayed as text in the dialog window, wherein the world object is displayed using a highlight in the graphical map view and wherein the explanation includes one or more words describing the world object and are formatted using the highlight and the world object is highlighted using a color, and wherein the one or more words are underlined using the same color; and
   controlling the AV to traverse the vehicle transportation network using the action.

9. The method of claim 8, wherein the graphical map view is displayed as an overlay of a satellite view of the scene.

10. The method of claim 9, wherein the explanation is displayed to the tele-operator in response to the tele-operator responding to a request from the AV for assistance.

11. A method for use in traversing a vehicle transportation network by an autonomous vehicle (AV), comprising:
    determining, in response to identifying vehicle operational scenarios of a scene, an action for controlling the AV, wherein the action is from a selected decision component that determined the action based on level of certainty associated with a state factor;
    generating an explanation as to why the action was selected, wherein the explanation comprises respective descriptors of the action, the selected decision component, and the state factor; and
    outputting the explanation in a haptic modality by vibrating, using a pattern, at least one of a seat or a steering wheel of the AV, wherein the pattern includes a first vibration pattern indicative of a world object of the selected decision component, a second vibration pattern describing the state factor, and a third vibration pattern describing the action.

12. The method of claim 11, wherein the pattern is indicative of a combination of a certainty or uncertainty and the state factor.

13. The method of claim 11, wherein one side of the at least one of the seat or the steering wheel of the AV is vibrated, wherein the one side corresponds to a location of the world object with respect to the AV.

* * * * *